US012773753B2

(12) United States Patent
Sakamoto et al.

(10) Patent No.: US 12,773,753 B2
(45) Date of Patent: Oct. 27, 2026

(54) LASER PROCESSING DEVICE AND LASER PROCESSING METHOD WITH SURFACE-BASED CONTROL

(71) Applicant: HAMAMATSU PHOTONICS K.K., Hamamatsu (JP)

(72) Inventors: Takeshi Sakamoto, Hamamatsu (JP); Koji Kuno, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1109 days.

(21) Appl. No.: 17/794,066

(22) PCT Filed: Jan. 8, 2021

(86) PCT No.: PCT/JP2021/000535
§ 371 (c)(1),
(2) Date: Jul. 20, 2022

(87) PCT Pub. No.: WO2021/149525
PCT Pub. Date: Jul. 29, 2021

(65) Prior Publication Data

US 2023/0054570 A1 Feb. 23, 2023

(30) Foreign Application Priority Data

Jan. 22, 2020 (JP) ................................ 2020-008341

(51) Int. Cl.
*B23K 26/53* (2014.01)
*B23K 26/03* (2006.01)
(Continued)

(52) U.S. Cl.
CPC .............. *B23K 26/53* (2015.10); *B23K 26/03* (2013.01); *B23K 26/0648* (2013.01); *B23K 26/0869* (2013.01)

(58) Field of Classification Search
CPC .... B23K 26/53; B23K 26/03; B23K 26/0648; B23K 26/0869; B23K 26/032;
(Continued)

(56) References Cited

U.S. PATENT DOCUMENTS

2008/0037003 A1* 2/2008 Atsumi ................ B23K 26/048 356/72
2018/0085769 A1* 3/2018 Ayabe ...................... B05D 1/02
(Continued)

FOREIGN PATENT DOCUMENTS

CN 101522360 A 9/2009
CN 101878090 A 11/2010
(Continued)

OTHER PUBLICATIONS

International Preliminary Report on Patentability mailed Aug. 4, 2022 for PCT/JP2021/000535.

*Primary Examiner* — Steven W Crabb
*Assistant Examiner* — Ket D Dang
(74) *Attorney, Agent, or Firm* — Faegre Drinker Biddle & Reath LLP

(57) ABSTRACT

The controller executes a first process of moving a support portion so that inside the peripheral edge of an object, a focusing position moves along the peripheral edge, thereby forming a first modified region, and following the first process, executes a second process of moving the support portion so that the focusing position moves, thereby forming a second modified region The measurement data acquiring portion, at execution of the first process, acquires measurement data associated with position information on a position of the object. The controller, at execution of the second process, causes the driving portion to shift a position of the condenser lens, the position being along the direction of an optical axis, to an initial position based on the measurement data acquired in the first process, before or when the
(Continued)

focusing position moves from outside of the object to inside thereof.

11 Claims, 28 Drawing Sheets

(51) Int. Cl.
*B23K 26/064* (2014.01)
*B23K 26/08* (2014.01)

(58) Field of Classification Search
CPC ........ B23K 26/04; B23K 26/10; B23K 26/08; B23K 26/048; B23K 26/0853; B23K 2103/56; B23K 2101/40; B23K 37/0417; H01L 21/67092; H01L 21/268; H01L 21/6838; H01L 21/78; H01L 21/12; H01L 21/67253; H01L 21/76; H01L 21/3043; H01L 21/67115; H01L 21/681; H01L 21/67259; H01L 21/67424; A61M 2005/3242; A61M 2209/045; A61M 5/007; A61M 5/14526; A61M 5/14546; A61M 5/1782; A61M 5/2053; A61M 5/3148; B65B 3/003; H10P 72/0428
USPC ........................................................ 219/121.6
See application file for complete search history.

(56) References Cited

U.S. PATENT DOCUMENTS

| | | | | |
|---|---|---|---|---|
| 2018/0304409 | A1* | 10/2018 | Nakamura | H01L 21/78 |
| 2019/0039169 | A1 | 2/2019 | Okuma | |
| 2022/0040799 | A1* | 2/2022 | Mori | H01L 21/304 |
| 2022/0319935 | A1* | 10/2022 | Tetsuyama | H01L 22/14 |

FOREIGN PATENT DOCUMENTS

| | | | | |
|---|---|---|---|---|
| CN | 108447769 | A | | 8/2018 |
| JP | 2008-087027 | A | | 4/2008 |
| JP | 2014-091642 | A | | 5/2014 |
| JP | 2014-189478 | A | | 10/2014 |
| JP | 2015-186825 | A | | 10/2015 |
| JP | 2019055427 | A | * | 4/2019 |
| JP | 2019-166570 | A | | 10/2019 |
| TW | 201446375 | A | | 12/2014 |
| WO | WO-2019/198513 | A1 | | 10/2019 |

* cited by examiner

LASER PROCESSING DEVICE AND LASER PROCESSING METHOD WITH SURFACE-BASED CONTROL

TECHNICAL FIELD

An aspect of the present invention relates to a laser processing apparatus and a laser processing method.

BACKGROUND ART

A laser processing apparatus that emits a condensed laser light onto an object to forms a modified region on the object has been known for years (see, for example, Patent Literature 1). Such a laser processing apparatus includes a support portion that supports an object, an emission portion that emits a laser light onto the object via a condenser lens, a moving mechanism that moves at least one of the support portion and the emission portion so that a focusing position of the laser light moves, and a driving portion that causes the condenser lens to move along the direction of an optical axis in such a way as to make the condenser lens follow displacement of a laser light incident surface.

CITATION LIST

Patent Literature

Patent Literature 1: Japanese Unexamined Patent Publication No. 2015-186825

SUMMARY OF INVENTION

Technical Problem

According to the above technology, when the support portion or the emission portion is moved so that the focusing position moves from outside of the object to inside thereof to form the modified region in the object, for example, a control signal inputted to the driving portion overshoots at a point of time right after the focusing position's moving into the object. This raises a possibility that precision in causing the condenser lens to follow displacement of the laser light incident surface may drop.

To solve this problem, an aspect of the present invention provides a laser processing apparatus and a laser processing method that can prevent a drop in precision in following displacement of a laser light incident surface.

Solution to Problem

A laser processing apparatus according to an aspect of the present invention is a laser processing apparatus configured to emit a laser light onto an object to form a modified region inside the object. The laser processing apparatus includes: a support portion configured to support the object; an emission portion configured to emit the laser light onto the object via a condenser lens; a moving mechanism configured to move at least one of the support portion and the emission portion so that a focusing position of the laser light moves; a driving portion configured to cause at least one of the support portion and the condenser lens to move along the direction of an optical axis of the condenser lens; a measurement data acquiring portion configured to acquire measurement data on at least one of displacement of a laser light incident surface of the object, the laser light incident surface being exposed to the laser light incident thereon, and displacement of a support surface of the support portion, the support surface supporting the object; and a controller that controls the emission portion, the moving mechanism, and the driving portion. The controller executes a first process of moving at least one of the support portion and the emission portion so that inside the peripheral edge of the object, the focusing position moves along the peripheral edge, thereby forming a first modified region inside the object along the peripheral edge, and following the first process, executes a second process of moving at least one of the support portion and the emission portion so that the focusing position moves from outside of the object to inside thereof, thereby forming a second modified region inside the object. The measurement data acquiring portion, at execution of the first process, acquires measurement data associated with position information on a position of the object. The controller, at execution of the second process, causes the driving portion to shift a position of at least one of the support portion and the condenser lens, the position being along the direction of the optical axis, to an initial position based on the measurement data acquired in the first process, before or when the focusing position moves from outside of the object to inside thereof.

According to this laser processing apparatus, at execution of the second process, the driving portion causes at least one of the support portion and the condenser lens to move to the initial position based on the measurement data acquired in the first process, before or when the focusing position moves from outside of the object to inside thereof. According to this configuration, for example, at a point of time right after the focusing position's moving into the object, the above-mentioned overshooting can be prevented to offer an advantage over a case where such an initial position is not taken into consideration. Hence a drop in precision in following displacement of the laser light incident surface can be suppressed.

In the laser processing apparatus according to another aspect of the present invention, the controller, at execution of the first process, may form the first modified region along an annular line along the peripheral edge of the object, and, at execution of the second process, may form the second modified region along a linear line intersecting the annular line, the second modified region being in a peripheral part extending from the peripheral edge of the object to the first modified region in a view from the laser light incident surface. In this case, the peripheral part of the object can be cut apart and removed.

In the laser processing apparatus according to still another aspect of the present invention, the initial position may be a position based on measurement data on displacement at an intersection of the annular line and the linear line on the laser light incident surface. According to this configuration, in a case where the peripheral part of the object is cut apart and removed, a drop in precision in following displacement of the laser light incident surface can be further suppressed.

In the laser processing apparatus according to still another aspect of the present invention, the controller, at execution of the first process, may cause the driving portion to move at least one of the support portion and the condenser lens in such a way as to make the support portion or the condenser lens follow displacement of the laser light incident surface while moving at least the support portion or the emission portion so that the focusing position moves along the peripheral edge. The measurement data acquiring portion, at execution of the first process, may store a control signal value inputted to the driving portion when the driving portion moves at least one of the support portion and the condenser lens in such a way as to make the support portion or the condenser lens follow displacement of the laser light incident surface, as the measurement data associated with the position information. The controller, at execution of the second process, may read the control signal value that is inputted when the support portion or the condenser lens has been caused to follow displacement of an intersection of the annular line and a first linear line by the first process, move at least one of the support portion and the emission portion so that the focusing position moves from outside of the object to inside thereof along the first linear line, thus forming the second modified region in the peripheral part, and before or when the focusing position moves from outside of the object to inside thereof, control the driving portion by the read control signal value, thereby moving at least one of the support portion and the condenser lens to a first initial position. The controller, at execution of the second process, may also read the control signal value that is inputted when the support portion or the condenser lens has been caused to follow displacement of an intersection of the annular line and a second linear line by the first process, move at least one of the support portion and the emission portion to so that the focusing position moves from outside of the object to inside thereof along the second linear line, thus forming the second modified region in the peripheral part, and before or when the focusing position moves from outside of the object to inside thereof, control the driving portion by the read control signal value, thereby moving at least one of the support portion and the condenser lens to a second initial position. According to this configuration, in a case where the peripheral part of the object is cut apart and removed, a drop in precision in following displacement of the laser light incident surface can be further suppressed in a more specific manner.

In the laser processing apparatus according to still another aspect of the present invention, the controller, at execution of the first process, may form the first modified region along an annular line along the peripheral edge of the object, and, at execution of the second process, may form the second modified region along a linear line intersecting the annular line, the second modified region being on an inner part of the object that is inside the first modified region in a view from the laser light incident surface. In this case, the second modified region can be formed on the inner part of the object such that a crack developing in the second modified region hardly spreads to the peripheral part of the object.

In the laser processing apparatus according to still another aspect of the present invention, the initial position may be a position based on measurement data on displacement at an intersection of the annular line and the linear line on the laser light incident surface. According to this configuration, in a case where the second modified region is formed such that a crack developing in the second modified region hardly spreads to the peripheral part, a drop in precision in following displacement of the laser light incident surface can be further suppressed.

In the laser processing apparatus according to still another aspect of the present invention, the controller, at execution of the first process, may form the first modified region along an annular line along the peripheral edge of the object, and, at execution of the second process, may form the second modified region along a virtual plane inside the object. In this case, peeling processing of peeling the object along the virtual plane can be implemented.

In the laser processing apparatus according to still another aspect of the present invention, the controller may set a θ position about a θ axis on the laser light incident surface, the θ position being a position at which emission of the laser light is started in the second process, as a second process emission start θ position, and the initial position may be a position based on measurement data on displacement of the annular line at the second process emission start θ position on the laser light incident surface. According to this configuration, in the peeling processing of peeling the object along the virtual plane, a drop in precision in following displacement of the laser light incident surface can be further suppressed.

In the laser processing apparatus according to still another aspect of the present invention, at execution of the second process, the controller, after moving at least one of the support portion and the condenser lens to the initial position, may cause the driving portion to move at least one of the support portion and the condenser lens in such a way as to make the support portion or the condenser lens follow displacement of the laser light incident surface, from a point of time at which the focusing position is on a peripheral part extending from the peripheral edge of the object to the first modified region in a view from the laser light incident surface. In this manner, when the support portion or the condenser lens is caused to move in such a way as to follow displacement of the laser light incident surface, with respect to the peripheral part, a drop in precision in following displacement of the laser light incident surface can be suppressed.

In the laser processing apparatus according to still another aspect of the present invention, at execution of the second process, the controller, after moving at least one of the support portion and the condenser lens to the initial position, may cause the driving portion to hold at least one of the support portion and the condenser lens at the initial position in a period during which the focusing position stays on a peripheral part extending from the peripheral edge of the object to the first modified region in a view from the laser light incident surface. In this manner, when at least one of the support portion and the condenser lens is held at the initial position, with respect to the peripheral part, a drop in precision in following displacement of the laser light incident surface can be suppressed.

In the laser processing apparatus according to still another aspect of the present invention, the measurement data acquiring portion may include a sensor configured to emit measurement light onto the object and to detect information on reflection light that is the measurement light reflected by the laser light incident surface. In this case, at least one of the support portion and the condenser lens is caused to follow displacement of the laser light incident surface, using the measurement light.

A laser processing method according to an aspect of the present invention is a laser processing method of emitting a laser light onto an object to form a modified region inside the object. The method includes: a first step of moving at least one of a support portion and an emission portion, the support portion configured to support the object and the emission portion emitting the laser light onto the object via a condenser lens, so that inside the peripheral edge of the object, a focusing position of the laser light moves along the peripheral edge, thus forming a first modified region inside the object along the peripheral edge; and a second step to be executed following the first step, the second step moving at least one of the support portion and the emission portion so that the focusing position moves from outside of the object to inside thereof, thereby forming a second modified region inside the object. At the first step, measurement data associated with position information on a position of the object is acquired, the measurement data being data on displacement of a laser light incident surface of the object, the laser light incident surface being exposed to the laser light incident thereon, and on displacement of a support surface of the support portion, the support surface supporting the object. At the second step, a driving portion shifts a position of at least one of the support portion and the condenser lens, the position being along the direction of an optical axis of the condenser lens, to an initial position based on the measurement data acquired at the first step, before or when the focusing position moves from outside of the object to inside thereof.

According to this laser processing method, at execution of the second step, the driving portion causes at least one of the support portion and the condenser lens to move to the initial position based on the measurement data acquired at the first step, before or when the focusing position moves from outside of the object to inside thereof. According to this configuration, for example, at a point of time right after the focusing position's moving into the object, the above-mentioned overshooting can be prevented to offer an advantage over a case where such an initial position is not taken into consideration. Hence a drop in precision in following displacement of the laser light incident surface can be suppressed.

Advantageous Effects of Invention

An aspect of the present invention provides a laser processing apparatus and a laser processing method that suppress a drop in precision in following displacement of a laser light incident surface.

BRIEF DESCRIPTION OF DRAWINGS

FIG. 10(*b*) is a side view of the object shown in FIG. 10(*a*).

FIG. 11(*b*) is a plan view of the object for an explanation continued from the explanation of FIG. 11(*a*). FIG. 11(*c*) is a side view of the object shown in FIG. 11(*b*).

FIG. 12(*b*) is a plan view of the object for an explanation continued from the explanation of FIG. 12(*a*).

FIG. 13(*b*) is a side view of the object shown in FIG. 13(*a*). FIG. 13(*c*) is a side view of the object for an explanation continued from the explanation of FIG. 13(*b*).

FIG. 14(*b*) is a side view of the object shown in FIG. 14(*a*). FIG. 14(*c*) is a side view of the object for an explanation continued from the explanation of FIG. 14(*a*). FIG. 14(*d*) is a side view of the object for an explanation continued from the explanation of FIG. 14(*c*).

FIG. 15(*b*) is a plan view of the object for an explanation continued from the explanation of FIG. 15(*a*).

FIG. 27(*b*) is a plan view of the object for an explanation continued from the explanation of FIG. 27(*a*).

FIG. 28(*b*) is a plan view of the object for an explanation continued from the explanation of FIG. 28(*a*).

DESCRIPTION OF EMBODIMENT

Figure 1:
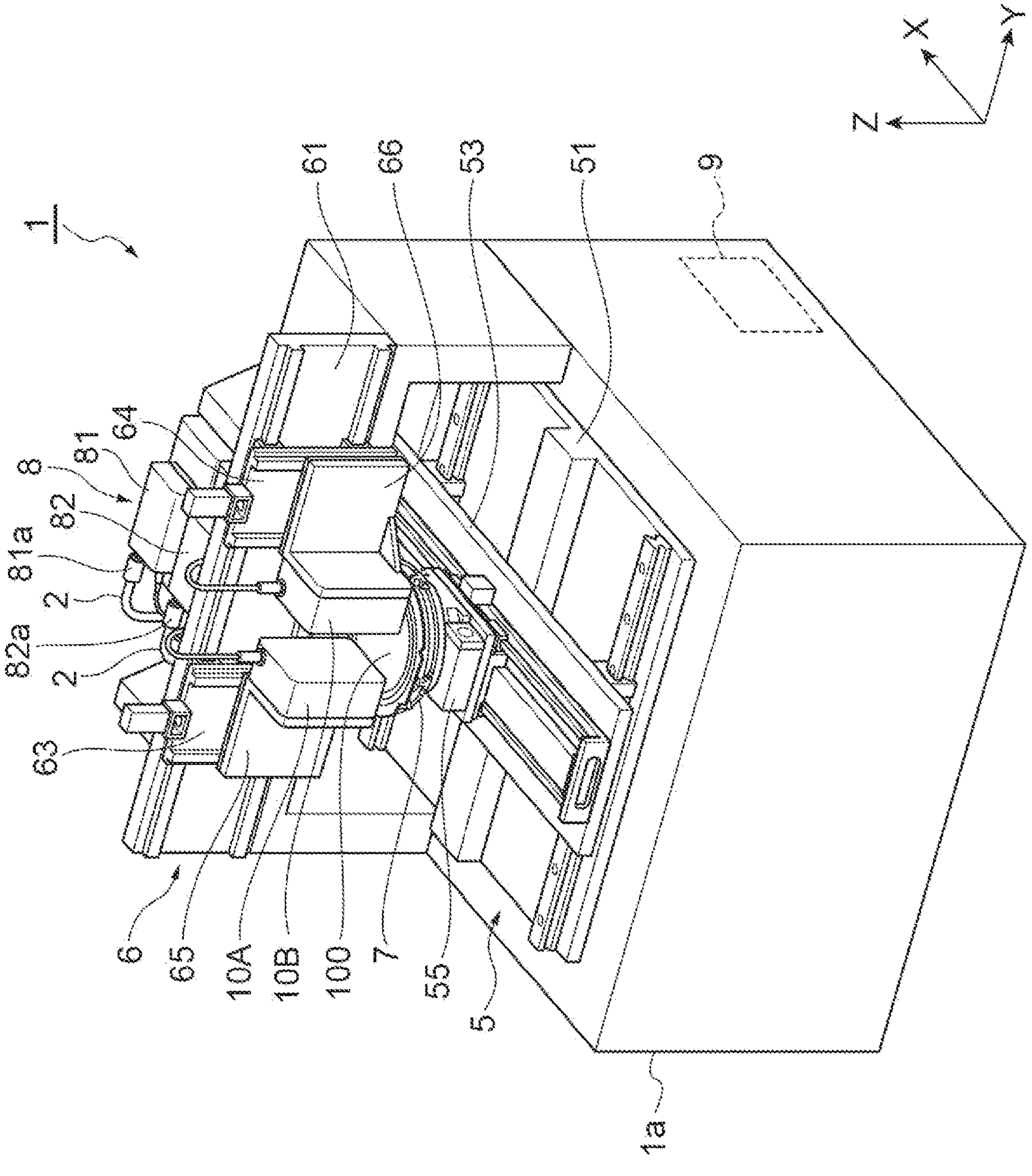
FIG. 1 is a perspective view of a laser processing apparatus according to an embodiment.

An embodiment will hereinafter be described in detail with reference to the drawings. In the drawings, components that are the same or equivalent to each other are denoted by the same reference signs, and redundant description thereof will be omitted.

A basic configuration, advantages, and effects of a laser processing apparatus and modifications of the laser processing apparatus will first be described.

[Configuration of Laser Processing apparatus]

As shown in FIG. 1, a laser processing apparatus 1 includes a plurality of moving mechanisms 5 and 6, a support portion 7, a pair of laser processing heads 10A and 10B, a light source 8, and a controller 9. Hereinafter, a first direction is referred to as an X direction, a second direction perpendicular to the first direction is referred to as a Y direction, and a third direction perpendicular to the first direction and the second direction is referred to as a Z direction. In this embodiment, the X direction and the Y direction are horizontal directions, and the Z direction is a vertical direction.

The moving mechanism 5 includes a fixed driving portion 51, a moving driving portion 53, and a fitting driving portion 55. The fixed driving portion 51 is attached to a device frame 1*a*. The moving driving portion 53 is fitted on rails laid on the fixed driving portion 51, and is therefore able to move along the Y direction. The fitting driving portion 55 is fitted on rails laid on the moving driving portion 53, and is therefore able to move along the X direction.

The moving mechanism 6 includes a fixed driving portion 61, a pair of moving driving portions 63 and 64, and a pair of fitting driving portions 65 and 66. The fixed driving portion 61 is attached to the device frame 1*a*. The pair of moving driving portions 63 and 64 are fitted respectively on rails laid on the fixed driving portion 61, and are each able to independently move along the Y direction. The fitting driving portion 65 is fitted on rails laid on the moving driving portion 63, and is therefore able to move along the Z direction. The fitting driving portion 66 is fitted on rails laid on the moving driving portion 64, and is therefore able to move along the Z direction. In other words, the pair of fitting driving portions 65 and 66 can move along the Y direction and the Z direction with respect to the device frame 1*a*. The moving driving portions 63 and 64 make up a first horizontally moving mechanism and a second horizontally moving mechanism (horizontally moving mechanism), respectively. The fitting driving portions 65 and 66 make up a first vertically moving mechanism and a second vertically moving mechanism (vertically moving mechanism), respectively.

The support portion 7 is fitted to a rotating shaft provided on the fitting driving portion 55 of the moving mechanism 5, and can rotate about an axis, i.e., center line parallel to the Z direction. In other words, the support portion 7 can move along the X direction and along the Y direction as well, and can rotate about the axis, i.e., center line parallel to the Z direction. The support portion 7 supports an object 100. The object 100 is, for example, a wafer.

Figure 2:
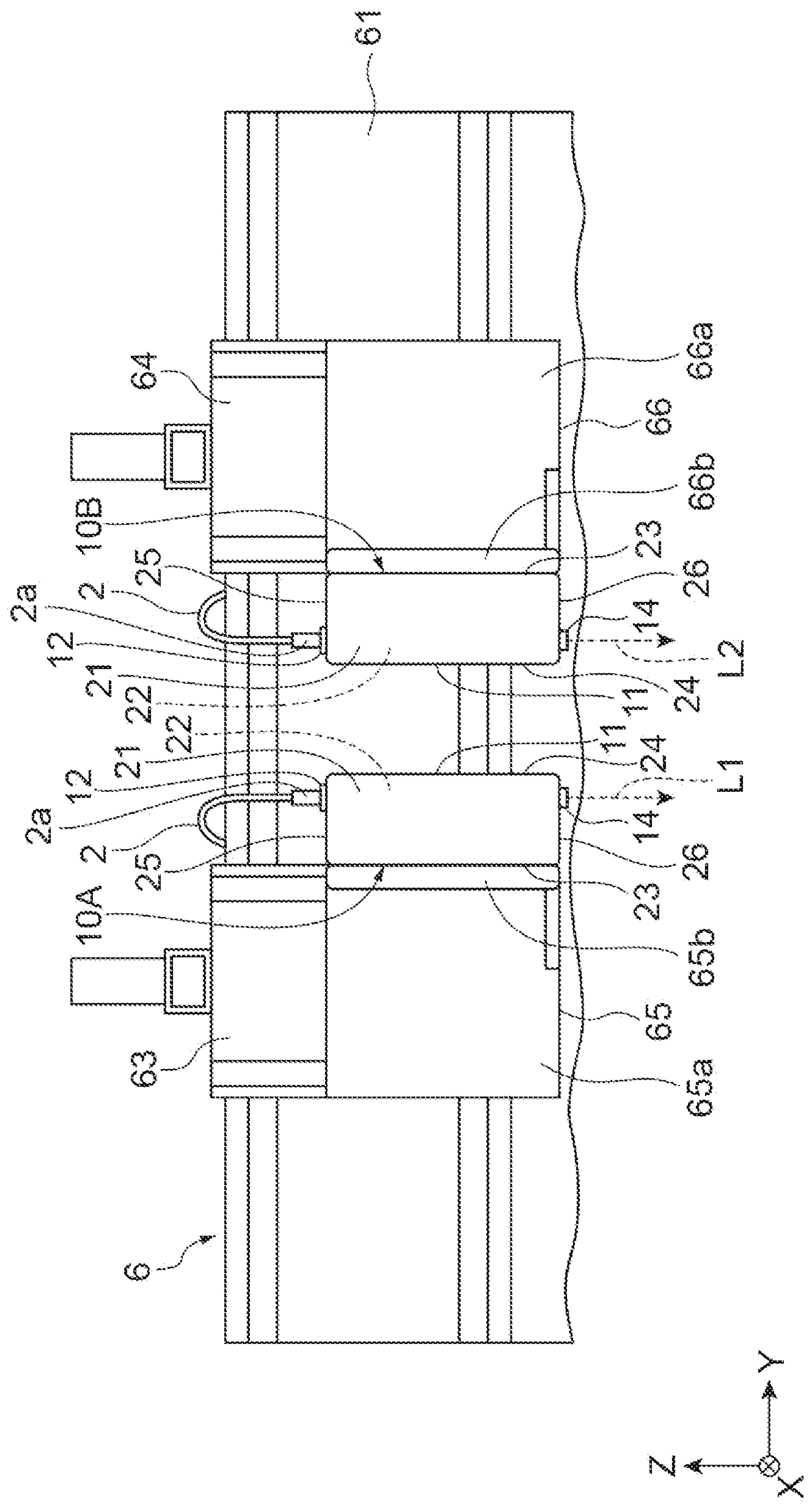
FIG. 2 is a front view of a part of the laser processing apparatus shown in FIG. 1.

As shown in FIGS. 1 and 2, a laser processing head 10A is fitted to the fitting driving portion 65 of the moving mechanism 6. The laser processing head 10A in a state of being counter to the support portion 7 in the Z direction emits a laser light L1 (which is referred to also as "first laser light L1") onto the object 100 supported by the support portion 7. A laser processing head 10B is fitted to the fitting driving portion 66 of the moving mechanism 6. The laser processing head 10B in a state of being counter to the support portion 7 in the Z direction emits a laser light L2 (which is referred to also as "second laser light L2") onto the object 100 supported by the support portion 7. The laser processing heads 10A and 10B make up an emission portion.

The light source portion 8 includes a pair of light sources 81 and 82. The light source 81 outputs the laser light L1. The laser light L1 is emitted from an emitting driving portion 81*a* of the light source 81, and is led to the laser processing head 10A by an optical fiber 2. The light source 82 outputs the laser light L2. The laser light L2 is emitted from an emitting driving portion 82*a* of the light source 82, and is led to the laser processing head 10B by another optical fiber 2.

The controller 9 controls respective components (the support portion 7, the moving mechanisms 5 and 6, the pair of laser processing heads 10A and 10B, the light source portion 8, and the like) of the laser processing apparatus 1. The controller 9 is configured as a computer including a processor, a memory, a storage, and a communication device. At the controller 9, software (program) loaded into the memory or the like is executed by the processor, which controls data reading/writing from/to the memory and storage and communications by the communication device. Through these processes, the controller 9 implements various functions.

An example of processing carried out by the laser processing apparatus 1 configured in the above manner will be described. This example of processing is an example in which, to cut the object 100, a wafer, into a plurality of chips, modified regions are formed inside the object 100 along a lattice pattern of lines.

First, the moving mechanism 5 moves the support portion 7 along the X direction and along the Y direction so that the support portion 7 supporting the object 100 is set counter to the pair of laser processing heads 10A and 10B in the Z direction. Subsequently, the moving mechanism 5 rotates the support portion 7 about the axis, i.e., center line parallel to the Z direction so that a plurality of lines extending in one direction in the object 100 are set along the X direction in which the lines extend.

Subsequently, the moving mechanism 6 moves the laser processing head 10A along the Y direction so that a focusing point (part of a focusing area) of the laser light L1 is located on one line extending in the one direction. The moving mechanism 6 moves also the laser processing head 10B along the Y direction so that a focusing point of the laser light L2 is located on a different line extending in the one direction. Subsequently, the moving mechanism 6 moves the laser processing head 10A along the Z direction so that the focusing point of the laser light L1 is located inside the object 100. The moving mechanism 6 moves also the laser processing head 10B along the Z direction so that the focusing point of the laser light L2 is located inside the object 100.

Subsequently, the light source 81 outputs the laser light L1, allowing the laser processing head 10A to emit the laser light L1 onto the object 100, as the light source 82 outputs the laser light L2, allowing the laser processing head 10B to emit the laser light L2 onto the object 100. At the same time, the moving mechanism 5 moves the support portion 7 along the X direction so that the focusing point of the laser light L1 moves relatively along the one line extending in the one direction as the focusing point of the laser light L2 moves relatively along the different line extending in the one direction. In this manner, the laser processing apparatus 1 forms modified regions inside the object 100 such that a modified region is formed along each of the plurality of lines extending in the one direction in the object 100.

Subsequently, the moving mechanism 5 rotates the support portion 7 about the axis, i.e., center line parallel to the Z direction so that a plurality of lines extending in a different direction perpendicular to the one direction in the object 100 are set along the X direction in which the lines extend.

Subsequently, the moving mechanism 6 moves the laser processing head 10A along the Y direction so that the focusing point of the laser light L1 is located on one line extending in the different direction. The moving mechanism 6 moves also the laser processing head 10B along the Y direction so that the focusing point of the laser light L2 is located on a different line extending in the different direction. Subsequently, the moving mechanism 6 moves the laser processing head 10A along the Z direction so that the focusing point of the laser light L1 is located inside the object 100. The moving mechanism 6 moves also the laser processing head 10B along the Z direction so that the focusing point of the laser light L2 is located inside the object 100.

Subsequently, the light source 81 outputs the laser light L1, allowing the laser processing head 10A to emit the laser light L1 onto the object 100, as the light source 82 outputs the laser light L2, allowing the laser processing head 10B to emit the laser light L2 onto the object 100. At the same time, the moving mechanism 5 moves the support portion 7 along the X direction so that the focusing point of the laser light L1 moves relatively along the one line extending in the different direction as the focusing point of the laser light L2 moves relatively along the different line extending in the different direction. In this manner, the laser processing apparatus 1 forms modified regions inside the object 100 such that a modified region is formed along each of the plurality of lines extending in the different direction perpendicular to the one direction in the object 100.

In the above example of processing, the light source 81 outputs the laser light L1 penetrative to the object 100, by, for example, a pulse oscillation method, and the light source 82 outputs the laser light L2 penetrative to the object 100, by, for example, a pulse oscillation method. When such laser light focuses inside the object 100, a part corresponding to a focusing point of the laser light absorbs the laser light intensively. As a result, a modified region is formed inside the object 100. A modified region is an area that differs from the surrounding non-modified region in such physical properties as density, refractive index, and mechanical strength. Examples of the modified region include a fusion treatment area, a crack area, a dielectric breakdown area, and a refractive index change area.

When the laser light outputted by the pulse oscillation method is emitted onto the object 100 and the focusing point of the laser light is moved relatively along a line set on the object 100, a plurality of reformed spots are formed along the line, as a row of reformed spots. One reformed spot is formed by being exposed to one pulse of laser light. A row of modified regions is a set of lined up reformed spots. Reformed spots adjacent to each other may be connected to each other or separated from each other, depending on the speed of relative movement of the focusing point of the laser light to the object 100 and on the repetition frequency of the laser light. The shape of lines to be set is not limited to a lattice shape, and may be an annular shape, a linear shape, a curved shape, or a shape created by combining at least some of these shapes.

[Configuration of Laser Processing Head]

Figure 3:
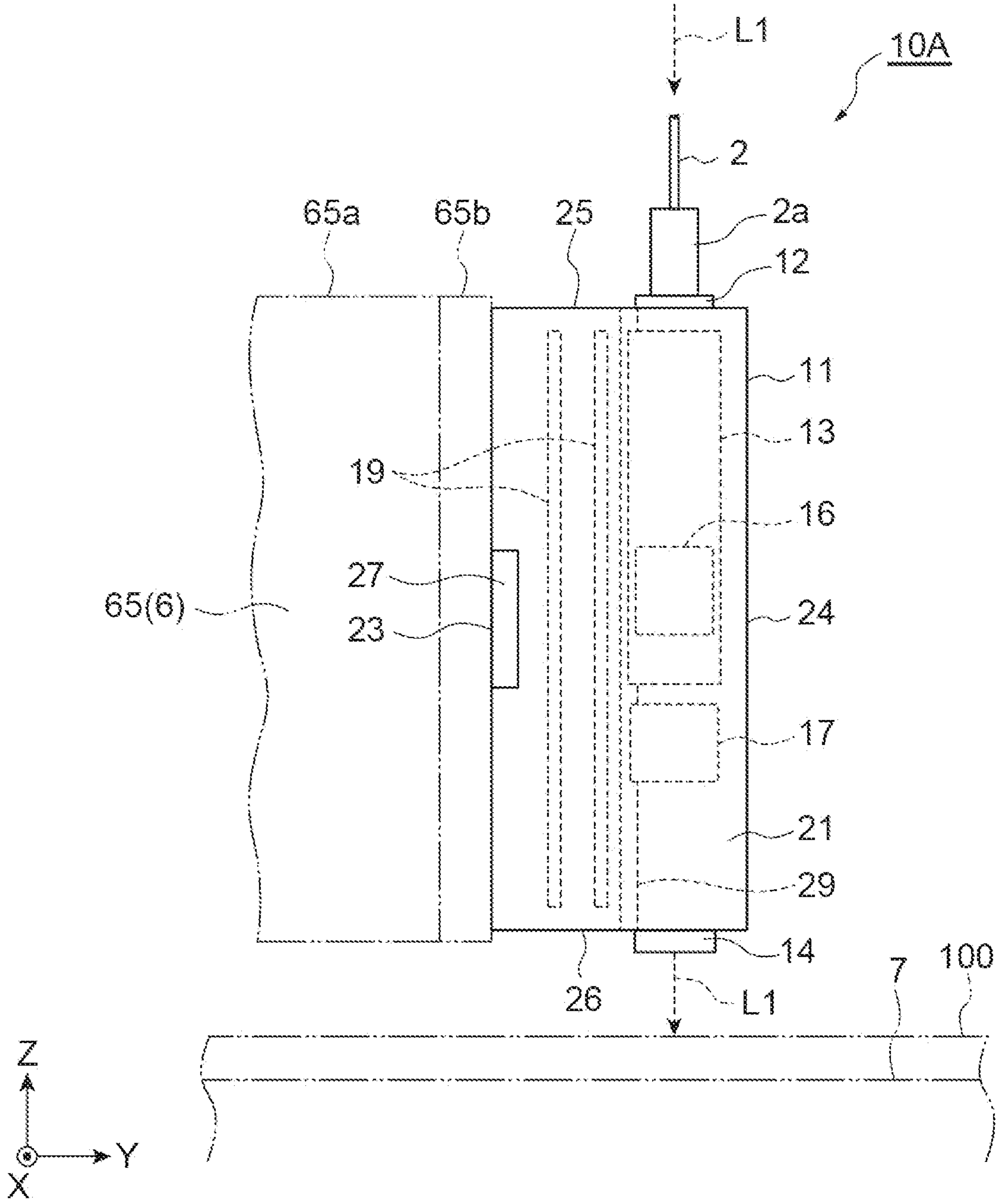
FIG. 3 is a front view of a laser processing head of the laser processing apparatus shown in FIG. 1.
Figure 4:
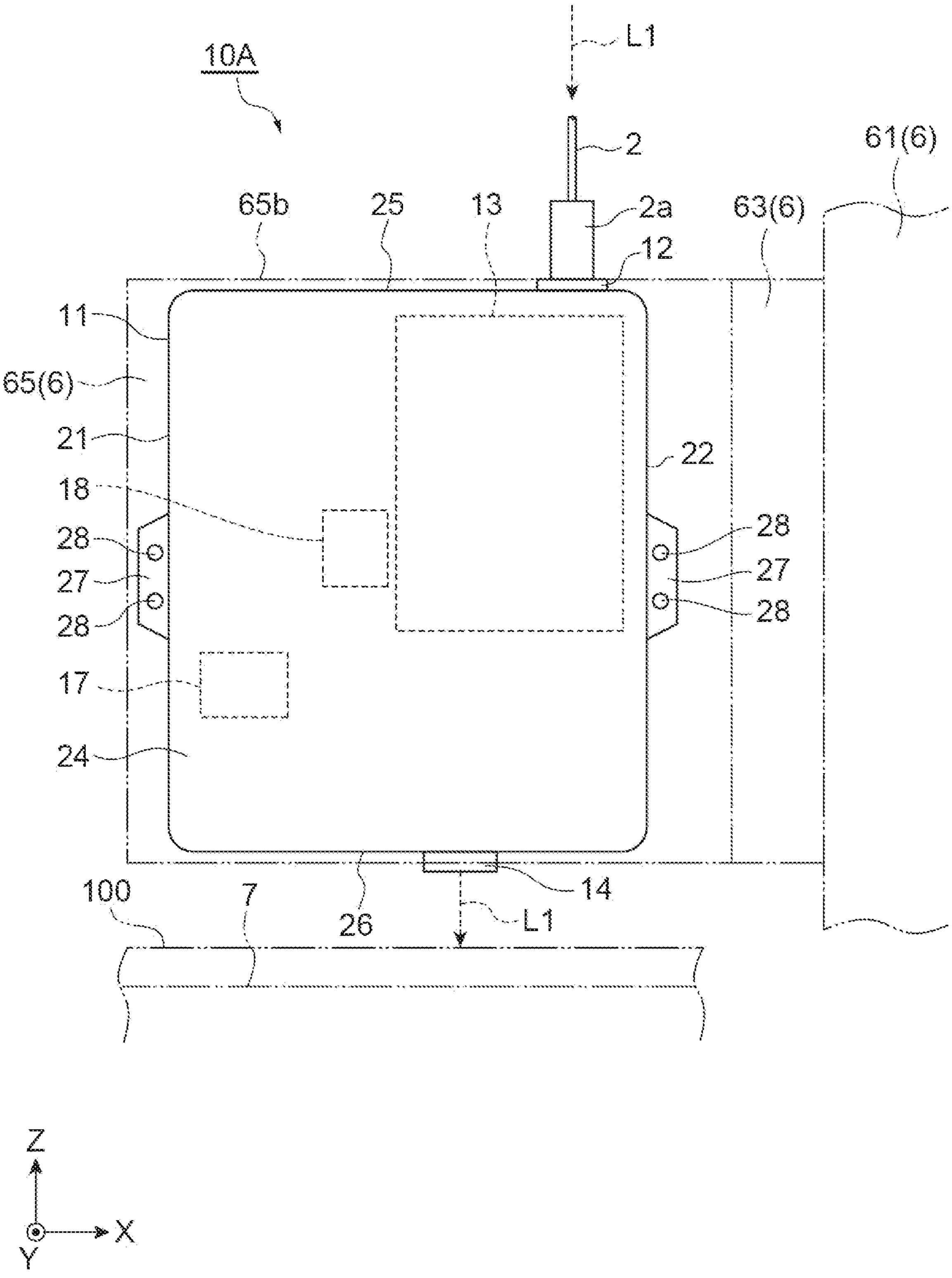
FIG. 4 is a side view of the laser processing head shown in FIG. 3.

As shown in FIGS. 3 and 4, the laser processing head 10A includes a housing 11, an incident driving portion 12, an adjuster 13, and a light-condensing driving portion 14.

The housing 11 has a pair of a first wall 21 and a second wall 22, a pair of a third wall 23 and a fourth wall 24, and a pair of a fifth wall 25 and a sixth wall 26. The first wall 21 and the second wall 22 are counter to each other in the X direction. The third wall 23 and the fourth wall 24 are counter to each other in the Y direction The fifth wall 25 and the sixth wall 26 are counter to each other in the Z direction The distance between the third wall 23 and the fourth wall 24 is smaller than the distance between the first wall 21 and the second wall 22. The distance between the first wall 21 and the second wall 22 is smaller than the distance between the fifth wall 25 and the sixth wall 26. The distance between the first wall 21 and the second wall 22 may be made equal to the distance between the fifth wall 25 and the sixth wall 26, or may be made larger than the same.

In the laser processing head 10A, the first wall 21 is located opposite to the fixed driving portion 61 of the moving mechanism 6, while the second wall 22 is located closer to the fixed driving portion 61. The third wall 23 is located closer to the fitting driving portion 65 of the moving mechanism 6, while the fourth wall 24 is located opposite to the fitting driving portion 65 and closer to the laser processing head 10B (see FIG. 2). The fifth wall 25 is located opposite to the support portion 7, while the sixth wall 26 is located closer to the support portion 7.

The housing 11 is configured such that the housing 11 is fitted to the fitting driving portion 65, with the third wall 23 disposed on the fitting driving portion 65 of the moving mechanism 6. More specific description is given as follows. The fitting driving portion 65 has a base plate 65*a* and a fitting plate 65*b*. The base plate 65*a* is fitted on the rails laid on the moving driving portion 63 (see FIG. 2). The fitting plate 65*b* is erected on an end of base plate 65*a* that is closer to the laser processing head 10B (see FIG. 2). The housing 11 is fitted to the fitting driving portion 65 by screwing bolts 28 to the fitting plate 65*b* via pedestals 27 as the third wall 23 is kept in contact with the fitting plate 65*b*. The pedestals 27 are provided on the first wall 21 and the second wall 22, respectively. The housing 11 can be fitted to or removed from the fitting driving portion 65.

The incident driving portion 12 is fitted to the fifth wall 25. The incident driving portion 12 causes the laser light L1 to enter the housing 11. The incident driving portion 12 is on a side closer to the second wall 22 (one wall side) in the X direction, and is on a side closer to the fourth wall 24 in the Y direction. In other words, the distance between the incident driving portion 12 and the second wall 22 in the X direction is smaller than the distance between the incident driving portion 12 and the first wall 21 in the X direction, and the distance between the incident driving portion 12 and the fourth wall 24 in the Y direction is smaller than the distance between the incident driving portion 12 and the third wall 23 in the X direction.

The incident driving portion 12 is configured such that a connection end 2*a* of the optical fiber 2 can be connected to the incident driving portion 12. The connection end 2*a* of the optical fiber 2 is provided with a collimator lens that collimates the laser light L1 coining out of an emission end of the fiber, but is not provided with an isolator that suppresses return light. The isolator is disposed on a part of the fiber, the part being closer to the light source 81 than to the connection end 2*a*. This arrangement contributes to miniaturization of the connection end 2*a*, thus contributing to miniaturization of the incident driving portion 12. It should be noted, however, that the connection end 2*a* of the optical fiber 2 may be provided with the isolator.

The adjuster 13 is disposed in the housing 11. The adjuster 13 adjusts the incoming laser light L1 from the incident driving portion 12. Components the adjuster 13 has are mounted on an optical base 29 provided in the housing 11. The optical base 29 is fitted to the housing 11 in such a way as to partition an area inside the housing 11 into a subarea on the third wall 23 side and a subarea on the fourth wall 24 side. Being fitted to the housing 11, the optical base 29 serves as its integral part. The components the adjuster 13 has are mounted on the optical base 29 on the fourth wall 24 side. Details of the components the adjuster 13 has will be described later.

The light-condensing driving portion 14 is disposed on the sixth wall 26. Specifically, the light-condensing driving portion 14 is disposed on the sixth wall 26 in such a way that the light-condensing driving portion 14 is inserted in a hole 26*a* formed on the sixth wall 26 (see FIG. 5). The light-condensing driving portion 14 condenses the laser light L1 adjusted by the adjuster 13 and sends the condensed laser light L1 out of the housing 11. The light-condensing driving portion 14 is on the side closer to the second wall 22 (one wall side) in the X direction, and is on the side closer to the fourth wall 24 in the Y direction. In other words, the distance between the light-condensing driving portion 14 and the second wall 22 in the X direction is smaller than the distance between the light-condensing driving portion 14 and the first wall 21 in the X direction, and the distance between the light-condensing driving portion 14 and the fourth wall 24 in the Y direction is smaller than the distance between the light-condensing driving portion 14 and the third wall 23 in the X direction.

Figure 5:
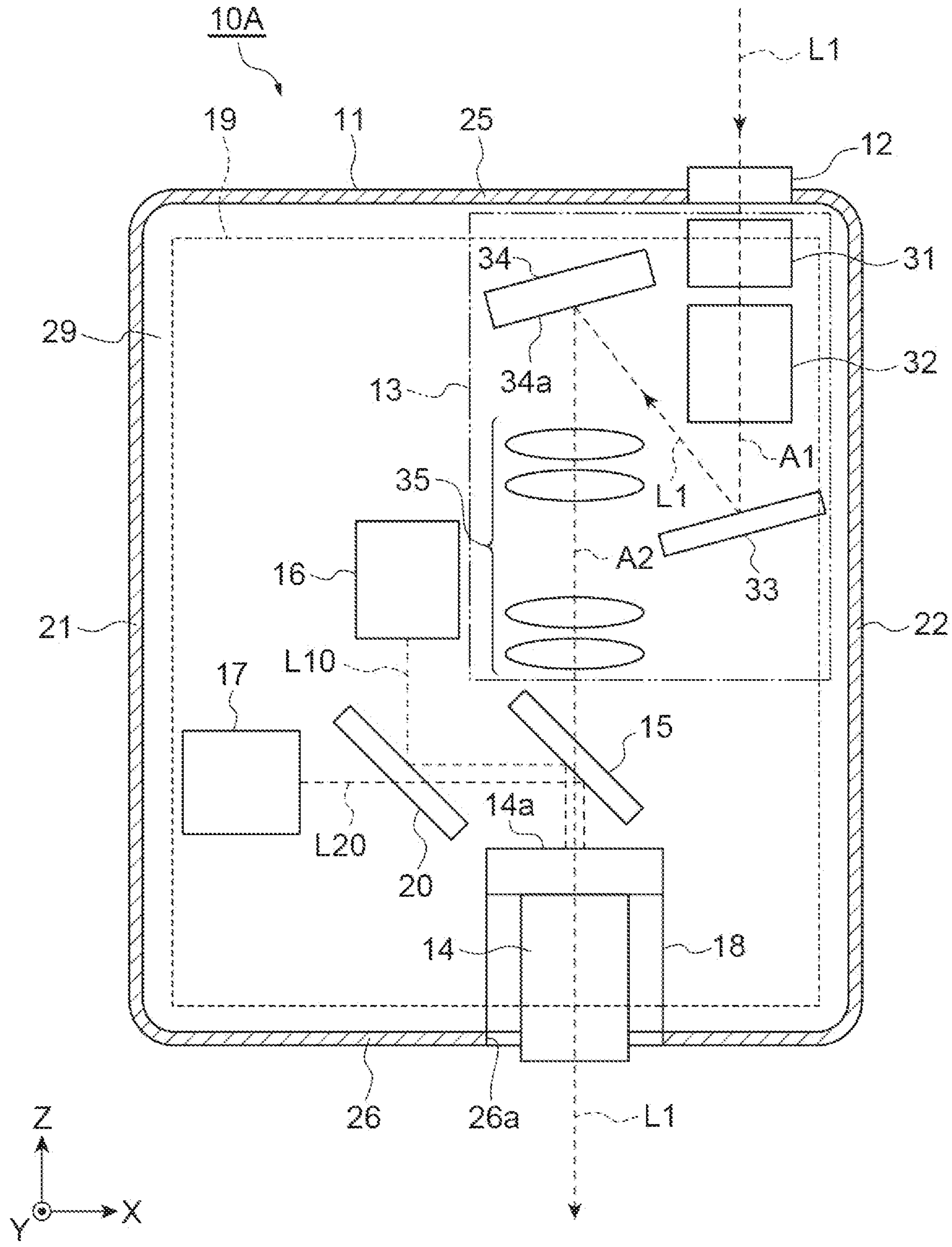
FIG. 5 is a configuration diagram of an optical system of the laser processing head shown in FIG. 3.

As shown in FIG. 5, the adjuster 13 includes an attenuator 31, a beam expander 32, and a mirror 33. The incident driving portion 12, and the attenuator 31, the beam expander 32, and the mirror 33 of the adjuster 13 are aligned on a straight line (first straight line) A1 extending along the Z direction. The attenuator 31 and the beam expander 32 are arranged between the incident driving portion 12 and the mirror 33 on the straight line A1. The attenuator 31 adjusts the power output of the laser light L1 coining from the incident driving portion 12. The beam expander 32 expands the diameter of the laser light L1 whose power output has been adjusted by the attenuator 31. The mirror 33 reflects the laser light L1 whose diameter has been expanded by the beam expander 32.

The adjuster 13 further includes a reflective spatial light modulator 34 and an imaging optical system 35. The reflective spatial light modulator 34 and the imaging optical system 35 of the adjuster 13, and the light-condensing driving portion 14 are aligned on a straight line (second straight line) A2 extending along the Z direction. The reflective spatial light modulator 34 modulates the laser light L1 reflected by the mirror 33. The reflective spatial light modulator 34 is, for example, a spatial light modulator (SLM) of a liquid crystal on silicon (LCOS) type. The imaging optical system 35 makes up a double-side telecentric optical system in which a reflection surface 34*a* of the reflective spatial light modulator 34 and an entrance pupil surface 14*a* of the light-condensing driving portion 14 have an imaging relationship. The imaging optical system 35 is composed of three or more lenses.

The straight line A1 and the straight line A2 are on a plane perpendicular to the Y direction. The straight line A1 is located closer to the second wall 22 (one wall side) than the straight line A2. In the laser processing head 10A, the laser light L1 coining from the incident driving portion 12 into the housing 11 travels along the straight line A1, is reflected by the mirror 33 and the reflective spatial light modulator 34 in sequence, proceeds further along the straight line A2, and travels through the light-condensing driving portion 14 to come out of the housing 11. The order of arrangement of the attenuator 31 and the beam expander 32 may be reverse to the order. The attenuator 31 may be disposed between the mirror 33 and the reflective spatial light modulator 34. The adjuster 13 may include other optical components (e.g., a steering mirror or the like disposed in front of the beam expander 32).

The laser processing head 10A further includes a dichroic mirror 15, a measurement driving portion 16, an observation driving portion 17, a driving portion 18, and a circuit 19.

The dichroic mirror 15 is disposed between the imaging optical system 35 and the light-condensing driving portion 14 on the straight line A2. In other words, the dichroic mirror 15 is disposed between the adjuster 13 and the light-condensing driving portion 14 in the housing 11. The dichroic mirror 15 is mounted to the optical base 29 on the fourth wall 24 side. The dichroic mirror 15 transmits the laser light L1. From the viewpoint of suppressing astigmatism, the dichroic mirror 15 may be provided as a specific form of dichroic mirror, which is, for example, a cube-shaped one or a dichroic mirror composed of two plates arranged into a twisted positional relationship.

In the housing 11, the measurement driving portion 16 is disposed closer to the first wall 21 (the side opposite to the one wall side) than the adjuster 13. The measurement driving portion 16 is mounted to the optical base 29 on the fourth wall 24 side. The measurement driving portion 16 outputs measurement light L10 for measuring the distance between a surface of the object 100 (e.g., a surface on which the laser light L1 is incident) and the light-condensing driving portion 14, and detects the measurement light L10 reflected by the surface of the object 100, via the light-condensing driving portion 14. Specifically, the measurement light L10 outputted from the measurement driving portion 16 travels through the light-condensing driving portion 14 and falls on the surface of the object 100. The measurement light L10 reflected by the surface of the object 100 then travels back through the light-condensing driving portion 14 to reach the measurement driving portion 16, which detects the reflected measurement light L10.

More specifically, the measurement light L10 outputted from the measurement driving portion 16 is reflected by the beam splitter 20 and the dichroic mirror 15 in sequence, the beam splitter 20 and dichroic mirror 15 being mounted to the optical base 29 on the fourth wall 24 side, and travels through the light-condensing driving portion 14 to come out of the housing 11. The measurement light L10 reflected by the surface of the object 100 travels back through the light-condensing driving portion 14 into the housing 11, is reflected by the dichroic mirror 15 and the beam splitter 20 in sequence, and falls on the measurement driving portion 16, which detects the reflected measurement light L10.

In the housing 11, the observation driving portion 17 is disposed closer to the first wall 21 (the side opposite to the one wall side), relative to the adjuster 13. The observation driving portion 17 is mounted to the optical base 29 on the fourth wall 24 side. The observation driving portion 17 outputs observation light L20 for observing the surface of the object 100 (e.g., the surface on which the laser light L1 is incident), and detects the observation light L20 reflected by the surface of the object 100, via the light-condensing driving portion 14. Specifically, the observation light L20 outputted from the observation driving portion 17 travels through the light-condensing driving portion 14 and falls on the surface of the object 100. The observation light L20 reflected by the surface of the object 100 then travels back through the light-condensing driving portion 14 to reach the observation driving portion 17, which detects the reflected observation light L20.

More specifically, the observation light L20 outputted from the observation driving portion 17 penetrates through the beam splitter 20, is reflected by the dichroic mirror 15, and travels through the light-condensing driving portion 14 to come out of the housing 11. The observation light L20 reflected by the surface of the object 100 travels back through the light-condensing driving portion 14 into the housing 11, is reflected by the dichroic mirror 15, and penetrates through the beam splitter 20 to fall on the observation driving portion 17, which detects the reflected observation light L20. Respective wavelengths of the laser light L1, the measurement light L10, and the observation light L20 are different from each other (at least their respective center wavelengths are shifted from each other).

The driving portion 18 is mounted to the optical base 29 on the fourth wall 24 side. The driving portion 18 causes the light-condensing driving portion 14 disposed on the sixth wall 26 to move along the Z direction, by, for example, a driving force of a piezoelectric element.

In the housing 11, the circuit 19 is disposed on the third wall 23 side, with respect to the optical base 29. In other words, in the housing 11, the circuit 19 is disposed closer to the third wall 23 than the adjuster 13, the measurement driving portion 16, and the observation driving portion 17. The circuit 19 is, for example, a plurality of circuit boards. The circuit 19 processes a signal outputted from the measurement driving portion 16 and processes a signal inputted to the reflective spatial light modulator 34 as well. The circuit 19 controls the driving portion 18, based on the signal outputted from the measurement driving portion 16. For example, based on the signal outputted from the measurement driving portion 16, the circuit 19 controls the driving portion 18 in such a way as to keep the distance between the surface of the object 100 and the light-condensing driving portion 14 constant (that is, to keep the distance between the surface of the object 100 and the focusing point of the laser light L1 constant.). The housing 11 is provided with a connector (not illustrated) to which wires are connected, the wires electrically connecting the circuit 19 to the controller 9 (see FIG. 1) or the like.

Similar to the laser processing head 10A, the laser processing head 10B includes the housing 11, the incident driving portion 12, the adjuster 13, the light-condensing driving portion 14, the dichroic mirror 15, the measurement driving portion 16, the observation driving portion 17, the driving portion 18, and the circuit 19. It should be noted, however, that, as shown in FIG. 2, respective components of the laser processing head 10B are arranged plane symmetrical with respective components of the laser processing head 10A, with respect to a virtual plane passing through a midpoint between the pair of fitting driving portions 65 and 66 and perpendicular to the Y direction.

For example, the housing (first housing) 11 of the laser processing head 10A is fitted to the fitting driving portion 65 such that the fourth wall 24 is closer to the laser processing head 10B than the third wall 23 and that the sixth wall 26 is closer to the support portion 7 than the fifth wall 25. The housing (second housing) 11 of the laser processing head 10B, on the other hand, is fitted to the fitting driving portion 66 such that the fourth wall 24 is closer to the laser processing head 10A than the third wall 23 and that the sixth wall 26 is closer to the support portion 7 than the fifth wall 25

The housing 11 of the laser processing head 10B is configured such that the housing 11 is fitted to the fitting driving portion 66, with the third wall 23 disposed on the fitting driving portion 66. More specific description is given as follows. The fitting driving portion 66 has a base plate 66*a* and a fitting plate 66*b*. The base plate 66*a* is fitted on the rails laid on the moving driving portion 63. The fitting plate 66*b* is erected on an end of base plate 66*a* that is closer to the laser processing head 10A. The housing 11 of the laser processing head 10B is fitted to the fitting driving portion 66, with the third wall 23 kept in contact with the fitting plate 66*b*. The housing 11 of the laser processing head 10B can be fitted to or removed from the fitting driving portion 66.

Advantages and Effects

According to the laser processing head 10A, the light source that outputs the laser light L1 is not disposed in the housing 11. This allows miniaturization of the housing 11. In the housing 11, the distance between the third wall 23 and the fourth wall 24 is smaller than the distance between the first wall 21 and the second wall 22, and the light-condensing driving portion 14 disposed on the sixth wall 26 is on the side closer to the fourth wall 24 in the Y direction. As a result, when the housing 11 is moved along the direction perpendicular to the optical axis of the light-condensing driving portion 14, for example, even if a different component (e.g., the laser processing head 10B) is present on the fourth wall 24 side, the light-condensing driving portion 14 can be brought closer to the different component. According to the laser processing head 10A, therefore, the light-condensing driving portion 14 may be moved along the direction perpendicular to the optical axis of the light-condensing driving portion 14.

In the laser processing head 10A, the incident driving portion 12 is disposed on the fifth wall 25 such that the incident driving portion 12 is on the side closer to the fourth wall 24 in the Y direction. As a result, in the area in the housing 11, a different component (e.g., the circuit 19) is disposed in the subarea on the third wall 23 side, relative to the adjuster 13, in which case the subarea can be used effectively.

In the laser processing head 10A, the light-condensing driving portion 14 is on the side closer to the second wall 22 in the X direction. As a result, when the housing 11 is moved along the direction perpendicular to the optical axis of the light-condensing driving portion 14, for example, even if a different component is present on the second wall 22 side, the light-condensing driving portion 14 can be brought closer to the different component.

In the laser processing head 10A, the incident driving portion 12 is disposed on the fifth wall 25 such that the incident driving portion 12 is on the side closer to the second wall 22 in the X direction. As a result, in the area in the housing 11, a different component (e.g., the measurement driving portion 16 and the observation driving portion 17) is disposed in the subarea on the first wall 21 side, relative to the adjuster 13, in which case the subarea can be used effectively.

In the laser processing head 10A, the measurement driving portion 16 and the observation driving portion 17 are disposed in the subarea on the first wall 21 side, relative to the adjuster 13, in the region in the housing 11, the circuit 19 is disposed in the subarea on the third wall 23 side, relative to the adjuster 13, in the region in the housing 11, and the dichroic mirror 15 is disposed between the adjuster 13 and the light-condensing driving portion 14 in the housing 11. In this manner, the area in the housing 11 can be used effectively. In addition, the laser processing apparatus 1 is allowed to carry out processing based on results of measurement of the distance between the surface of the object 100 and the light-condensing driving portion 14. The laser processing apparatus 1 is also allowed to carry out processing based on results of observation of the surface of the object 100.

In the laser processing head 10A, the circuit 19 controls the driving portion 18, based on a signal outputted from the measurement driving portion 16. As a result, the position of the focusing point of the laser light L1 can be adjusted, based on results of measurement of the distance between the surface of the object 100 and the light-condensing driving portion 14.

In the laser processing head 10A, the incident driving portion 12, and the attenuator 31, the beam expander 32, and the mirror 33 of the adjuster 13 are aligned on the straight line A1 extending along the Z direction, while the reflective spatial light modulator 34 and the imaging optical system 35 of the adjuster 13, and the light-condensing driving portion 14 are aligned on the straight line A2 extending along the Z direction. As a result, the adjuster 13 including the attenuator 31, the beam expander 32, the reflective spatial light modulator 34, and the imaging optical system 35 can be configured in a compact form.

In the laser processing head 10A, the straight line A1 is located closer to the second wall 22, relative to the straight line A2. As a result, when a different optical system using the light-condensing driving portion 14 (e.g., the measurement driving portion 16 and the observation driving portion 17) is disposed in the subarea on the first wall 21 side, relative to the adjuster 13, in the area in the housing 11, a degree of freedom in configuring the different optical system can be improved.

The above advantages and effects are achieved also by the laser processing head 10B.

In the laser processing apparatus 1, the light-condensing driving portion 14 of the laser processing head 10A, the light-condensing driving portion 14 being on the housing 11 of the laser processing head 10A, is on the side closer to the laser processing head 10B, while the light-condensing driving portion 14 of the laser processing head 10B, the light-condensing driving portion 14 being on the housing 11 of the laser processing head 10B, is on the side closer to the laser processing head 10A. As a result, when the pair of laser processing heads 10A and 10B are each moved along the Y direction, the light-condensing driving portion 14 of the laser processing head 10A and the light-condensing driving portion 14 of the laser processing head 10B can be brought closer to each other. This allows the laser processing apparatus 1 to process the object 100 efficiently.

In the laser processing apparatus 1, the pair of fitting driving portions 65 and 66 each move along the Y direction and along the Z direction. As a result, the object 100 can be processed more efficiently.

In the laser processing apparatus 1, the support portion 7 moves along the X direction and along the Y direction, and rotates about the axis, i.e., center line parallel to the Z direction. As a result, the object 100 can be processed more efficiently.

[Modifications]

Figure 6:
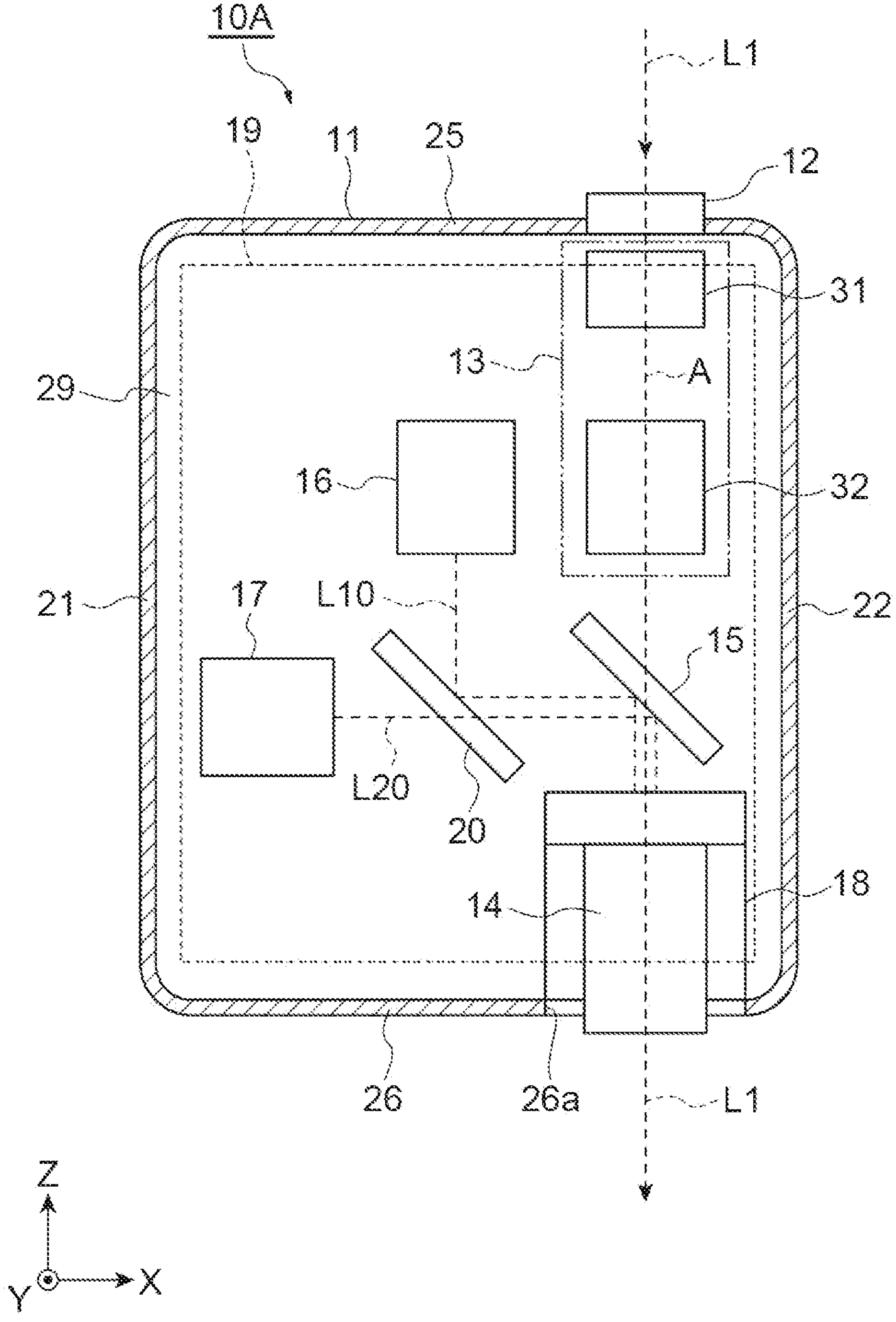
FIG. 6 is a configuration diagram of an optical system of a laser processing head according to a modification.

For example, as shown in FIG. 6, the incident driving portion 12, the adjuster 13, and the light-condensing driving portion 14 may be aligned on the straight line A extending along the Z direction. This makes the adjuster 13 compact in configuration. In this case, the adjuster 13 may not include the reflective spatial light modulator 34 and the imaging optical system 35. The adjuster 13, however, may include the attenuator 31 and the beam expander 32. This makes the adjuster 13 including the attenuator 31 and the beam expander 32 compact in configuration. The order of arrangement of the attenuator 31 and the beam expander 32 may be reverse to the order.

The housing 11 is configured such that the housing 11 is fitted to the fitting driving portion 65 (or the fitting driving portion 66), with at least one of the first wall 21, the second wall 22, the third wall 23, and the fifth wall 25 disposed on the fitting driving portion 65 (or the fitting driving portion 66) of the laser processing apparatus 1. The light-condensing driving portion 14 is at least on the side closer to the fourth wall 24 in the Y direction. According to these arrangements, when the housing 11 is moved along the Y direction, for example, even if a different component is present on the fourth wall 24 side, the light-condensing driving portion 14 can be brought closer to the different component. In addition, when the housing 11 is moved along the Z direction, for example, the light-condensing driving portion 14 can be brought closer to the object 100.

The light-condensing driving portion 14 may be on the side closer to the first wall 21 in the X direction. In this configuration, when the housing 11 is moved along the direction perpendicular to the optical axis of the light-condensing driving portion 14, for example, even if a different component is present on the first wall 21 side, the light-condensing driving portion 14 can be brought closer to the different component. In this case, the incident driving portion 12 may be on the side closer to the first wall 21 in the X direction. In this configuration, in the area in the housing 11, a different component (e.g., the measurement driving portion 16 and the observation driving portion 17) is disposed in the subarea on the second wall 22 side, relative to the adjuster 13, in which case the subarea can be used effectively.

Figure 7:
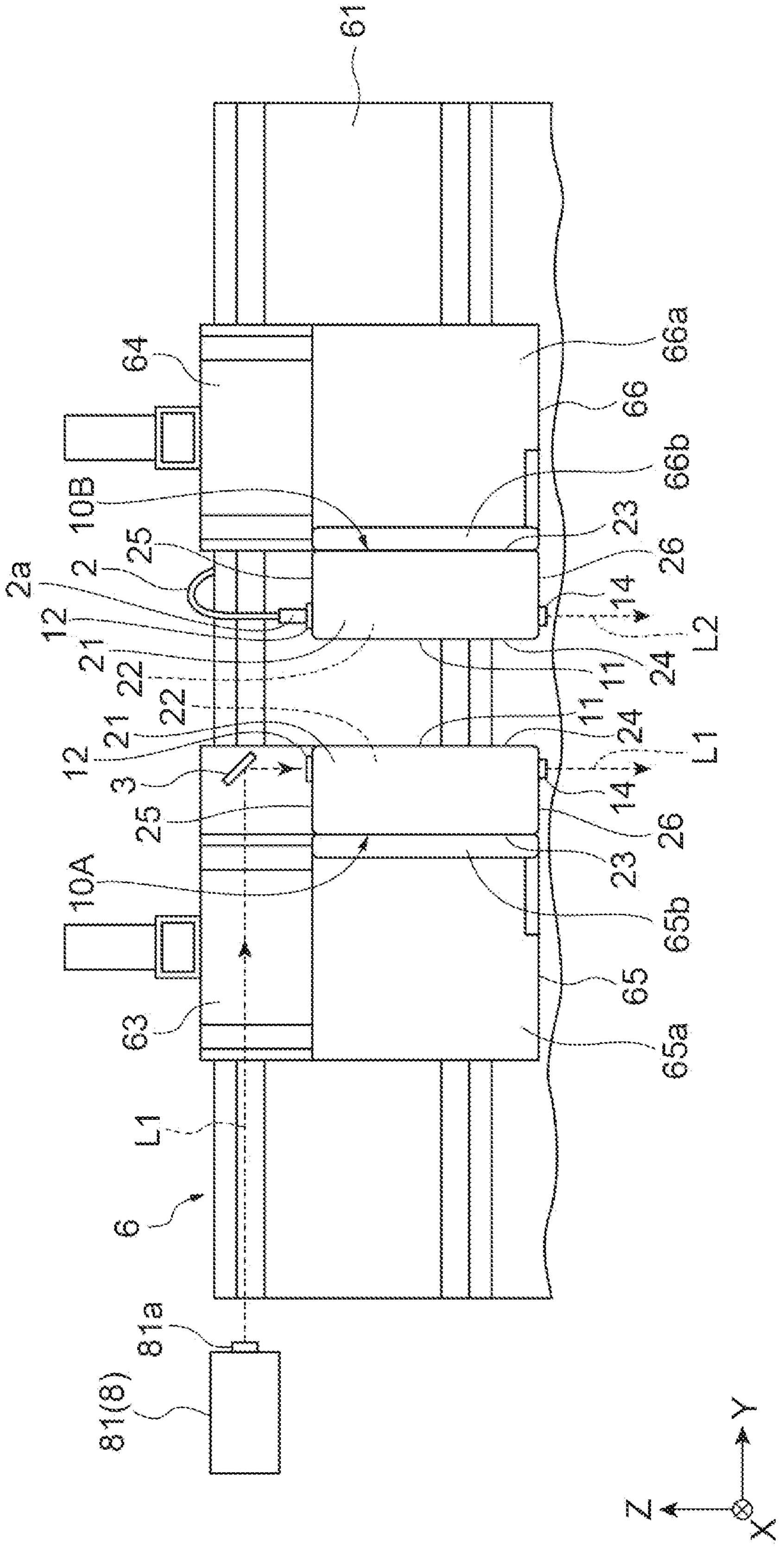
FIG. 7 is a front view of a part of a laser processing apparatus according to the modification.

At least one of guiding the laser light L1 from the emitting driving portion 81*a* of the light source portion 8 to the incident driving portion 12 of the laser processing head 10A and guiding the laser light L2 from the emitting driving portion 82*a* of the light source portion 8 to the incident driving portion 12 of the laser processing head 10B may be implemented by a mirror. FIG. 7 is a front view of a part of the laser processing apparatus 1 that guides the laser light L1 by a mirror. In a configuration shown in FIG. 7, a mirror 3, which reflects the laser light L1, is attached to the moving driving portion 63 of the moving mechanism 6 such that the mirror 3 is counter to the emitting driving portion 81*a* of the light source portion 8 in the Y direction and to the incident driving portion 12 of the laser processing head 10A in the Z direction.

In the configuration shown in FIG. 7, even when the moving driving portion 63 of the moving mechanism 6 is moved along the Y direction, a state of the mirror 3 being counter to the emitting driving portion 81*a* of the light source portion 8 in the Y direction is maintained. In addition, even when the fitting driving portion 65 of the moving mechanism 6 is moved along the Z direction, a state of the mirror 3 being counter to the incident driving portion 12 of the laser processing head 10A in the Z direction is maintained. Thus, regardless of the position of the laser processing head 10A, the laser light L1 emitted from the emitting driving portion 81*a* of the light source portion 8 can be made incident certainly on the incident driving portion 12 of the laser processing head 10A. Besides, light guiding by the mirror allows use of a light source with difficulty in light guiding through the optical fiber 2, such as a high-output long/short pulse laser.

In the configuration shown in FIG. 7, the mirror 3 may be attached to the moving driving portion 63 of the moving mechanism 6 in such way as to allow at least one of angle adjustment and position adjustment of the mirror 3. According to this configuration, the laser light L1 emitted from the emitting driving portion 81*a* of the light source portion 8 can be made incident more certainly on the incident driving portion 12 of the laser processing head 10A.

The light source portion 8 may have one light source. In such a case, the light source portion 8 is configured to let part of the laser light, which is outputted from the one light source, come out of the emitting driving portion 81*a*, while letting the rest of the laser light come out of the emitting driving portion 82*b*.

The laser processing apparatus 1 may include one laser processing head 10A. In the laser processing apparatus 1 including one laser processing head 10A, when the housing 11 is moved along the Y direction perpendicular to the optical axis of the light-condensing driving portion 14, for example, even if a different component is present on the fourth wall 24 side, the light-condensing driving portion 14 can be brought closer to the different component. The laser processing apparatus 1 including one laser processing head 10A is, therefore, able to process the object 100 efficiently. In the laser processing apparatus 1 including one laser processing head 10A, when the fitting driving portion 65 is moved along the Z direction, the object 100 can be processed more efficiently. In the laser processing apparatus 1 including one laser processing head 10A, when the support portion 7 is moved along the X direction and is rotated about the axis, i.e., center line parallel to the Z direction, the object 100 can be processed more efficiently.

Figure 8:
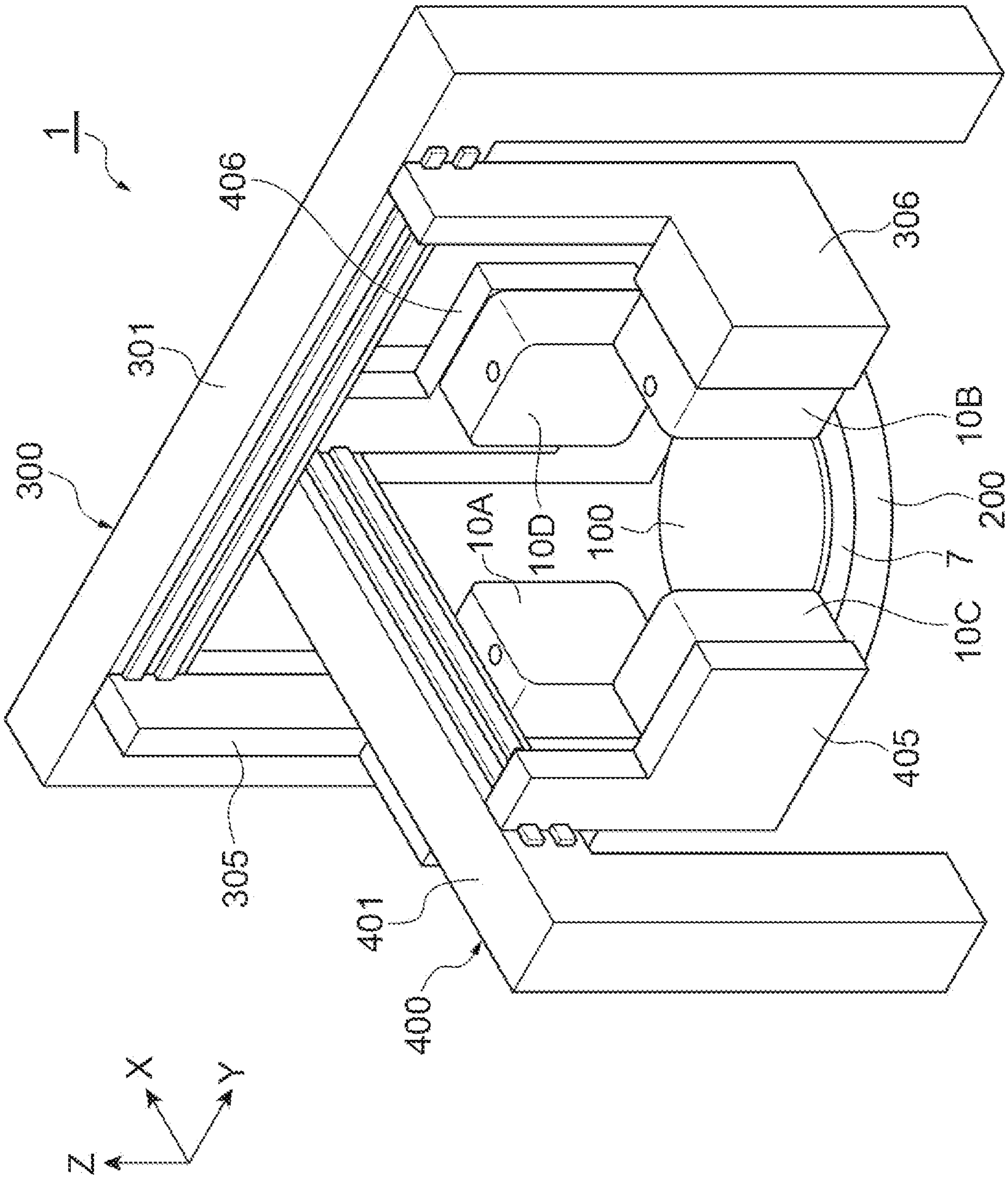
FIG. 8 is a perspective view of a laser processing apparatus according to a modification.

The laser processing apparatus 1 may include three or more laser processing heads. FIG. 8 is a perspective view of a laser processing apparatus 1 including two pairs of laser processing heads. The laser processing apparatus 1 shown in FIG. 8 includes a plurality of moving mechanisms 200, 300, and 400, the support portion 7, a pair of laser processing heads 10A and 10B, a pair of laser processing heads 10C and 10D, and a light source portion (not illustrated).

The moving mechanism 200 moves the support portion 7 along the X direction, the Y direction, and the Z direction, and rotates the support portion 7 about the axis, i.e., center line parallel to the Z direction.

The moving mechanism 300 includes a fixed driving portion 301, and a pair of fitting driving portions (a first fitting driving portion and a second fitting driving portion) 305 and 306. The fixed driving portion 301 is mounted to a device frame (not illustrated). The pair of fitting driving portions 305 and 306 are fitted on rails laid on the fixed driving portion 301, and are each able to move independently along the Y direction.

The moving mechanism 400 includes a fixed driving portion 401, and a pair of fitting driving portions (a first fitting driving portion and a second fitting driving portion) 405 and 406. The fixed driving portion 401 is mounted to the device frame (not illustrated). The pair of fitting driving portions 405 and 406 are fitted on rails laid on the fixed driving portion 401, and are each able to move independently along the X direction. The rails of the fixed driving portion 401 are arranged in such a way as to three-dimensionally cross the rails of the fixed driving portion The laser processing head 10A is fitted to the fitting driving portion 305 of the moving mechanism 300. The laser processing head 10A in a state of being counter to the support portion 7 in the Z direction emits a laser light onto the object 100 supported by the support portion 7. The laser light emitted from the laser processing head 10A is the laser light from a light source portion (not illustrated) that is guided by the optical fiber 2. The laser processing head 10B is fitted to the fitting driving portion 306 of the moving mechanism 300. The laser processing head 10B in a state of being counter to the support portion 7 in the Z direction emits a laser light onto the object 100 supported by the support portion 7. The laser light emitted from the laser processing head 10B is the laser light from a light source portion (not illustrated) that is guided by the optical fiber 2.

The laser processing head 10C is fitted to the fitting driving portion 405 of the moving mechanism 400. The laser processing head 10C in a state of being counter to the support portion 7 in the Z direction emits a laser light onto the object 100 supported by the support portion 7. The laser light emitted from the laser processing head 10C is the laser light from a light source portion (not illustrated) that is guided by the optical fiber 2. The laser processing head 10D is fitted to the fitting driving portion 406 of the moving mechanism 400. The laser processing head 10D in a state of being counter to the support portion 7 in the Z direction emits a laser light onto the object 100 supported by the support portion 7. The laser light emitted from the laser processing head 10D is the laser light from a light source portion (not illustrated) that is guided by the optical fiber 2.

A configuration of the pair of laser processing heads 10A and 10B of the laser processing apparatus 1 shown in FIG. 8 is identical with the configuration of the pair of laser processing heads 10A and 10B of the laser processing apparatus 1 shown in FIG. 1. A configuration of the pair of laser processing heads 10C and 10D of the laser processing apparatus 1 shown in FIG. 8 is identical with a configuration of the pair of laser processing heads 10A and 10B of the laser processing apparatus 1 shown in FIG. 1, the laser processing heads 10A and 10B being rotated by 90 degrees about the axis, i.e., center line parallel to the Z direction.

For example, the housing (first housing) 11 of the laser processing head 10C is fitted to the fitting driving portion 65 such that the fourth wall 24 is located closer to the laser processing head 10D, relative to the third wall 23, and that the sixth wall 26 is located closer to the support portion 7, relative to the fifth wall 25. The light-condensing driving portion 14 of the laser processing head 10C is on the side closer to the fourth wall 24 (that is, the side closer to the laser processing head 10D) in the Y direction.

The housing (second housing) 11 of the laser processing head 10D is fitted to the fitting driving portion 66 such that the fourth wall 24 is located closer to the laser processing head 10C, relative to the third wall 23, and that the sixth wall 26 is located closer to the support portion 7, relative to the fifth wall 25. The light-condensing driving portion 14 of the laser processing head 10D is on the side closer to the fourth wall 24 (that is, the side closer to the laser processing head 10C) in the Y direction.

In the above configuration, according to the laser processing apparatus 1 shown in FIG. 8, when the pair of laser processing heads 10A and 10B are each moved along the Y direction, the light-condensing driving portion 14 of the laser processing head 10A and the light-condensing driving portion 14 of the laser processing head 10B can be brought closer to each other. Similarly, when the pair of laser processing heads 10C and 10D are each moved along the X direction, the light-condensing driving portion 14 of the laser processing head 10C and the light-condensing driving portion 14 of the laser processing head 10D can be brought closer to each other The laser processing heads and the laser processing apparatus are not limited to those for forming modified regions inside the object 100, and may be laser processing heads and a laser processing apparatus for carrying out other forms of laser processing.

An embodiment will then be described. In the following, a description overlapping the description of the above embodiment and modifications will be omitted.

Figure 9:
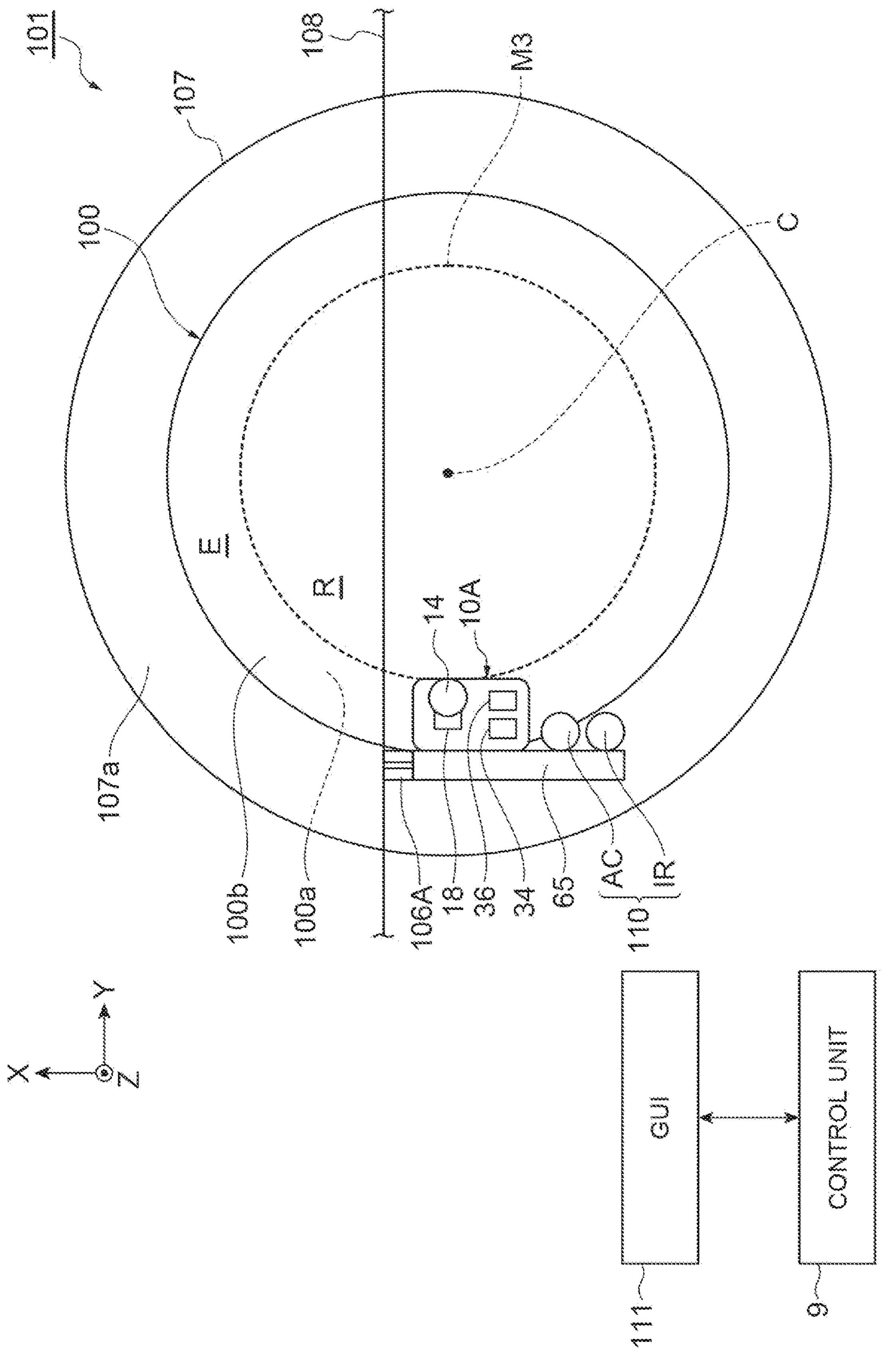
FIG. 9 is a plan view schematically showing a configuration of a laser processing apparatus according to a first embodiment.

A laser processing apparatus 101 shown in FIG. 9 is a device that emits a laser light onto the object 100, with a focusing position (focusing point, which is at least a part of a focusing area) properly set on the object 100, thereby forming a modified region in the object 100. The laser processing apparatus 101 carries out trimming processing, radiation cutting processing, and peeling processing on the object 100 to obtain (manufacture) a semiconductor device. The trimming processing is processing by which an unnecessary part is removed from the object 100. The radiation cut processing is processing by which the unnecessary part to be removed by the trimming processing is cut apart. The peeling processing is processing by which a part of the object 100 is peeled.

The object 100 is, for example, a semiconductor wafer of a disk shape. The object 100 is not limited to a specific object, and may be a variety of objects made of various materials or having various shapes. Functional elements (not illustrated) are formed on a surface 100*a* of the object 100. The functional elements are, for example, light-receiving elements, such as photodiodes, light-emitting elements, such as laser diodes, circuit elements, such as memories, or the like.

Figure 10:
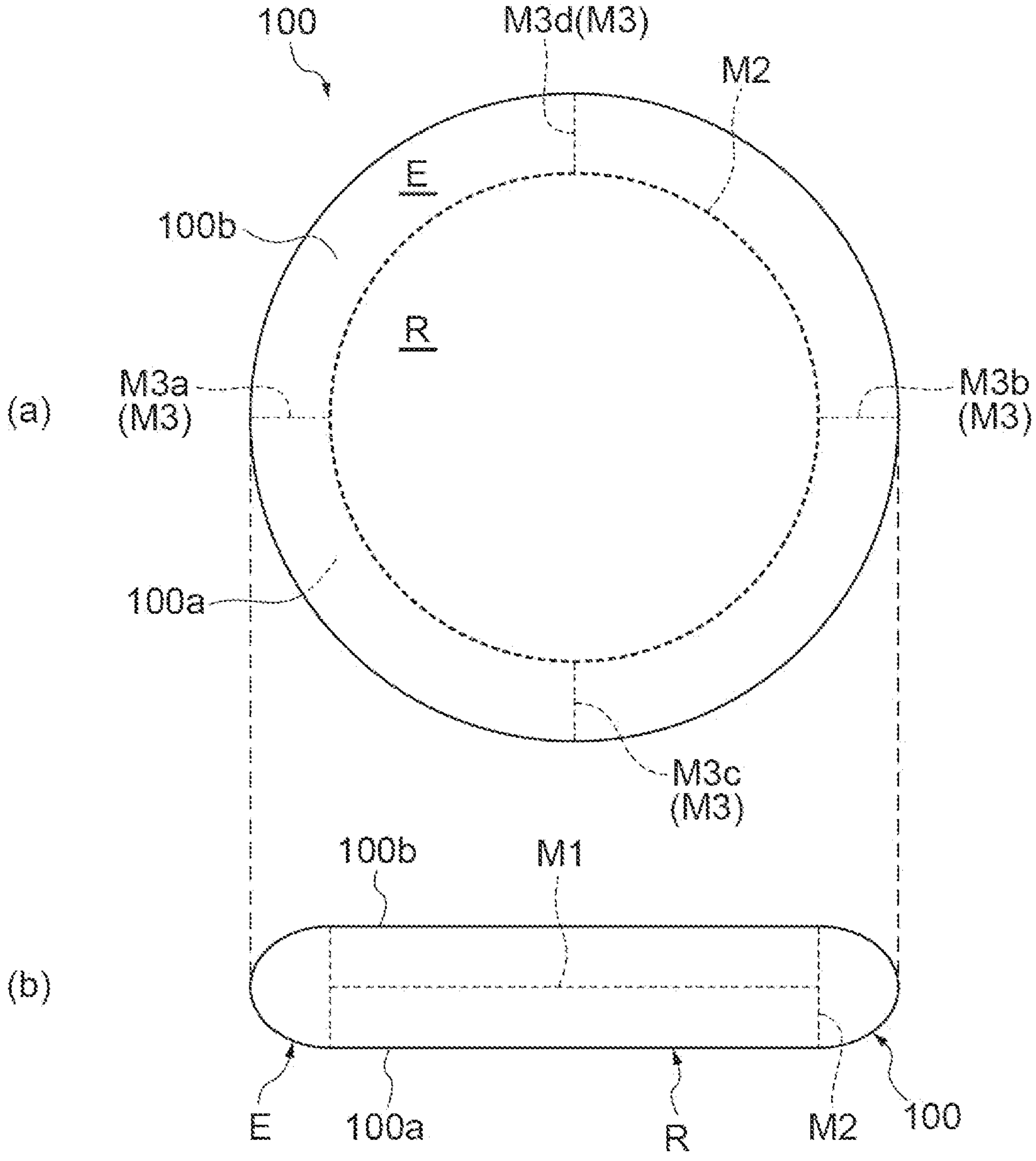
FIG. 10(*a*) of FIG. 10 is a plan view of an example of an object.

As shown in FIGS. 10(*a*) and 10(*b*), an effective area R and a removal area E are set in the object 100. The effective area R is a part corresponding to the semiconductor device to be obtained. The effective area R is a device area. For example, the effective area R is a disc-shaped part including a central part in a view in the direction of thickness of the object 100. The effective area R is an inner area inside the removal area E. The removal area E is an area of object 100 that is outside the effective area R. The removal area E is an outer edge part of object 100 that is different from the effective area R. For example, the removal area E is an annular part encircling the effective area R. The removal area E includes a peripheral part (a bevel part on the outer edge) in a view in the direction of thickness of the object 100. The removal area E is a radiation cut area to be subjected to the radiation cut processing.

In the object 100, a virtual plane M1 is set as a peeling-scheduled plane. The virtual plane M1 is a plane on which a modified region is scheduled to be formed by the peeling processing. The virtual plane M1 is a plane counter to a back surface 100*b* of the object 100, the back surface 100*b* being the laser light incident surface. The virtual plane M1 is parallel to the back surface 100*b*, and is, for example, circular-shaped. The virtual plane M1, which is a virtual area, is not limited to a plain surface but may be a curved surface or a three-dimensional surface. The effective area R, the removal area E, and the virtual plane M1 can be set by the controller 9. The effective area R, the removal area E, and the virtual plane M1 may be set by specifying their coordinates.

In the object 100, a line (annular line) M2 is set as a trimming-scheduled line. The line M2 is a line on which a modified region is scheduled to be formed by the trimming processing. The line M2 extends annularly inside the outer edge of the object 100. The line M2 shown in FIGS. 10(*a*) and 10(*b*) extends annually to draw a circle. The line M2 is set along a boundary between the effective area R and the removal area E in a part inside the object 100, the part being opposite to the laser light incident surface with respect to the virtual plane M1. The line M2 can be set by the controller 9. The line M2 is a virtual line, but may be an actually line drawn. The line M2 may be set by specifying its coordinates. This explanation of setting of the line M2 applies also to an explanation of setting of lines M3 to M5, which will be described later.

In the object 100, a line (linear line) M3 is set as a radiation-cut-scheduled line. The line M3 is a line on which a modified region is scheduled to be formed by the radiation cut processing. The line M3 extends linearly (radially) along the direction of radius of the object 100 in a view from the laser light incident surface. A plurality of the lines M3 are set such that the lines M3 divide the removal area E into equal parts (into four parts in FIGS. 10(*a*) and 10(*b*)) in the circumferential direction in a view from the laser light incident surface. In the example of FIGS. 10(*a*) and 10(*b*), the lines M3 include lines M3*a* and M3*b* extending in one direction in a view from the laser light incident surface, and lines M3*c* and M3*d* extending in a different direction perpendicular to the one direction.

As shown in FIG. 9, the laser processing apparatus 101 includes a stage 107, the laser processing head 10A, first Z-axis rails 106A, Y-axis rails 108, an imaging-capturing driving portion 110, a graphical user interface (GUI) 111, and the controller 9. The stage 107 is a support portion that supports the object 100. The stage 107 is similar in configuration to the support portion 7 (see FIG. 1). The object 100 is placed on a support surface 107*a* of the stage 107 such that the back surface 100*b* of the object 100 is set on the upper side as the laser light incident surface (i.e., the surface 100*a* is set on the lower side closer to the stage 107). The stage 107 has a spindle C provided at its center. The spindle C is a shaft extending along the Z direction that is the direction of the optical axis of the light-condensing driving portion 14. The stage 107 is capable of rotating about the spindle C. The stage 107 is caused to rotate by a driving force of a known driving portion, such as a motor.

Figure 11:
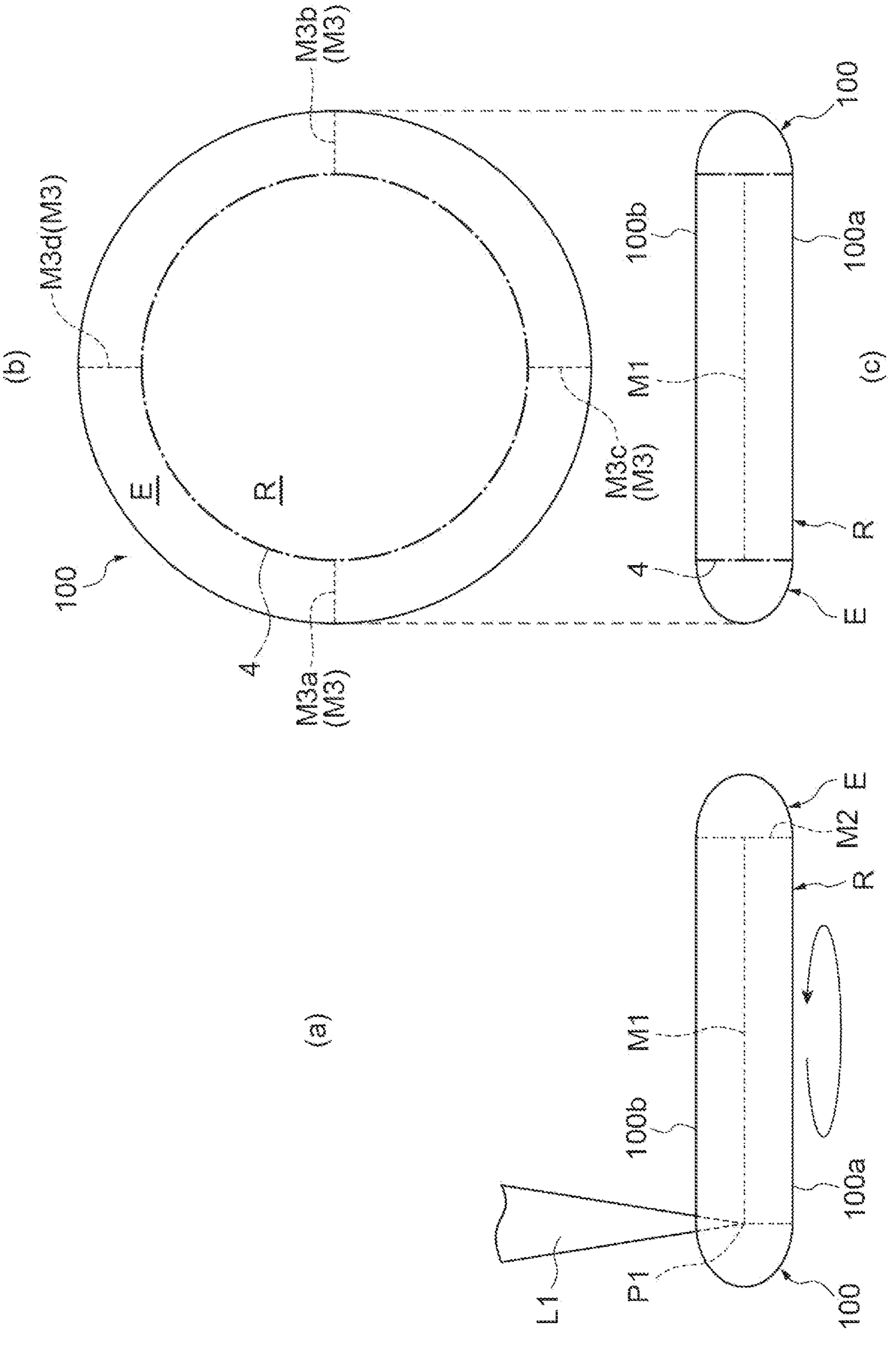
FIG. 11(*a*) of FIG. 11 is a side view of the object for explaining laser processing according to the embodiment.

The laser processing head 10A emits the laser light L1 onto the object 100 placed on the stage 107 (see FIG. 11 (*a*)), via the light-condensing driving portion 14 along the Z direction, thereby forming a modified region inside the object 100. The laser processing head 10A is fitted on the first Z-axis rails 106A and on the Y-axis rails 108. Receiving the driving force of the known driving portion, such as the motor, the laser processing head 10A is able to move linearly along the first Z-axis rails 106A in the Z direction. Receiving the driving force of the known driving portion, such as the motor, the laser processing head 10A is able to move linearly along the Y-axis rails 108 in the Y direction. The laser processing head 10A makes up an emission portion. The light-condensing driving portion 14 includes a condenser lens.

The laser processing head 10A includes the reflective spatial light modulator 34, the driving portion 18, and a distance measuring sensor 36. The reflective spatial light modulator 34 and the driving portion 18 have the above-described configurations (see FIG. 5). The distance measuring sensor 36 is a sensor that emits a distance measurement laser light (measurement light) onto the laser light incident surface of the object 100 and that receives the distance measurement laser light having been reflected by the laser light incident surface, as reflection light. The distance measuring sensor 36 acquires information on the received reflection light, as displacement data on displacement (including unevenness, inclination, and the like) of the laser light incident surface of the object 100. The displacement data is, for example, a voltage value corresponding to the received reflection light. When the optical axis of the distance measuring sensor 36 is different from the optical axis of the laser light L1, a sensor using a triangulation method, a laser confocal method, a white confocal method, a spectral interference method, an astigmatism method, or the like can be adopted as the distance measuring sensor 36. When the optical axis of the distance measuring sensor 36 matches the optical axis of the laser light L1, a sensor using the astigmatic method or the like can be adopted as the distance measuring sensor 36. The distance measuring sensor 36 is not limited to a specific type of sensor, and various types of sensors may be used as the distance measuring sensor 36.

Based on the displacement data acquired by the distance measuring sensor 36, the circuit 19 (see FIG. 3) of the laser processing head 10A causes the driving portion 18 (see FIG. 5) to move the light-condensing driving portion 14 in such a way as to make it follow the laser light incident surface. For example, as the distance measuring sensor 36 acquires a voltage value as the displacement data, the circuit 19 causes the driving portion 18 to move the light-condensing driving portion 14 in the Z direction such that the acquired voltage value becomes a reference value. The reference value is a voltage value serving as a reference voltage with which the light-condensing driving portion 14 is caused to follow the laser light incident surface. The reference value is based on a height setting voltage value that is used at height setting, which will be described later. Moving the light-condensing driving portion 14 in such a way as to make it follow the laser light incident surface will hereinafter be referred to also as autofocus (AF) tracking.

In this manner, the light-condensing driving portion 14 moves along the Z direction, based on the displacement data, such that the distance between the laser light incident surface of the object 100 and the focusing position of the laser light L1 is kept constant. The circuit 19 stores (acquires) a control signal value according to which the driving portion 18 moves the light-condensing driving portion 14 in such a way as to make it follow the laser light incident surface, as measurement data. The distance measuring sensor 36 and the circuit 19 make up a measurement data acquiring portion. A function of causing the driving portion 18 to carry out AF tracking and a function of storing the control signal value may be functions possessed by the controller 9 or a different circuit. The measurement data obtained in the above manner is data on displacement of the laser light incident surface of the object 100 and is data on displacement of the support surface 107*a* supporting the object 100 as well. The measurement data is at least one of data on displacement of the laser light incident surface and data on displacement of the support surface 107*a*, and such measurement data may be acquired by various known techniques.

The first Z-axis rails 106A are rails extending along the Z direction. The first Z-axis rails 106A are fitted to the laser processing head 10A via the fitting driving portion 65. The first Z-axis rails 106A let the laser processing head 10A move along the Z direction so that the focusing position of the laser light L1 moves along the Z direction (direction intersecting the virtual plane M1). The Y-axis rails 108 are rails extending along the Y direction. The Y-axis rails 108 are fitted to the first Z-axis rails 106 A. The Y-axis rails 108 let the laser processing head 10A move along the Y direction so that the focusing position of the laser light L1 moves along the Y direction (direction along the virtual plane M1). The first Z-axis rails 106A and the Y-axis rails 108 correspond to the rails of the moving mechanism 6 (see FIG. 1) or the rails of the moving mechanism 300 (see FIG. 8). The first Z-axis rails 106A and the Y-axis rails 108 let at least one of the stage 107 and the laser processing head 10A move so that the focusing position of the laser light L1, the focusing position being created by the light-condensing driving portion 14, moves. Hereinafter, the focusing position of the laser light L1, the focusing position being created by the light-condensing driving portion 14, will be simply referred to as "focusing position".

The imaging-capturing driving portion 110 photographs the object 100 in a direction along the incident direction of the laser light L1. The imaging-capturing driving portion 110 includes an alignment camera AC and an image-capturing portion IR. The alignment camera AC and the image-capturing portion IR, together with the laser processing head 10A, are fitted to the fitting driving portion 65. The alignment camera AC captures an image of a device pattern or the like, using, for example, light passing through the object 100. The image obtained by this process is used for alignment of an exposure position of the laser light L1, the exposure position being on the object 100.

The image-capturing portion IR captures an image of the object 100, using light passing through the object 100. For example, when the object 100 is a wafer containing silicon, the image-capturing portion IR uses light in the near-infrared region. The image-capturing portion IR has a light source, an objective lens, and a photodetector. The light source outputs light penetrable to the object 100. The light source is composed of, for example, a halogen lamp and a filter, and outputs, for example, light in the near-infrared region. Light outputted from the light source is guided by an optical system, such as a mirror, to pass through the objective lens, and impinges on the object 100. The objective lens transmits light reflected by the surface of object 100 that is opposite to the laser light incident surface. In other words, the objective lens transmits light having propagated (penetrated) through the object 100. The objective lens has a correction ring. The correction ring, for example, adjusts the distance between a plurality of lenses making up the objective lens, thereby correcting an aberration of light that arises in the object 100. The photodetector detects light having passed through the objective lens. The photodetector is composed of, for example, an InGaAs camera, and detects light in the near-infrared region. The image-capturing portion IR can capture an image of at least one of a modified region formed inside the object 100 and a crack extending from the modified region. In the laser processing apparatus 101, a processing state of laser processing can be checked by a nondestructive method using the image-capturing portion IR.

The GUI 111 displays various pieces of information. The GUI 111 includes, for example, a touch panel display. On the GUI 111, various settings related to processing conditions are entered by a user's operation, such as touching the display. The GUI 111 makes up an input portion that receives the user's input.

The controller 9 is configured as a computer including a processor, a memory, a storage, and a communication device. At the controller 9, software (program) loaded into the memory or the like is executed by the processor, which controls data reading/writing from/to the memory and storage and communications by the communication device. The controller 9 controls respective components of the laser processing apparatus 101, thus implementing various functions.

The controller 9 controls at least the stage 107, the laser processing head 10A, and the moving mechanism 6 (see FIG. 1) or the moving mechanism 300 (see FIG. 1). The controller 9 controls the rotation of the stage 107, emission of the laser light L1 from the laser processing head 10A, and the movement of the focusing position of the laser light L1. The controller 9 can carry out various controls, based on rotation information (which will hereinafter be referred to also as "θ information") on an amount of rotation of the stage 107. The θ information may be acquired from an extent to which the driving portion causes the stage 107 to rotate, or may be acquired by a separately provided sensor or the like. The θ information can be acquired by various known methods.

While rotating the stage 107, the controller 9 controls the start and stoppage of emission of the laser light L1 from the laser processing head 10A, based on the θ information, as the focusing position is set on the line M2 (the peripheral edge of the effective area R) in the object 100, thereby executing a trimming process of forming a modified region along the peripheral edge of the effective area R. The trimming process is a process the controller 9 executes to carry out the trimming processing.

While keeping the stage 107 from rotating, the controller 9 controls the start and stoppage of emission of the laser light L1 from the laser processing head 10A as the focusing position is set on the line M3 in the object 100, and causes the focusing position of the laser light L1 to move along the line M3, thus executing a radial cut process of forming a modified region along the line M3 in the removal area E. The radiation cut process is a process the controller 9 executes to carry out the radiation cut processing.

While rotating the stage 107, the controller 9 causes the laser processing head 10A to emit the laser light L1 while controlling the movement of the focusing position in the Y direction, thus executing a peeling process of forming a modified region along the virtual plane M1 inside the object 100. The peeling process is process the controller 9 executes to carry out the peeling processing. The controller 9 controls display the GUI 111 makes. The controller 9 executes the trimming process, the radiation cut process, and the peeling process, based on various settings inputted to the GUI 111.

Switching between execution and stoppage of modified region formation is made in the following manner. For example, the laser processing head 10A switches between the start(output) and stoppage of emission of the laser light L1 (that is, switches laser emission on and off), execution and stoppage of modified region formation can be switched. Specifically, when the laser oscillator is composed of a solid-state laser, a Q switch (an AOM or acousto-optic modulator, an EOM or electro-optic modulator, and the like) built in a resonator is switched on and off, which switches the start and stoppage of emission of the laser light L1 at high speed. When the laser oscillator is composed of a fiber laser, a semiconductor laser making up a seed laser and an amplifier (pumping) laser is switched on and off, which switches the start and stoppage of emission of the laser light L1 at high speed. When the laser oscillator uses an external modulation element, the external modulation element (AOM, EOM, etc.) provided outside a resonator is switched on and off, which switches the start and stoppage of emission of the laser light L1 at high speed.

Switching between execution and stoppage of modified region formation may be made in the following manner as well. For example, an optical path for the laser light L1 may be opened and closed by controlling a mechanical mechanism, such as a shutter. This switches execution and stoppage of modified region formation. The laser light L1 may be switched to CW light (continuous wave light), which stops formation of the modified region. A pattern that makes a state of focusing of the laser light L1 a non-reforming state (e.g., a stain-finish pattern that causes laser scattering) may be created on a liquid crystal layer of the reflective spatial light modulator 34. This stops formation of the modified region. A power output adjuster, such as an attenuator, may be controlled to reduce the power output of the laser light L1 to a level at which modified region formation is impossible. This stops formation of the modified region. A polarization direction may be changed in such a way as to stop formation of the modified region. The laser light L1 may be caused to scatter (flick off) in a direction different from the direction of the optical axis to cut off the laser light L1. This stops formation of the modified region.

An example of a laser processing method will then be described, the laser processing method being a method of carrying out the trimming processing, the radiation cutting processing, and the peeling processing on the object 100, using the laser processing apparatus 101, to obtain (manufacture) a semiconductor device.

First, the object 100 with the back surface 100*b* serving as the laser light incident surface is placed on the stage 107. The surface 100*a* of the object 100, the surface 100*a* bearing functional elements, is protected by a support substrate or a tape bonded to the surface 100*a*.

Subsequently, the trimming processing is carried out. In the trimming processing, the controller 9 executes the trimming process (first process). The trimming processing includes a trimming step (first step). Specifically, in the trimming processing, as the stage 107 is rotated at a constant rotation speed, the start and stoppage of emission of the laser light L1 from the laser processing head 10A is controlled, based on the θ information, in a state in which the focusing position P1 is set on the line M2, as shown in FIG. 11(*a*). As a result, as shown in FIGS. 11(*b*) and 11(*c*), a modified region 4 is formed along the line M2. The modified region 4 formed includes a reformed spot and a crack extending from the reformed spot.

Figure 12:
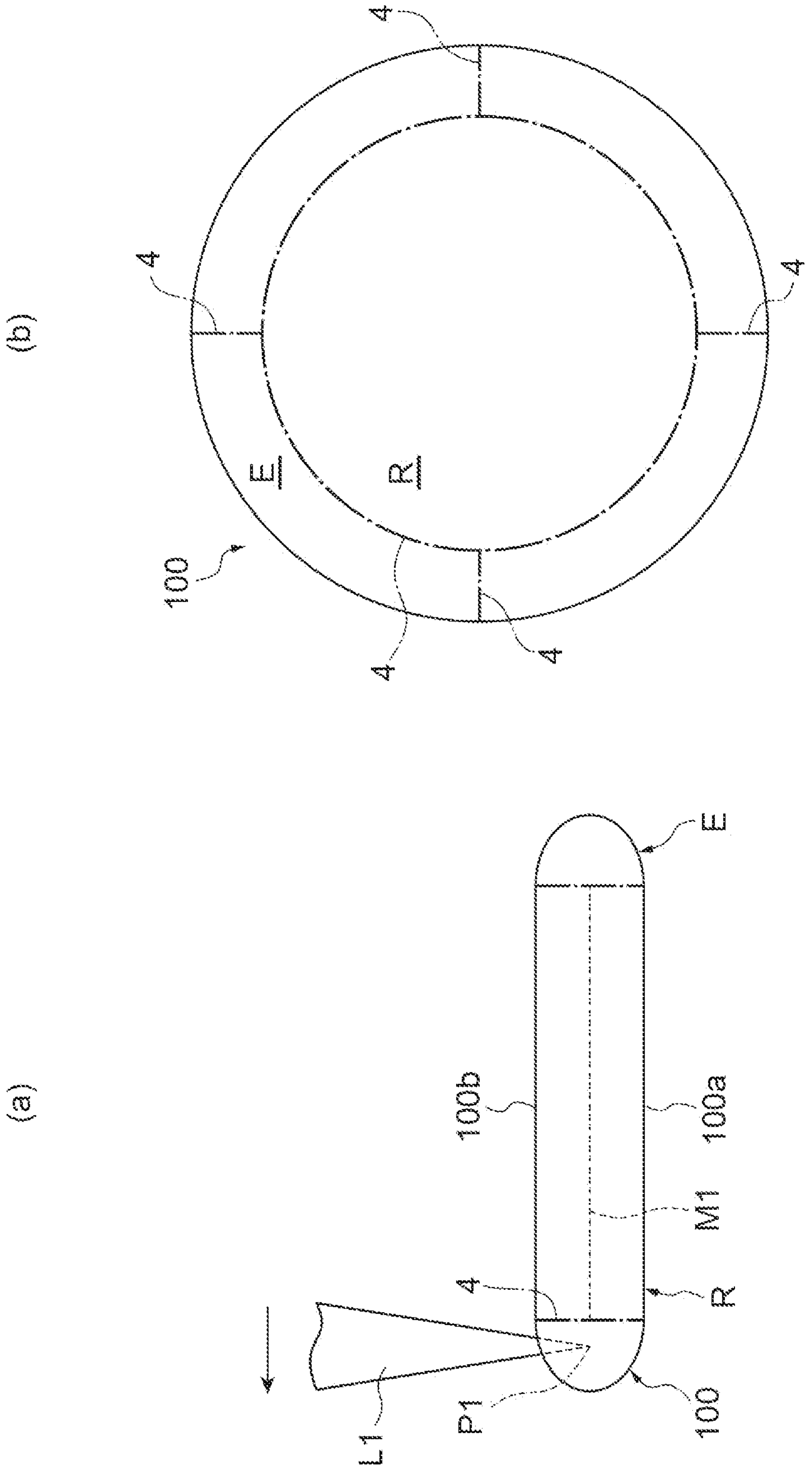
FIG. 12(*a*) is a side view of the object for an explanation continued from the explanation of FIG. 11(*b*).
Figure 13:
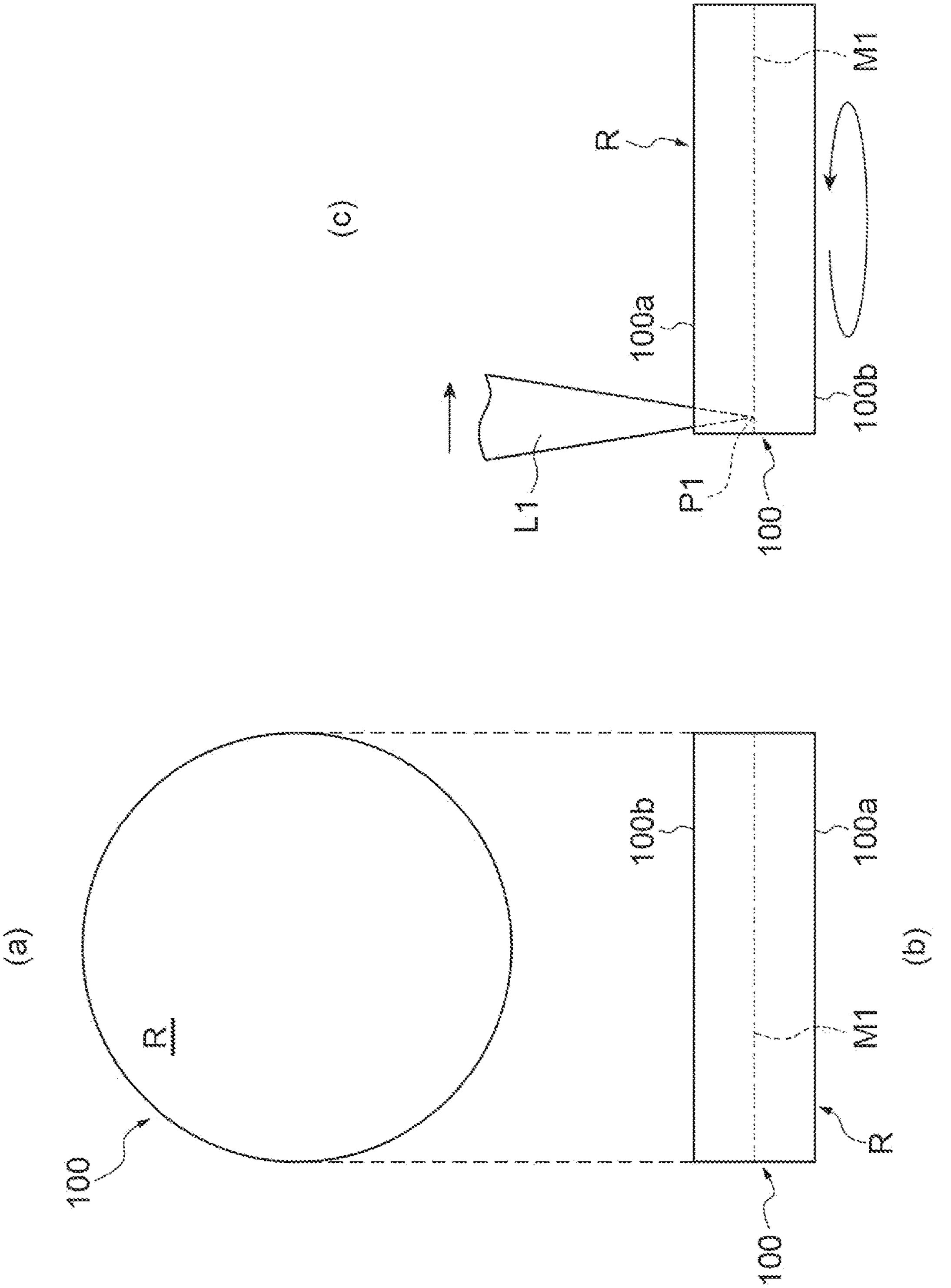
FIG. 13(*a*) of FIG. 13 is a plan view of the object for an explanation continued from the explanation of FIG. 12(*b*).

Subsequently, the radiation cut processing is carried out. In the radiation cut processing, the controller 9 executes the radiation cut process (second process). The radiation cut processing includes a radiation cut step (second step). Specifically, in the radiation cut processing, as the stage 107 is kept from rotating, the laser light L1 is emitted from the laser processing head 10A and the laser processing head 10A is moved along the Y-axis rails 108 so that the focusing position P1 moves along the lines M3*a* and M3*b*, as shown in FIGS. 11(*b*) and 12(*a*). Subsequently, the stage 107 is rotated by 90 degrees and then is kept from rotating again. As the stage 107 is standing still, the laser light L1 is emitted from the laser processing head 10A and the laser processing head 10A is moved along the Y-axis rails 108 so that the focusing position P1 moves along the lines M3*c* and M3*d*. As a result, as shown in FIG. 12(*b*), the modified regions 4 are formed along the lines M3. The modified region 4 formed includes a reformed spot and a crack extending from the reformed spot. The crack may reach at least one of the surface 100*a* and the back surface 100*b*, or may not reach at least one of the surface 100*a* and the back surface 100*b*. Thereafter, as shown in FIGS. 13(*a*) and 13(*b*), the removal areas E are cut away (removed) along the modified regions 4 serving as boundary areas, using, for example, a jig or air blast.

Subsequently, the peeling processing is carried out. Specifically, as the stage 107 is rotated at a constant rotation speed, the laser light L1 is emitted from the laser processing head 10A and the laser processing head 10A is moved along the Y-axis rails 108 so that the focusing position P1 moves along the Y direction, from the outer edge side of the virtual plane M1 to the inside thereof, as shown in FIG. 13(*c*). As a result, as shown in FIGS. 13(*a*) and 13(*b*), the modified region 4 is formed as a modified region of a spiral shape (involute curve) extending around the position of the spindle C (see FIG. 9) along the virtual plane M1 inside the object 100. The modified region 4 formed includes a plurality of reformed spots.

Figure 14:
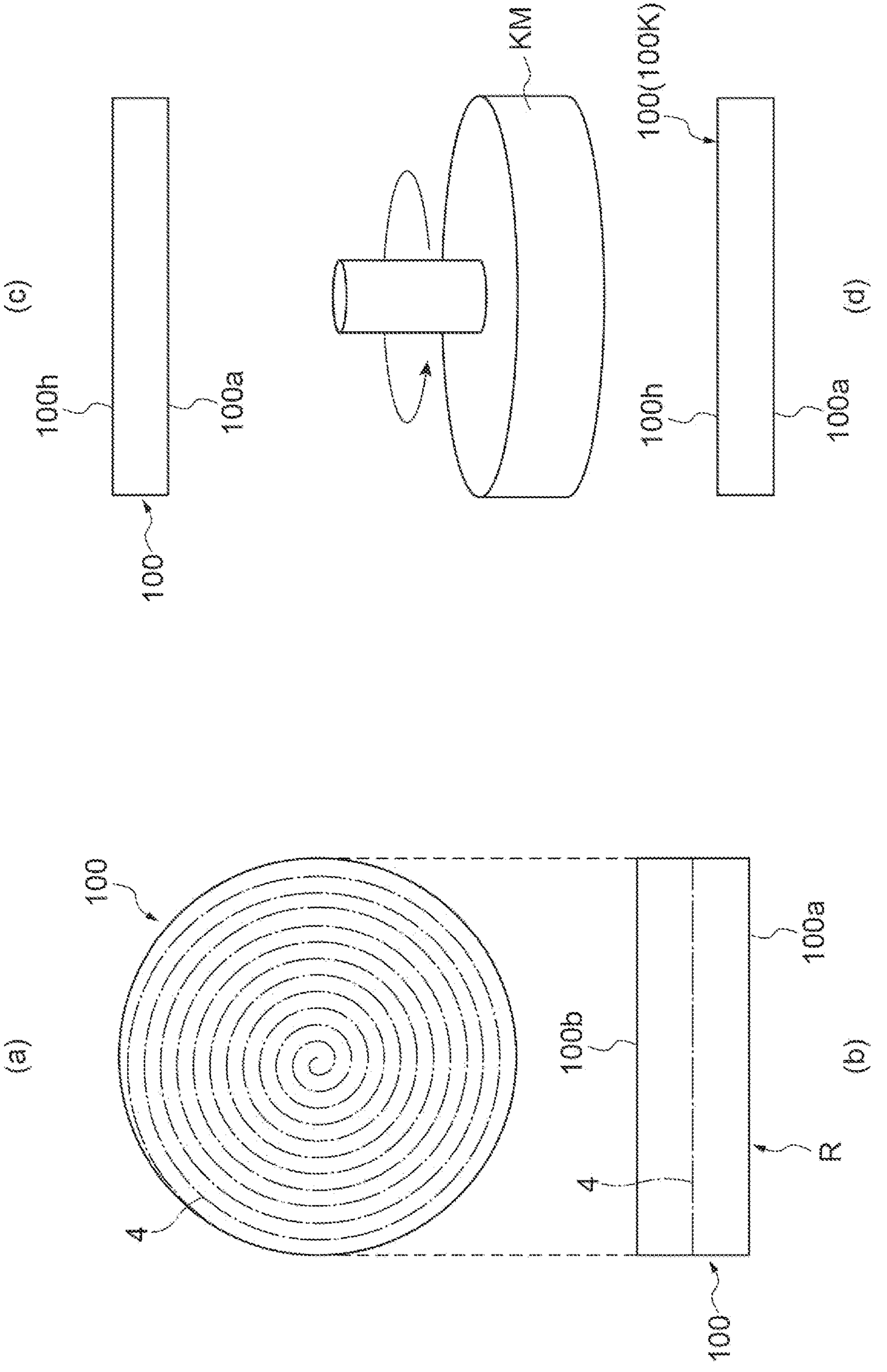
FIG. 14(*a*) is a plan view of the object for an explanation continued from the explanation of FIG. 13(*c*).

Subsequently, as shown in FIG. 14(*c*), a part of the object 100 is peeled off along the modified region 4 extending over the virtual plane M1 as a boundary area, using, for example, a suction jig. The part of the object 100 may be peeled off on the stage 107 or in a specific area for the peeling processing after transferring the object 100 thereto. The part of the object 100 may be peeled off by using air blast or a tape. When the part of the object 100 cannot be peeled off solely by an external stress applied thereto, the modified region 4 may be selectively etched with an etching solution (KOH or TMAH) that reacts with the object 100. This allows the part of the object 100 to be peeled off easily. As shown in FIG. 14(*d*), a peeling surface 100*h* of the object 100 is subjected to finish grinding or polishing by an abrasive material KM, such as a grindstone. When the part of the object 100 is peeled off by etching, this polishing can be simplified. Through the above processing, a semiconductor device 100K is obtained.

The trimming processing and the radiation cut processing will then be described in detail.

First, based on an image of the laser light incident surface of the object 100, the image being acquired by the imaging-capturing driving portion 110, for example, the controller 9 moves the laser processing head 10A along the Z direction to move the light-condensing driving portion 14 along the Z direction so that the focusing position is set on the laser light incident surface. Hereinafter, such alignment of the light-condensing driving portion 14 with the laser light incident surface is referred to as "height setting", and the position of the light-condensing driving portion 14 that results from the height setting is referred to as a height setting position. In the height setting, the focusing position may be matched to the center Ct of the laser light incident surface or to the line M3 of the trimming processing.

Subsequently, the controller 9 moves the laser processing head 10A along the Z direction to cause the light-condensing driving portion 14 at the height setting position to move by a distance equivalent to a trimming processing depth in the Z direction so that the focusing position moves from the laser light incident surface to the trimming processing depth (the depth at which the modified region 4 is formed by the trimming processing). At this time, a voltage value acquired by the distance measuring sensor 36 is stored as a reference voltage value for trimming processing. In addition, the controller 9 moves the laser processing head 10A along the Z direction to cause the light-condensing driving portion 14 at the height setting position to move by a distance equivalent to a radiation cut processing depth in the Z direction so that the focusing position moves from the laser light incident surface to the radiation cut processing depth (the depth at which the modified region 4 is formed by the radiation cut processing). At this time, a voltage value acquired by the distance measuring sensor 36 is stored as a reference voltage value for the radiation cut processing.

Figure 15:
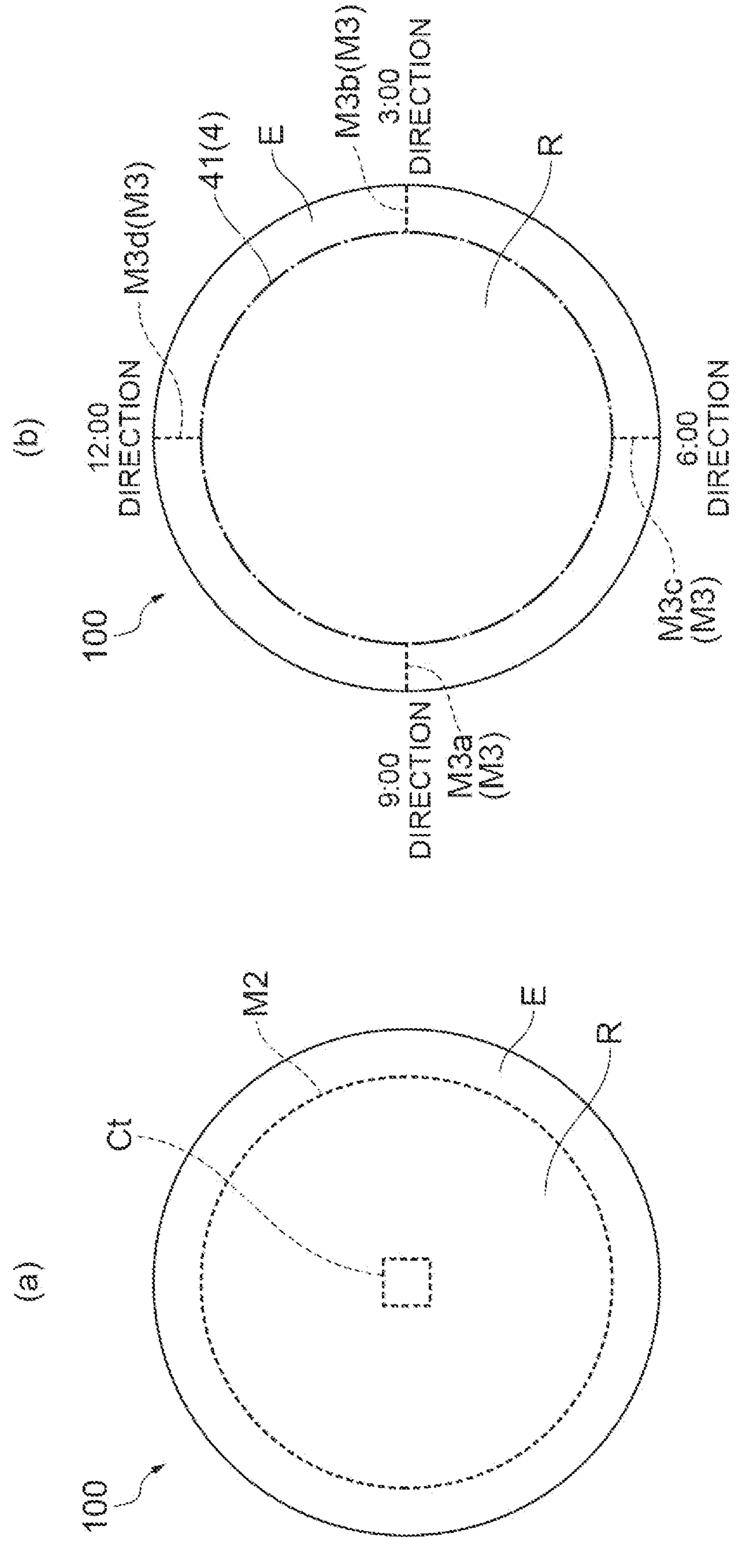
FIG. 15(*a*) is a plan view of the object for explaining trimming processing.

Subsequently, as shown in FIG. 15(*b*), the controller 9 executes the trimming process (trimming step), according to which the laser processing head 10A is moved so that the focusing position moves along the line M2 inside the peripheral edge of the object 100 to form the first modified regions 41 along the lines M3 inside the object 100.

In the trimming process, as the laser processing head 10A is moved so that the focusing position moves along the line M2, the circuit 19 controls the driving portion 18 such that the voltage value acquired by the distance measuring sensor 36 becomes the reference voltage value for trimming processing, thus executing AF tracking by which the light-condensing driving portion 14 is moved in such a way as to follow displacement of the laser light incident surface. The circuit 19 then acquires measurement data, which is a control signal value inputted to the driving portion 18 to execute the AF tracking, as measurement data associated with position information (a θ position) on the object 100. The θ position in FIG. 15(*b*) is defined as follows. In a view of the object 100 from the laser light incident surface, a certain direction is defined as a 12:00 direction, a direction given by rotating the 12:00 direction clockwise by 90 degrees is defined as a 3:00 direction, a direction given by rotating the 3:00 direction clockwise by 90 degrees is defined as a 6:00 direction, and a direction given by rotating the 6:00 direction clockwise by 90 degrees is defined as a 9:00 direction.

Figure 16:
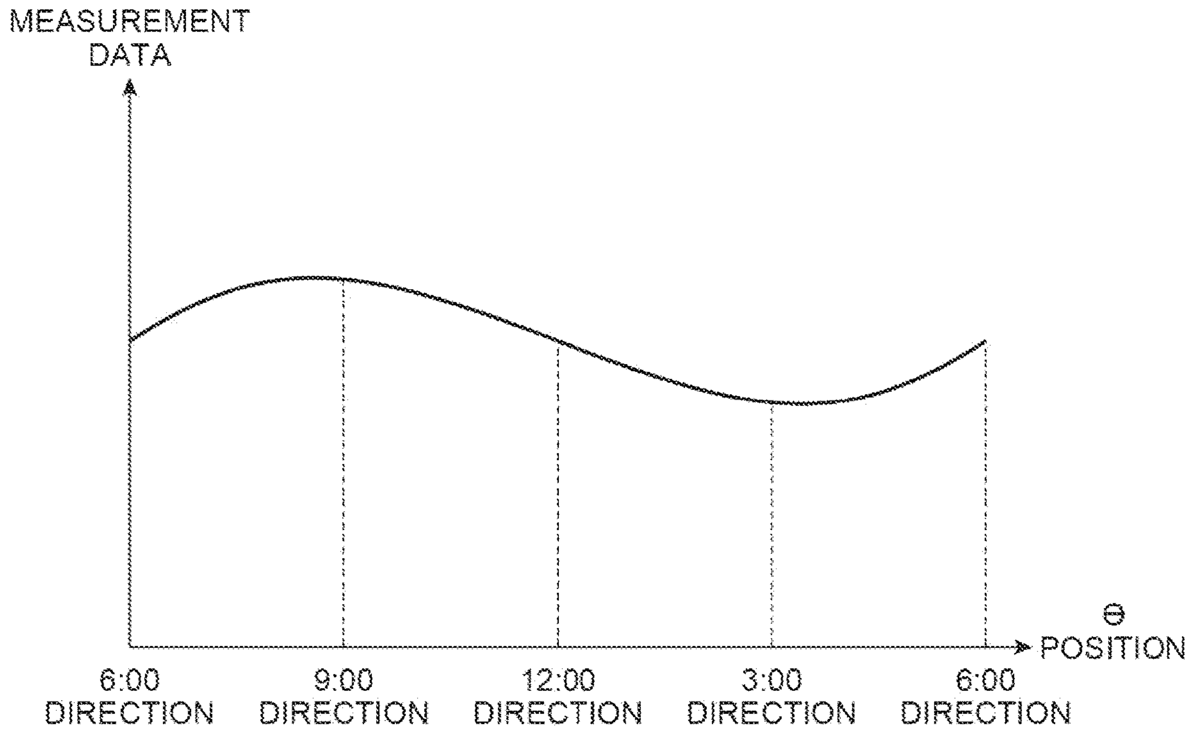
FIG. 16 is a graph showing an example of measurement data obtained as data association with position information.
Figure 17:
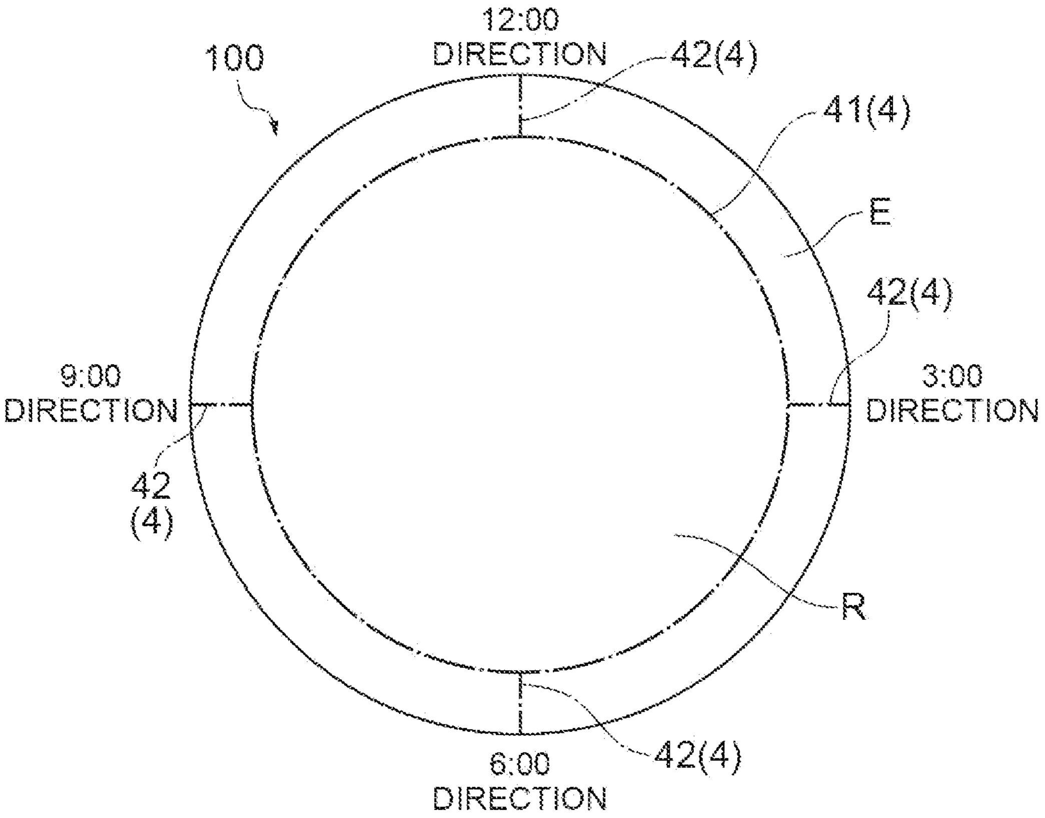
FIG. 17 is a plan view of the object for explaining radiation cut processing.

FIG. 16 is a graph showing an example of measurement data associated with the θ position. As shown in FIG. 16, the measurement data can be plotted on a graph with the horizontal axis representing the θ position of the object 100 and the vertical axis representing the measurement data. The measurement data is stored in the controller 9 or the circuit 19. In AF tracking in a case of forming rows of the first modified regions 41 along the line M2, measurement data is stored at formation of the first row of the first modified region 41 and the stored measurement data may be used at formation of the second row of the first modified region 41 and of other rows of the same to follow. When the position of the first modified region 41 in the Z direction is not within a length measurement range of AF tracking, the AF tracking is carried out first, with the focusing position matched to the length measurement range (e.g., the laser light incident surface), and measurement data for the AF tracking is stored, and then the first modified region 41 may be formed using the stored measurement data. These approaches apply also to AF tracking carried out in the following processing.

Subsequently, following the trimming process, the controller 9 executes the radiation cut process, by which the laser processing head 10A is moved along the lines M3*a* to M3*d* so that the focusing position moves from outside of the object 100 to inside thereof and then moves from inside of the object 100 to outside thereof, as indicated in FIGS. 15(*b*) and 17. As a result, inside the removal area E of the object 100, the second modified regions 42 are formed along the lines M3*a* to M3*d*.

In the radiation cut process, before or when the focusing position moves from outside of the object 100 to inside thereof, the driving portion 18 shifts the position of the light-condensing driving portion 14 along the Z direction, to an initial position based on measurement data acquired in the trimming process. The initial position is a position based on the measurement data obtained at intersections of the line M2 and the lines M3*a* and M3*c* on the laser light incident surface. In the radiation cut process, after moving the light-condensing driving portion 14 to the initial position, the driving portion 18 carries out AF tracking as the laser processing head 10A is moved so that the focusing position moves along the line M3, from a point of time at which the focusing position is in the removal area E.

Figure 18:
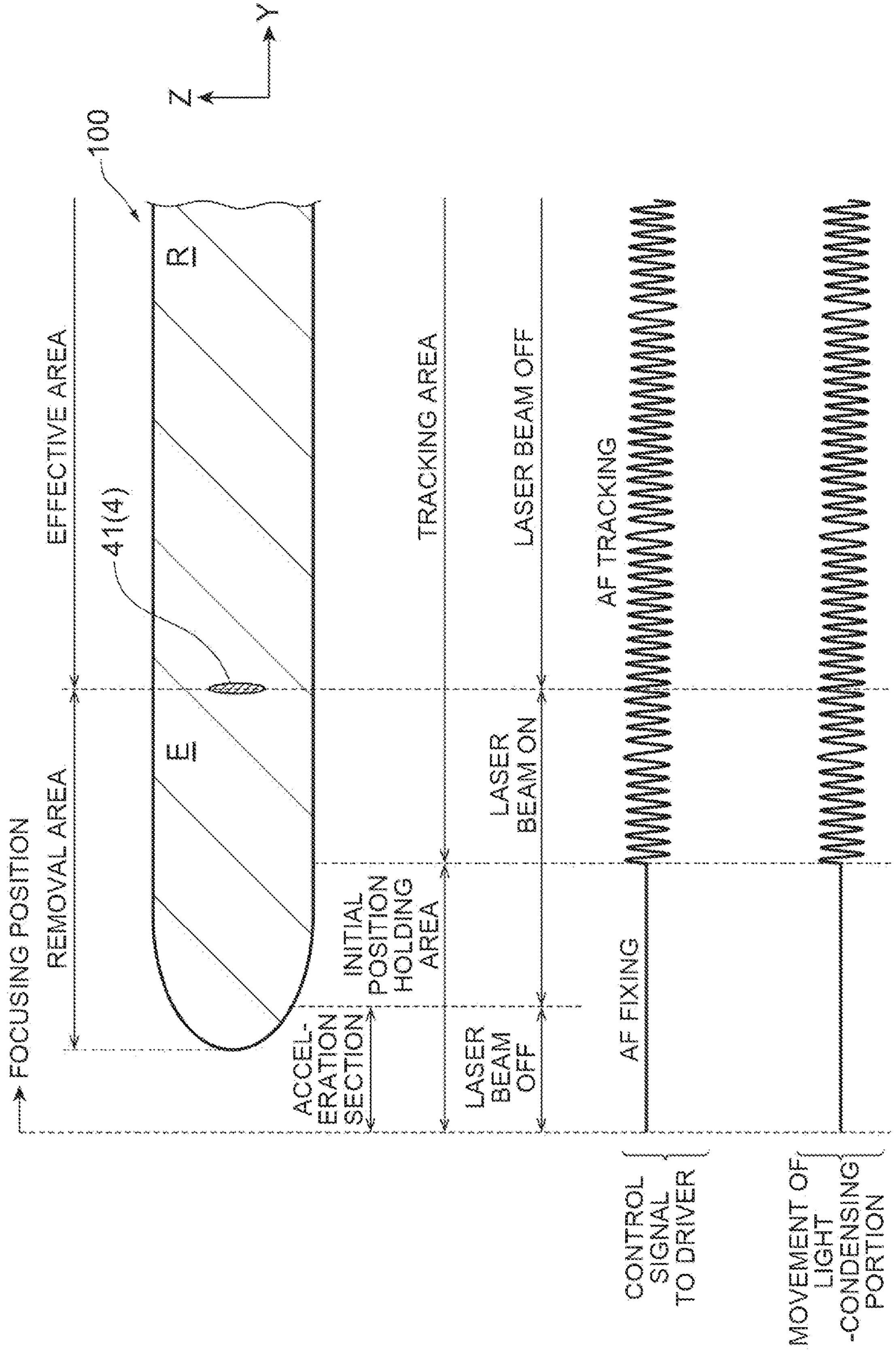
FIG. 18 depicts an example of various states that result when a focusing position is outside or inside the object at execution of the radiation cut processing.

Specifically, in the radiation cut process, for example, movement of the focusing position along the line M3*a*, which is the first linear line, is started from a position separated from the object 100 by an acceleration section, as indicated in FIG. 18. At this time, emission of the laser light L1 from the laser processing head 10A is stopped (off). The acceleration section is an approach section through which the moving speed of the focusing position can be made constant. Meanwhile, measurement data at the time of the θ position being in the 9:00 direction is read from the controller 9 or the circuit 19. Based on the measurement data, i.e., a control signal to the driving portion 18, the driving portion 18 moves the light-condensing driving portion 14 to a first initial position. The first initial position corresponds to the position the light-condensing driving portion 14 takes in the Z direction when the focusing position is present at the θ position in the 9:00 direction of the line M2 in the trimming processing. After the focusing position moves into the object 100, emission of the laser light L1 from the laser processing head 10A is started (on) at a point of time at which the focusing position has passed the bevel driving portion.

It should be noted that FIG. 18 depicts various states that result when the focusing position is present outside and inside the object 100 in a view in the X direction in a case where the focusing position is moved in the Y direction. The left-to-right direction in FIG. 18 corresponds to the direction in which the focusing position is moved. These descriptions apply also to FIGS. 19 to 22. Emission of the laser light L1 may be started when the focusing position is outside the object 100. However, to suppress ablation at the bevel driving portion, emission of the laser light L1 is not started when the focusing position is on the bevel driving portion.

Subsequently, the focusing position is further moved along the line M3*a*. During this period, the circuit 19 maintains the control signal to the driving portion 18 as measurement data at the time of the θ position being in the 9:00 direction, thereby holding the position of the light-condensing driving portion 14 in the Z direction at the first initial position. Hereinafter, holding the position of the light-condensing driving portion 14 in the Z direction will be referred to also as "AF fixing". When the focusing position has reached the radial center of the removal area E, the circuit 19 controls the driving portion 18 such that a voltage value acquired by the distance measuring sensor 36 becomes the reference voltage value for radiation cut processing. This starts AF tracking by which the light-condensing driving portion 14 is moved in such a way as to follow displacement of the laser light incident surface. In FIG. 18, an area extending from the start of movement of the focusing position to the start of the AF tracking is an initial position holding area, and an area extending from the start of the AF tracking is a tracking area. Then, at a point of time at which the focusing position moves into the effective area R, emission of the laser light L1 from the laser processing head 10A is stopped.

In this state, the focusing position is then kept moved and is moved out of the object 100 along the line M3*b*. In this process, at a point of time at which the focusing position moves into the removal area E, emission of the laser light L1 from the laser processing head 10A is started and AF fixing by the driving portion 18 is started as well. This AF fixing is carried out in such a way that measurement data at the time of the θ position being in the 3:00 direction is read from the controller 9 or the circuit 19 and that the circuit 19 controls the driving portion 18, using a control signal to the driving portion 18 as the measurement data, and, by maintaining the control signal, i.e., measurement data, holds the position of the light-condensing driving portion 14 in the Z direction. Then, at a point of time right before the focusing position's moving out of the object 100, emission of the laser light L1 from the laser processing head 10A is stopped. The control signal for the AF fixing may be not the measurement data at the time of the θ position being in the 3:00 direction but may be a control signal value for AF tracking that is in execution right before the start of the AF fixation.

Subsequently, the stage 107 is rotated by 90 degrees, and the movement of the focusing position along the line M3*c*, which is the second linear line, is started from a position separated from the object 100 by the acceleration section. At this time, emission of the laser light L1 from the laser processing head 10A is stopped. Meanwhile, measurement data at the time of the θ position being in the 6:00 direction is read from the controller 9 or the circuit 19. The driving portion 18 is controlled, using a control signal to the driving portion 18 as the measurement data, to move the light-condensing driving portion 14 to the second initial position. The second initial position corresponds to the position the light-condensing driving portion 14 takes in the Z direction when the focusing position is present at the θ position in the 6:00 direction of the line M2 in the trimming processing. At a point of time right after the focusing position's moving into the object 100, emission of the laser light L1 from the laser processing head 10A is started. Subsequently, the focusing position is kept moved along the line M3*a* as the position of the light-condensing driving portion 14 is fixed at the second initial position by AF fixing. When the focusing position has reached the radial center of the removal area E, AF tracking is started. Then, at a point of time at which the focusing position moves into the effective area R, emission of the laser light L1 from the laser processing head 10A is stopped.

In this state, the focusing position is then kept moved and is moved out of the object 100 along the line M3*d*. In this process, at a point of time at which the focusing position moves into the removal area E, emission of the laser light L1 from the laser processing head 10A is started and AF fixing is started as well. This AF fixing is carried out in such a way that measurement data at the time of the θ position being in the 12:00 direction is read from the controller 9 or the circuit 19 and that the circuit 19 controls the driving portion 18, using a control signal to the driving portion 18 as the measurement data, and, by maintaining the control signal, i.e., measurement data, holds the position of the light-condensing driving portion 14 in the Z direction. Then, at a point of time right before the focusing position's moving out of the object 100, emission of the laser light L1 from the laser processing head 10A is stopped. The control signal for the AF fixing may be not the measurement data at the time of the θ position being in the 12:00 direction but may be a control signal value for AF tracking that is in execution right before the start of the AF fixation.

As described above, according to the laser processing apparatus 101 and the laser processing method of this embodiment, at execution of the radiation cut process or radiation cut step, the driving portion 18 moves the light-condensing driving portion 14 to the initial position based on the measurement data acquired in the radiation cut process or the radiation cut step, before the focusing position moves from outside of the object 100 to inside thereof. As a result, for example, at a point of time right after the focusing position's moving into the object, overshooting that arises at the control signal inputted to the driving portion 18 (the signal's missing a target value) can be prevented to offer an advantage over a case where such an initial position is not taken into consideration. Thus, a tracking error (error that results when the position of the light-condensing driving portion 14 in Z direction shifts from a position at which the light-condensing driving portion 14 follows displacement of laser light incident surface) can be reduced. In other words, according to this embodiment, a drop in precision in following displacement of the laser light incident surface can be suppressed.

In addition, height setting to be carried out after the trimming processing and before the radiation cut processing can be skipped, which allows takt-up (reduction in operation time). In the radiation cut processing, a processing area is extremely short, and therefore the focusing position having moved into the object 100 passes the processing area before a tracking error is sufficiently corrected. For this reason, the influence of a tracking error turns out to be extremely large in the radiation cut processing. This case raises a possibility that a failure in dividing the object or a quality problem (chipping or cracking) may occur. Suppressing a drop in precision in following displacement of the laser light incident surface is, therefore, particularly effective in carrying out the radiation cut processing.

According to the laser processing apparatus 101 and the laser processing method of this embodiment, at execution of the trimming process, the controller 9 forms the first modified region 41 along the line M2 extending along the peripheral edge of the object 100, and, at execution of the radiation cut process, forms the second modified region 42 along the line M3 in the removal area E, the line M3 intersecting the line M2. In this case, the removal area E of the object 100 can be cut apart and removed.

According to the laser processing apparatus 101 and the laser processing method of this embodiment, the initial position is the position based on measurement data on displacement at an intersection of the lines M2 and M3 on the laser light incident surface. As a result, when the removal area E of the object 100 is cut apart and removed, a drop in precision in following displacement of the laser light incident surface can be further suppressed.

According to the laser processing apparatus 101 and the laser processing method of this embodiment, at execution of the trimming process, the controller 9 causes the driving portion 18 to move the light-condensing driving portion 14 in such a way as to make it follow displacement of the laser light incident surface, while moving the light-condensing driving portion 14 along the line M2. At this time, a control signal value that is inputted to the driving portion 18 when it moves the light-condensing driving portion 14 in such a way as to make it follow displacement of the laser light incident surface is stored as measurement data associated with position information. At execution of the radiation cut process, the controller 9 reads a control signal value that is inputted when the light-condensing driving portion 14 has been caused to follow displacement of the laser light incident surface at an intersection of the line M2 and the line M3*a* by the trimming process, moves the light-condensing driving portion 14 so that the focusing position moves from outside of the object 100 to inside thereof along the line M3*a* to form the second modified region 42 in the removal area E, and controls the driving portion 18 by the read control signal value, thereby moving the light-condensing driving portion 14 to the first initial position, before or when the focusing position moves from outside of the object 100 to inside thereof. At execution of the radiation cut process, the controller 9 reads a control signal value that is inputted when the light-condensing driving portion 14 has been caused to follow displacement of the laser light incident surface at an intersection of the line M2 and the line M3*c* by the trimming process, moves the light-condensing driving portion 14 so that the focusing position moves from outside of the object 100 to inside thereof along the line M3*c* to form the second modified region 42 in the removal area E, and controls the driving portion 18 by the read control signal value, thereby moving the light-condensing driving portion 14 to the second initial position, before or when the focusing position moves from outside of the object 100 to inside thereof. As a result, in the trimming processing of cutting apart and removing the removal area E of the object 100, a drop in precision in following displacement of the laser light incident surface can be further suppressed in a specific manner.

According to the laser processing apparatus 101 and the laser processing method of this embodiment, at execution of the radiation cut process, the controller 9, after moving the light-condensing driving portion 14 to the initial position, causes the driving portion 18 to move the light-condensing driving portion 14 in such a way as to make it follow displacement of the laser light incident surface, from a point of time at which the focusing position is in the removal area E. In this manner, when the light-condensing driving portion 14 is moved in such a way as to follow displacement of the laser light incident surface in the removal area E, a drop in precision in following displacement of the laser light incident surface can be suppressed.

The laser processing apparatus 101 and the laser processing method of this embodiment uses the distance measuring sensor 36 that emits a distance measurement laser light onto the object 100 and that detects information on reflection light, i.e., the distance measurement laser light reflected by the laser light incident surface. Thus, using the distance measurement laser light, the light-condensing driving portion 14 is caused to follow displacement of the laser light incident surface.

Figure 19:
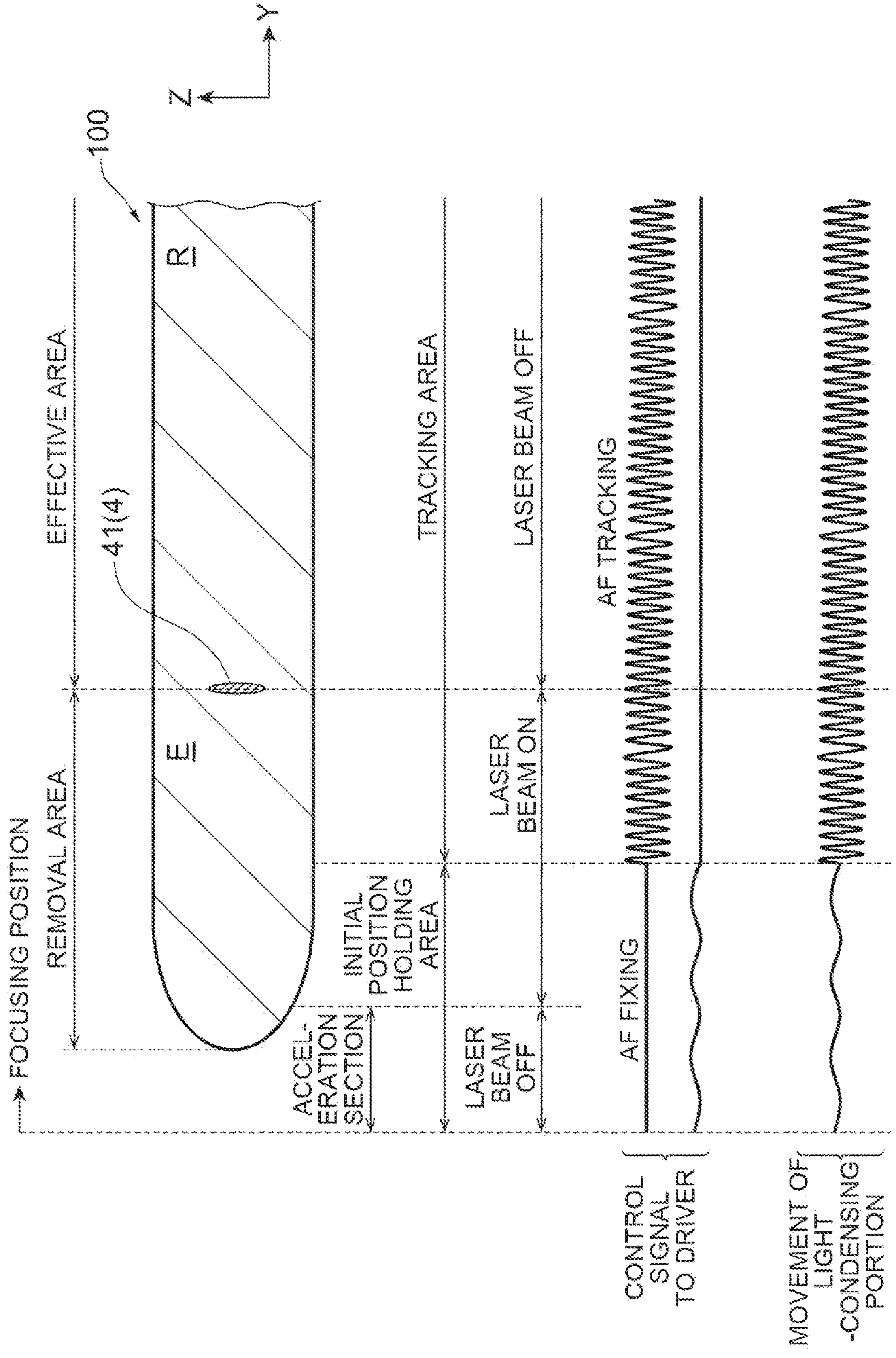
FIG. 19 depicts another example of various states that result when the focusing position is outside or inside the object at execution of the radiation cut processing.

It should be noted that the AF fixing of this embodiment includes holding the position of the light-condensing driving portion 14 in the Z direction as the light-condensing driving portion 14 is allowed to move in a certain range. The AF fixing is therefore not limited to completely fixing the position of the light-condensing driving portion 14 in the Z direction by the driving portion 18. In other words, the AF fixing of this embodiment is not limitedly defined as fixing a control signal to the driving portion 18, to a given control signal value. For example, as shown in FIG. 19, according to the AF fixing of this embodiment, the control signal value to the driving portion 18 may be a control signal value created by synthesizing a signal value related to measurement data during the trimming processing and a signal value that fluctuates gently. In this case, a drop in precision in following displacement of the laser light incident surface can be suppressed.

Figure 20:
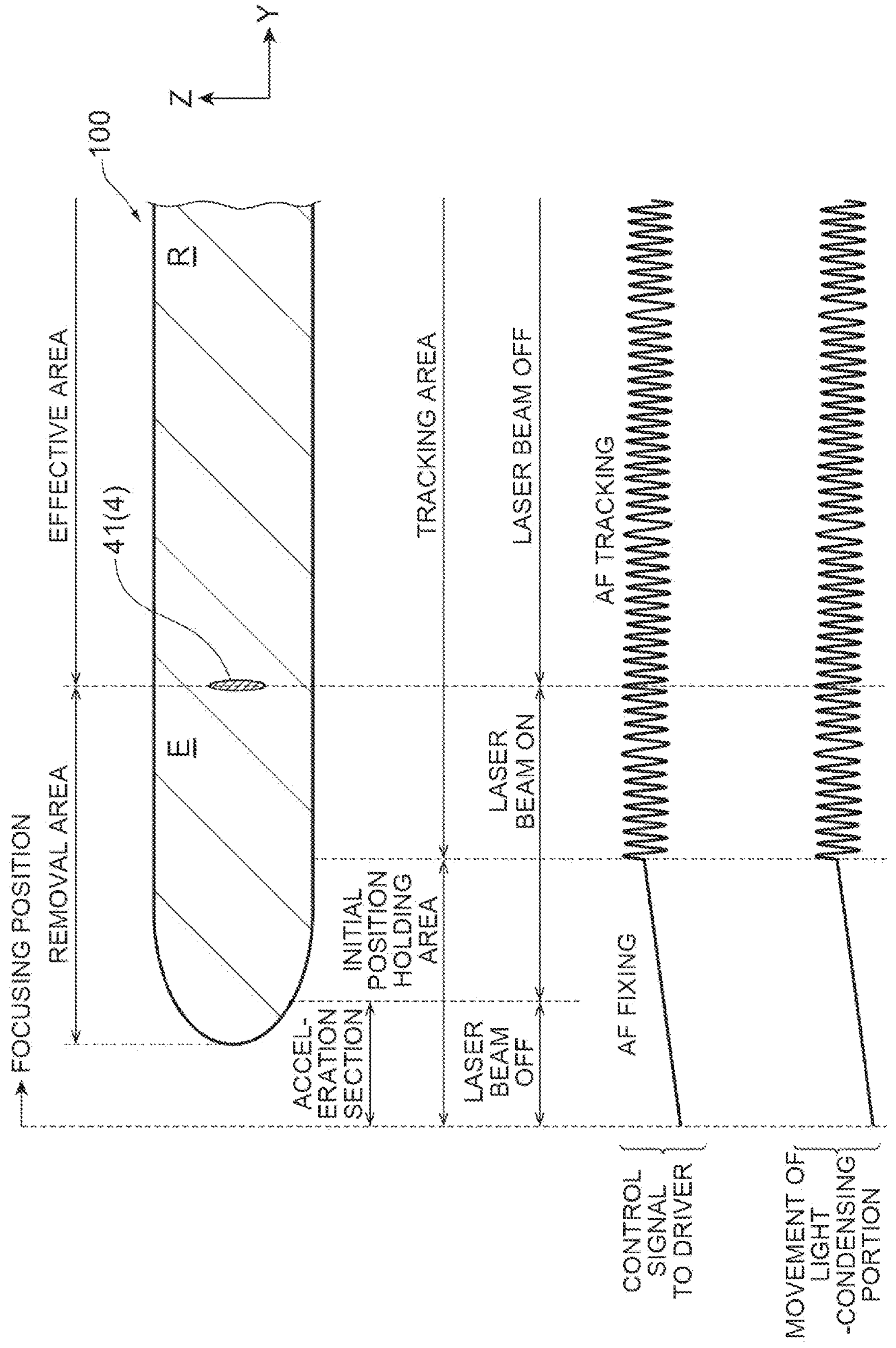
FIG. 20 depicts still another example of various states that result when the focusing position is outside or inside the object at execution of the radiation cut processing.

Furthermore, for example, in the AF fixing of this embodiment, the light-condensing driving portion 14 may be gently moved from the height setting position or a different holding position to the vicinity of the initial position, as indicated in FIG. 20, In other words, in the AF fixing of this embodiment, the control signal value to the driving portion 18 may be a control signal value that linearly increases to a signal value related to measurement data at the time of the trimming processing. In this case, the control signal value is not limited to a linearly increasing control signal value, and may be a linearly decreasing control signal value or a control signal value that changes in a curved manner. In this case, a drop in precision in following displacement of the laser light incident surface can be suppressed.

Figure 21:
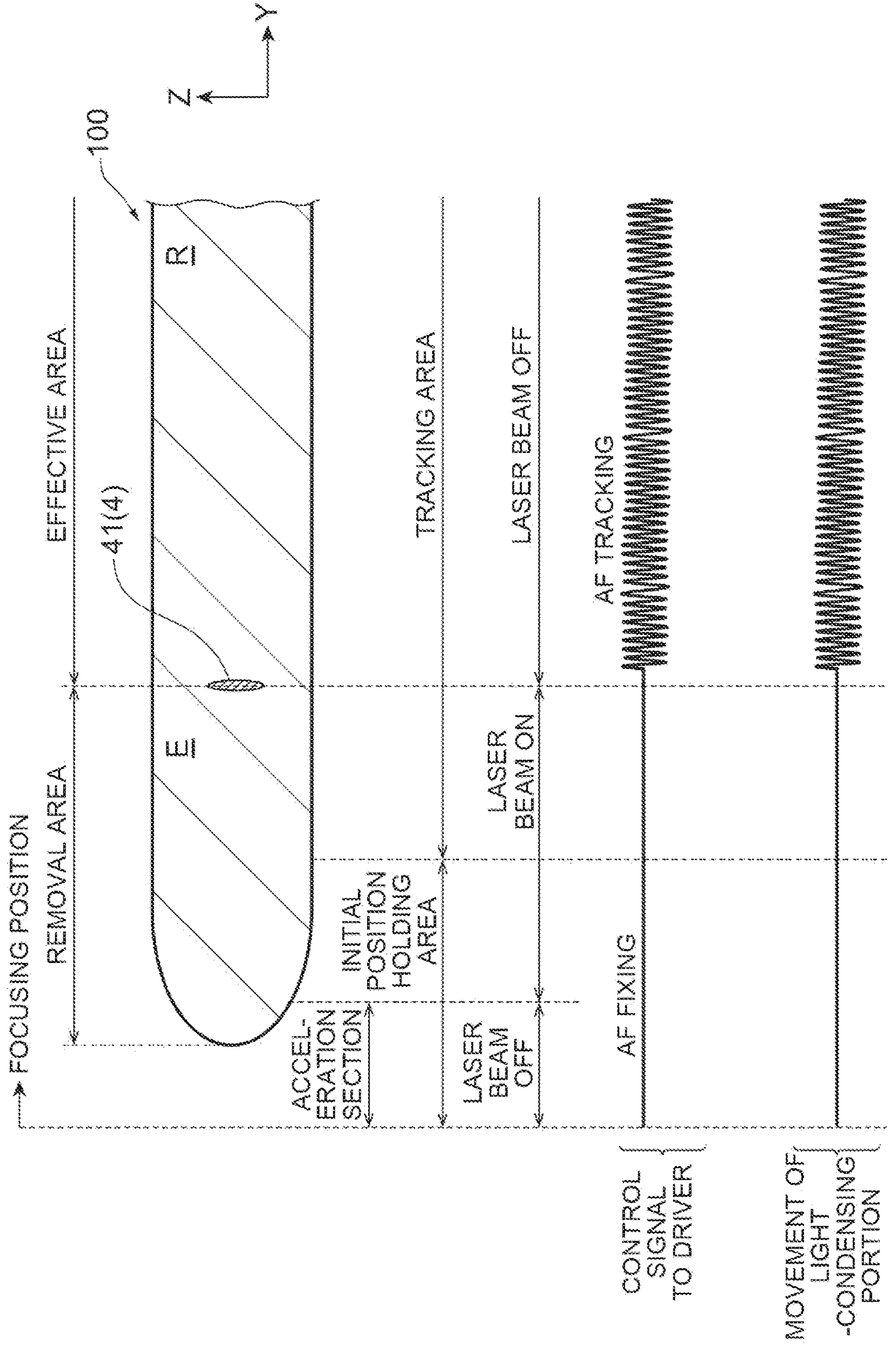
FIG. 21 depicts still another example of various states that result when the focusing position is outside or inside the object at execution of the radiation cut processing.

According to this embodiment, at execution of the radiation cut process, the controller 9, after moving the light-condensing driving portion 14 to the initial position, may cause the driving portion 18 to hold the light-condensing driving portion 14 at the initial position during a period in which the focusing position stays in the removal area E. For example, as indicated in FIG. 21, the AF fixing may be carried out in the period in which the focusing position stays in the removal area E, and then the AF tracking may be carried out right after the focusing position has moved into the effective area R. In this manner, when the light-condensing driving portion 14 is held at the initial position corresponding to the removal area E, a drop in precision in following displacement of the laser light incident surface can be suppressed. This approach is particularly effective when the removal area E is very narrow. It should be noted, however, that even after the focusing position moves into the effective area R, the AF fixing may be continued without carrying out the AF tracking.

Figure 22:
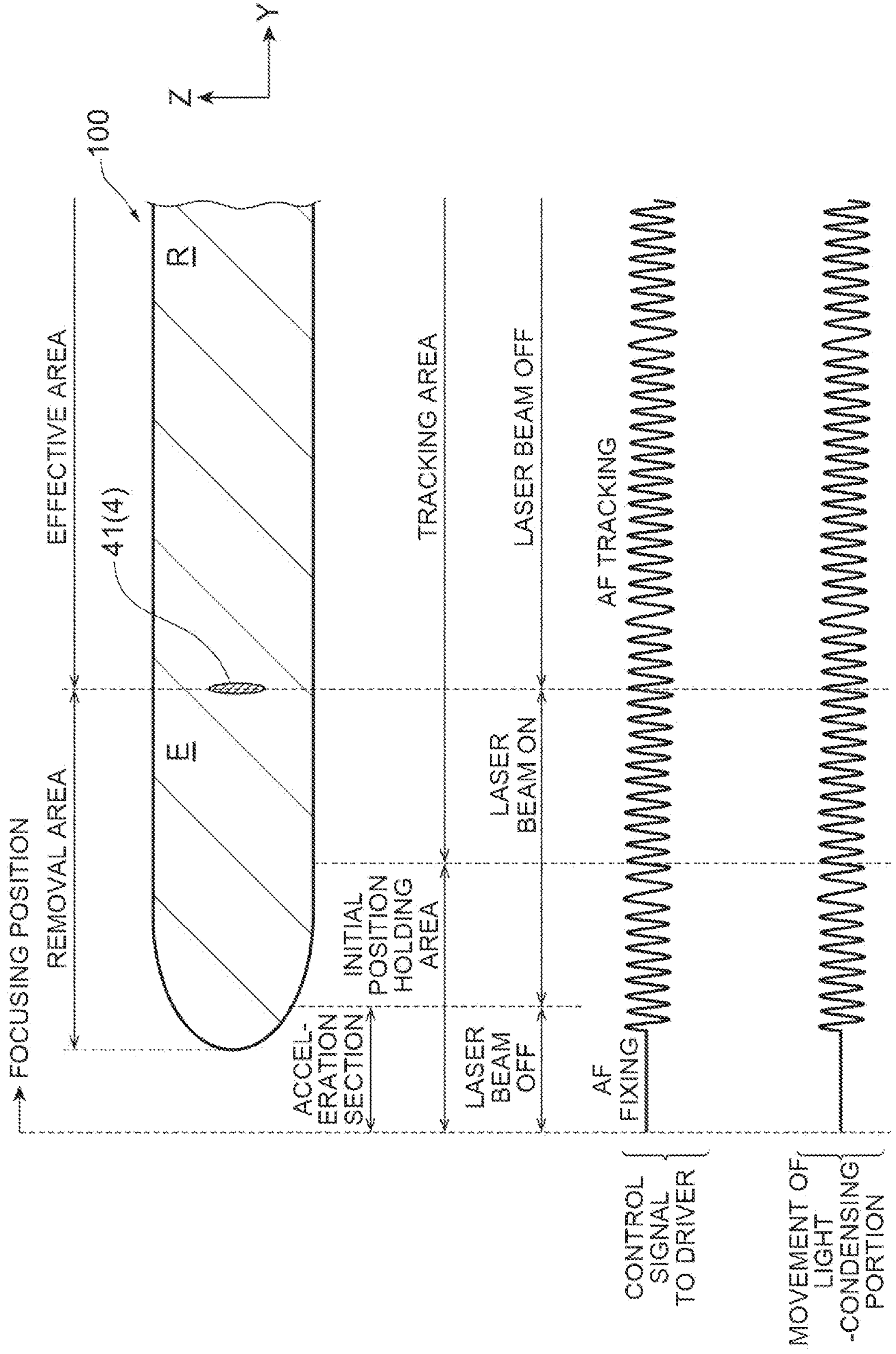
FIG. 22 depicts still another example of various states that result when the focusing position is outside or inside the object at execution of the radiation cut processing.

According to this embodiment, at execution of the radiation cut process, the controller 9, after moving the light-condensing driving portion 14 to the initial position, may cause the driving portion 18 to move the light-condensing driving portion 14 in such a way as to make it follow displacement of the laser light incident surface right after the focusing position's moving into the object 100. For example, as indicated in FIG. 22, the AF tracking may be started shortly after the focusing position's moving into the object 100. The AF tracking may be started based on the coordinates of the focusing position or on the quantity of reflection light received by the distance measuring sensor 36. In this case, a drop in precision in following displacement of the laser light incident surface can be suppressed. When the control signal to the driving portion 18 overshoots widely due to the influence of the bevel part on the outer edge of the object 100, the AF tracking may be started right after the focusing position having moved into the object 100 passes the bevel part.

According to this embodiment, in a case where the unevenness, inclination, and the like of the support surface **107*a* are dominant factors that cause displacement of the laser light incident surface of the object 100 supported by the stage 107 (in a case where the flatness of the laser light incident surface itself is high), when laser processing is carried out on a plurality of objects 100, measurement data may be acquired at execution of the trimming processing on the first object 100 and the acquired measurement data may be used at execution of the trimming processing on the second object 100 and other objects 100** to follow.

According to this embodiment, at least one of the reference voltage value for trimming processing and the reference voltage value for radiation cut processing may be corrected by a height offset function. According to the height offset function, for example, when the distance measuring sensor 36 has the same optical axis as that of the laser light, the reference voltage value for trimming processing and the reference voltage value for radiation cut processing may be associated with a center value of the control signal to the driving portion 18, and each of the reference voltage values may be corrected according to the control signal at execution of AF tracking. According to the height offset function, for example, when the distance measuring sensor 36 has an optical axis different from that of the laser light, a voltage value corresponding to a difference between the position in the Z direction of the focusing position when the first modified region 41 on the first row is formed by the trimming processing and the position in the Z direction of the focusing position when the second modified region 42 on the first row is formed by the radiation cut processing may be added to the reference voltage value for radiation cut processing.

Figure 23:
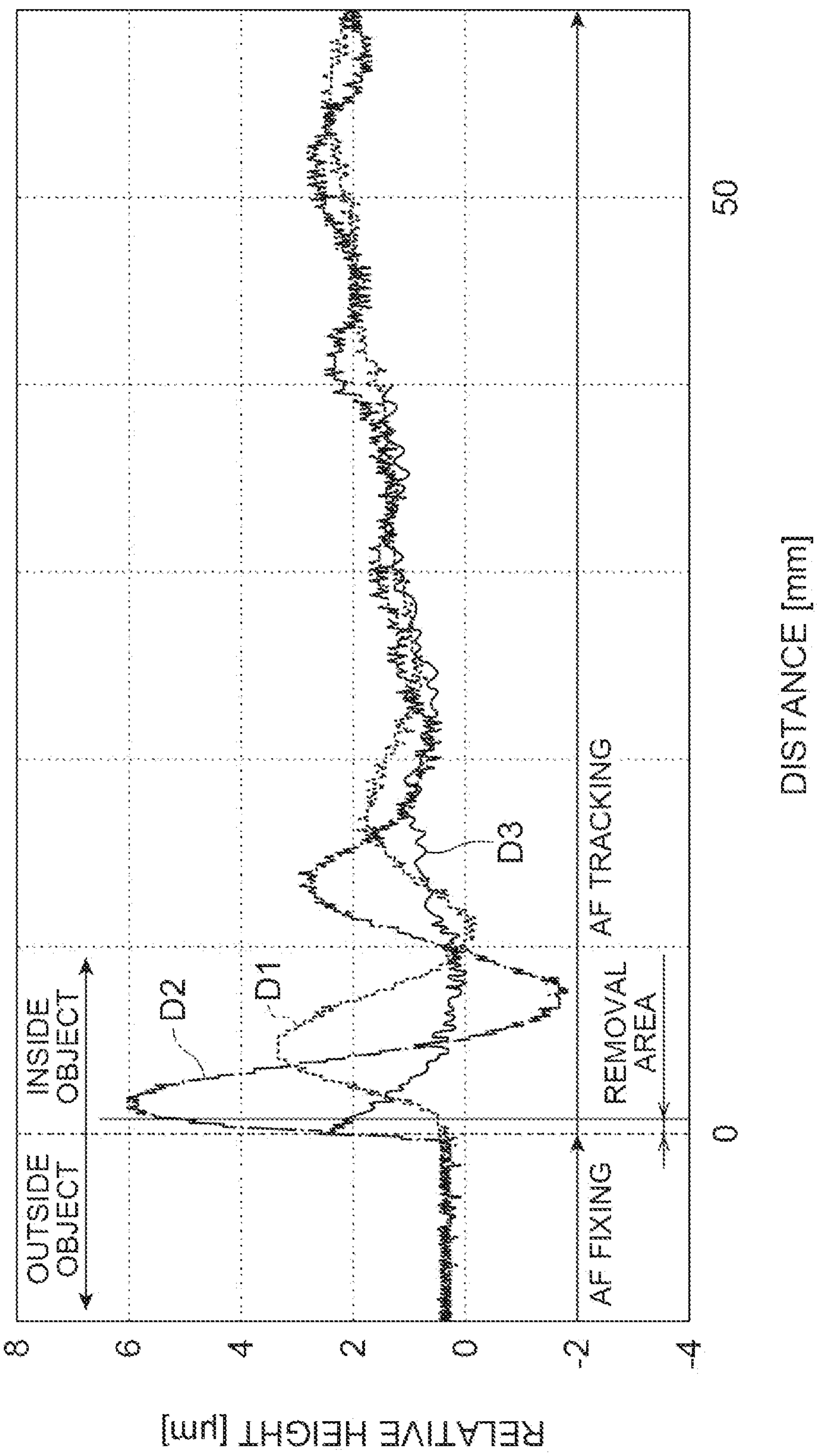
FIG. 23 is a graph showing precision in following displacement of a laser light incident surface in radiation cut processing according to a first comparative example.

FIG. 23 is a graph showing precision in following displacement of the laser light incident surface in the radiation cut processing according to a first comparative example. In FIG. 23, the horizontal axis represents the distance of the focusing position from the peripheral edge of the object 100 along the line M3. Along the horizontal axis, the peripheral edge of the object 100 is expressed as 0, and a position inside the object 100 is expressed as a positive value. The vertical axis represents a relative height that is a relative position in the Z direction when the height setting position is defined as 0. D1 is relative height data corresponding to the actual current position of the light-condensing driving portion 14, D2 is relative height data corresponding to the control signal value to the driving portion 18, and D3 is relative height data corresponding to displacement of the laser light incident surface. Terms in FIG. 23 apply also to FIGS. 24 to 26.

In the radiation cut processing according to the first comparative example, the AF fixing to the height setting position is carried out until the focusing position moves into the removal area E, and the AF tracking is started at a point of time at which the focusing position has moved into the removal area E. It can be understood from FIG. 23 that in the radiation cut processing according to the first comparative example, overshooting of the control signal value that widely exceeds displacement of the laser light incident surface may occur at the edge of the object 100. It can also be understood that the current position of the light-condensing driving portion 14 delays relative to the control signal value, which creates a relative height difference of about 3 μm in a range between 0 mm to 10 mm. This leads to a conclusion that a tracking error is large in the removal area E.

Figure 24:
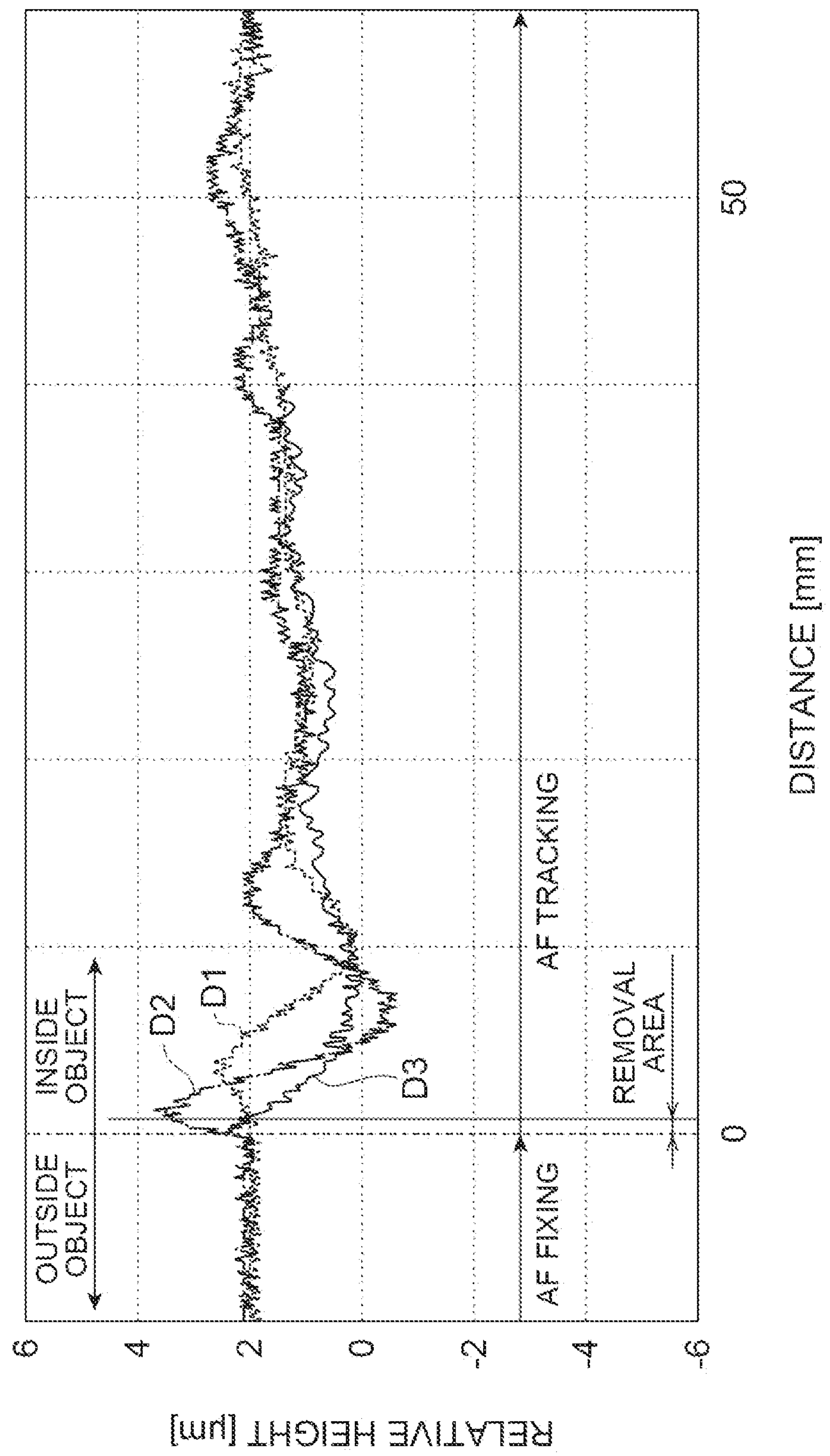
FIG. 24 is a graph showing precision in following displacement of the laser light incident surface in radiation cut processing according to a first embodiment.

FIG. 24 is a graph showing precision in following displacement of the laser light incident surface in the radiation cut processing according to a first embodiment. The radiation cut processing according to the first embodiment is one aspect of the present invention described above. In the radiation cut processing according to the first embodiment, the AF fixing to the initial position based on measurement data acquired by the trimming processing is carried out until the focusing position moves into the removal area E, and the AF tracking is started at a point of time at which the focusing position has moved into the removal area E. It can be understood from FIG. 24 that in the radiation cut processing according to the first embodiment, overshooting is reduced greatly even when the AF tracking is carried out. This leads to a conclusion that a tracking error can be suppressed in the removal area E.

Figure 25:
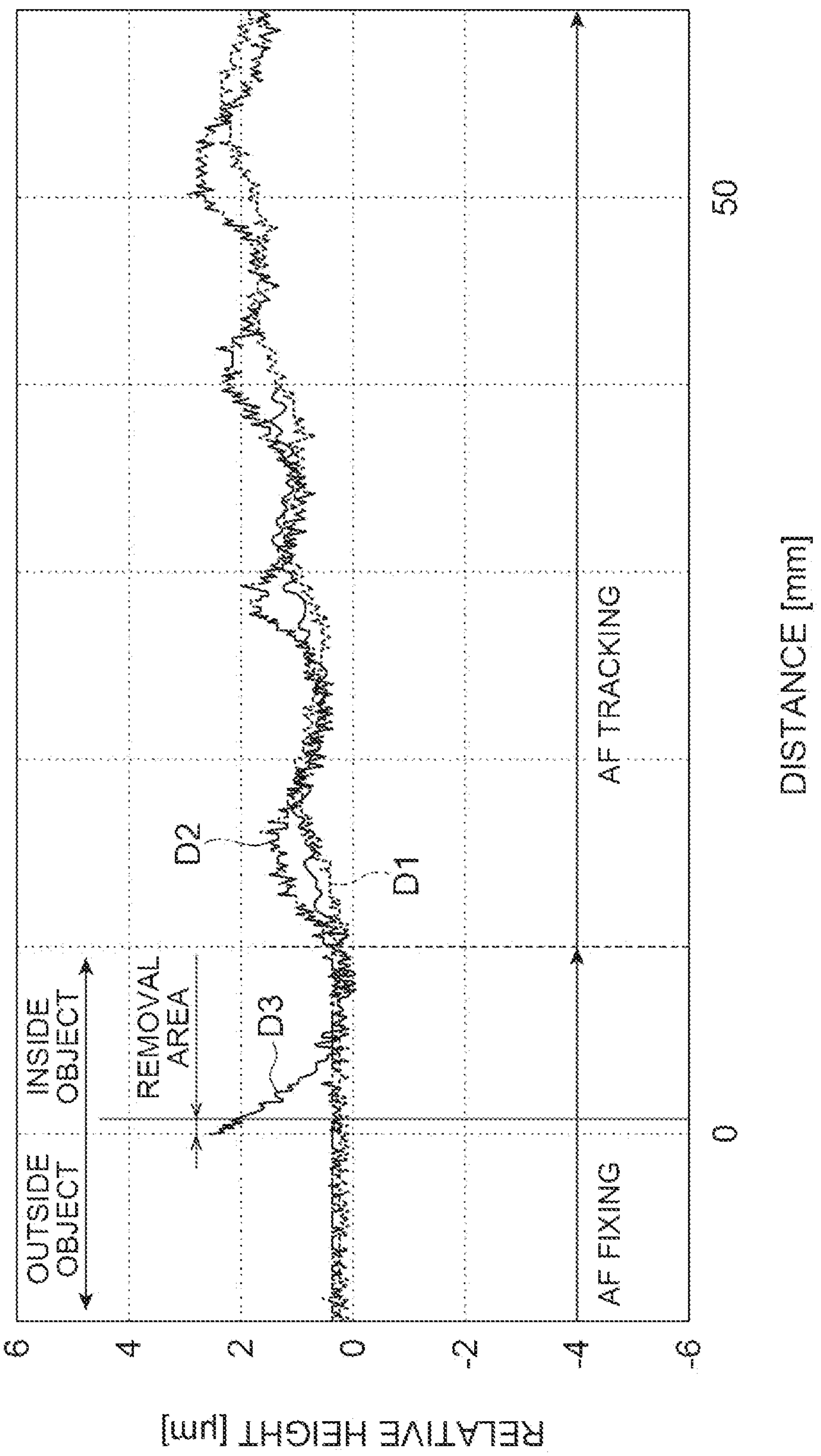
FIG. 25 is a graph showing precision in following displacement of the laser light incident surface in radiation cut processing according to a second comparative example.

FIG. 25 is a graph showing precision in following displacement of the laser light incident surface in the radiation cut processing according to a second comparative example. In the radiation cut processing according to the second comparative example, the AF fixing to the height setting position is carried out until the focusing position passes through the removal area E to move into the object 100 and stay therein, and the AF tracking is started at a subsequent point of time. It can be understood from FIG. 25 that in the radiation cut processing according to the second comparative example, a tracking error in the removal area E is still large.

Figure 26:
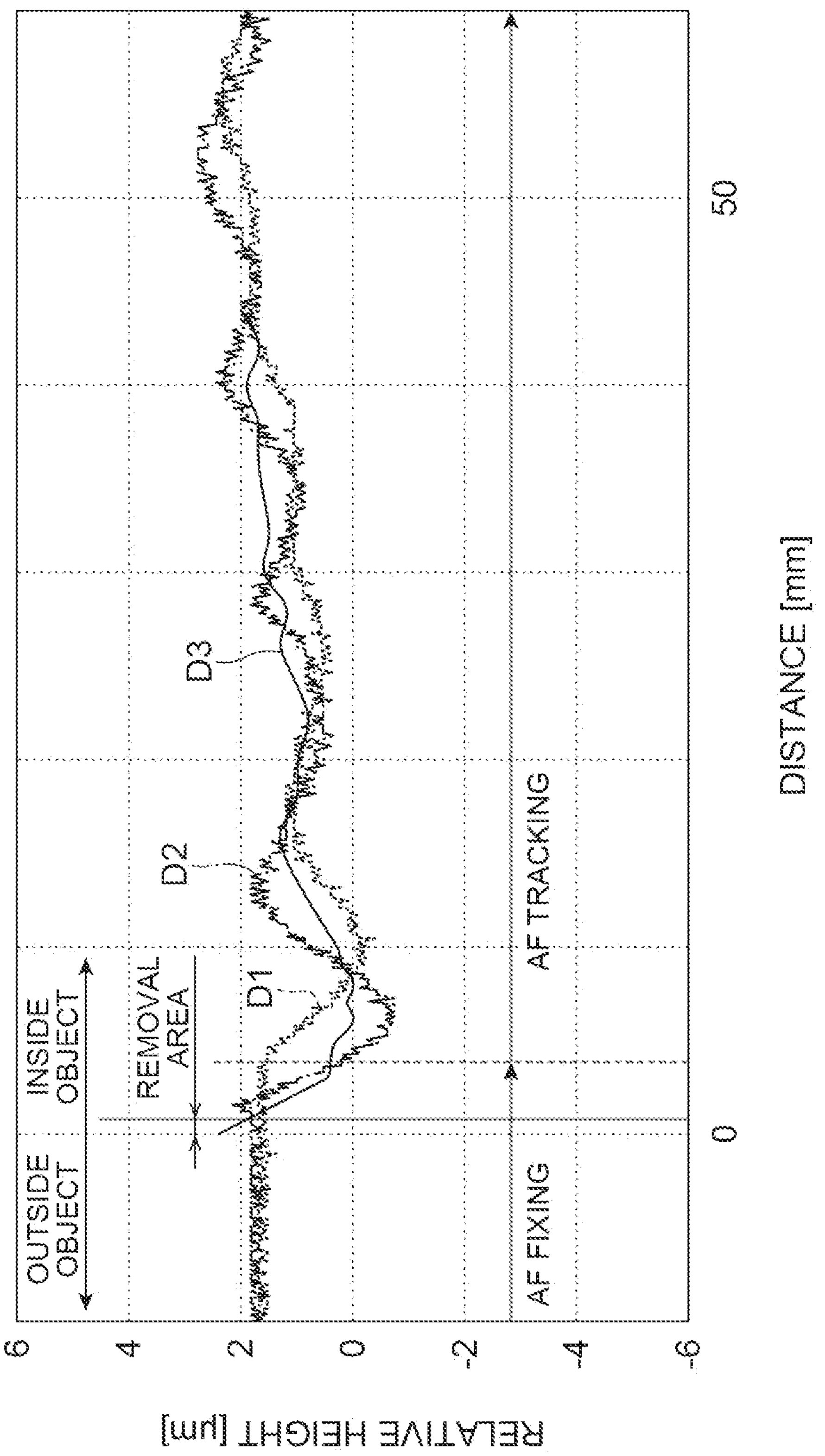
FIG. 26 is a graph showing precision in following displacement of the laser light incident surface in radiation cut processing according to a second embodiment.

FIG. 26 is a graph showing precision in following displacement of the laser light incident surface in the radiation cut processing according to a second embodiment. The radiation cut processing according to the second embodiment is one aspect of the present invention described above. In the radiation cut processing according to the second embodiment, the AF fixing to the initial position based on measurement data acquired by the trimming processing is carried out until the focusing position passes through the removal area E to move into the object 100 and stay therein, and the AF tracking is started at a subsequent point of time. It can be understood from FIG. 26 that in the radiation cut processing according to the second embodiment, a tracking error can be suppressed in the removal area E.

Aspects of the present invention are not limited to the above-described embodiments.

In the above embodiments and modifications, the radiation cut processing according to which the radiation cut process and the radiation cut step are executed as the second process and the second step has been described exemplary. The radiation cut processing is, however, not limited to such processing. For example, after the trimming processing, cutting processing of forming a modified region inside the effective area R may be carried out. In this case, the second process and the second step correspond to a process and a step that make up the cutting processing.

Figure 27:
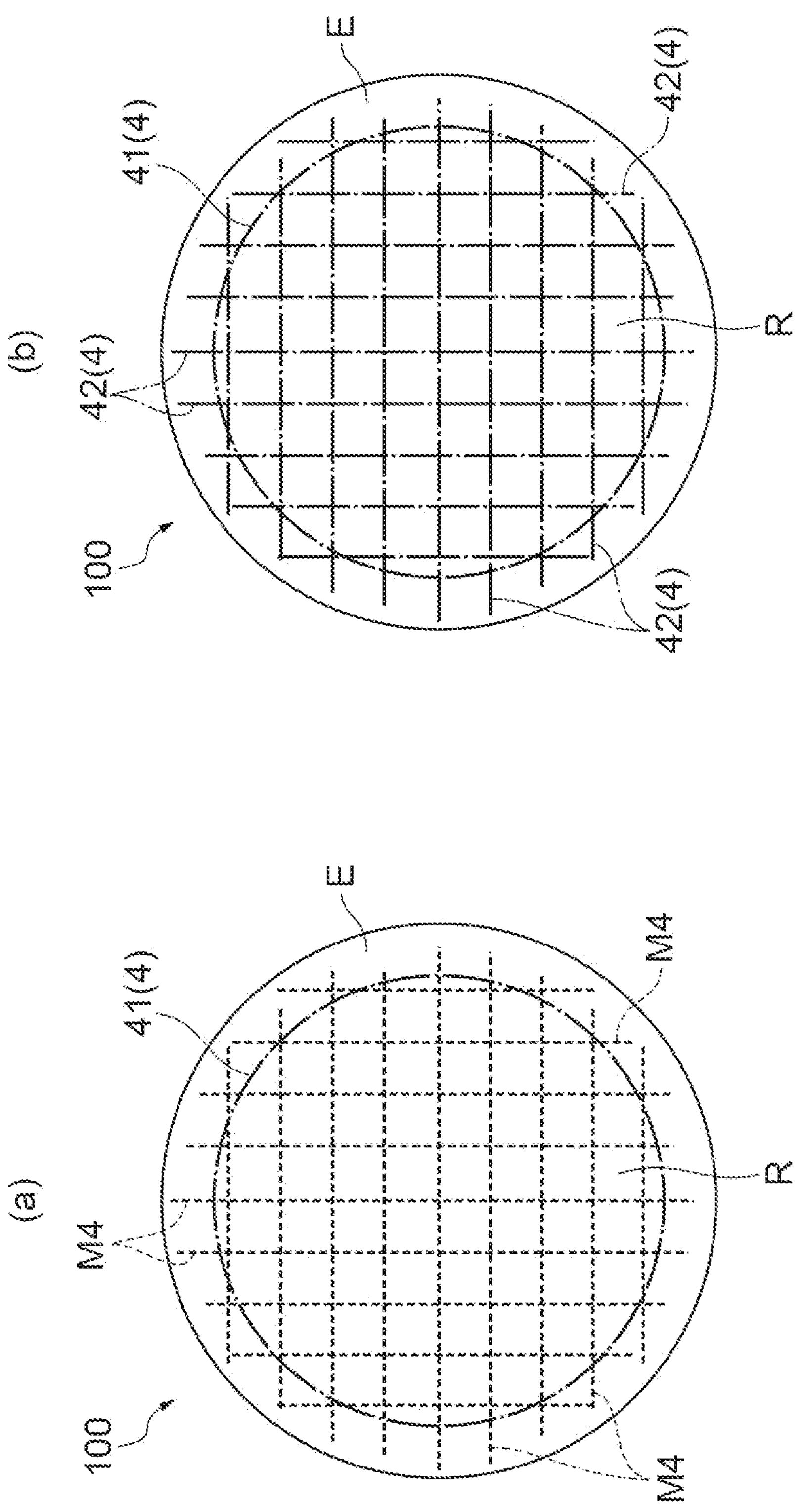
FIG. 27(*a*) is a plan view of the object for explaining cutting processing.

Specifically, at execution of the second process making up the cutting processing, the controller 9 may form second modified regions 42 in the effective area R (the inner part of object 100 that is inside the first modified region 41 in a view from the laser light incident surface) such that the second modified regions 42 extend along lines M4 intersecting the line M2 (see FIG. 15(*a*)), as shown in FIGS. 27(*a*) and 27(*b*). The plurality of lines M4 are set on the object 100. The plurality of lines M4 of a lattice pattern are set at least in the effective area R. In this case, the second modified regions 42 may be formed in the effective area R of the object 100 such that cracks from the second modified regions 42 hardly spreads to the removal area E of the object 100.

In the second process in this case, when the focusing position is moved along one line M4, the initial position is a position based on measurement data on displacement at an intersection of the line M3 and the one line M4 on the laser light incident surface. In this manner, in the case where the second modified regions 42 are formed such that cracks from the second modified regions 42 hardly spread to the removal area E, a drop in precision in following displacement of the laser light incident surface can be further suppressed.

In the example shown in FIGS. 27(*a*) and 27(*b*), at formation of the second modified regions 42, emission of the laser light L1 is stopped when the focusing position of the laser light L1 is on the outer edge. However, because a section for stopping laser emission is set according to a range in which the object 100 can be divided, the section for stopping laser emission is determined regardless of the position of the first modified region 41 formed by the trimming processing. In this case, emission of the laser light L1 may not be stopped. As shown in FIGS. 27(*a*) and 27(*b*), when the second modified regions 42 extend outward beyond the first modified region 41 formed by the trimming processing, it facilitates division of the object 100 and contributes to stabilization of the second modified regions 42 in the effective area R. A processing method shown in FIGS. 27(*a*) and 27(*b*) is particularly effective when adopted to process the object 100 with a small thickness.

Figure 28:
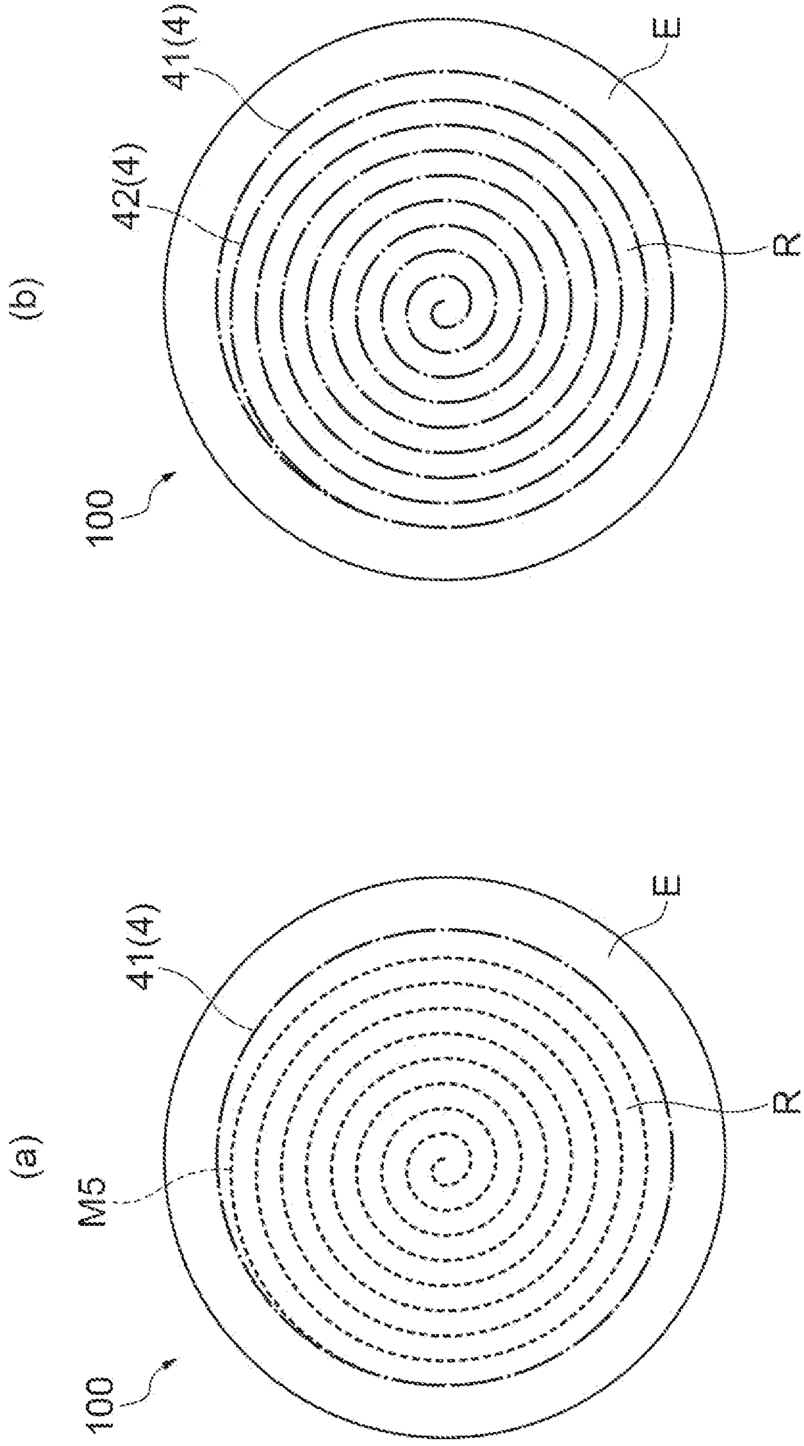
FIG. 28(*a*) is a plan view of the object for explaining peeling processing.

In another case, for example, after the trimming processing is over, the peeling processing may be carried out without carrying out the radiation cut processing. In this case, the second process and the second step correspond to a process and a step that make up the peeling processing. Specifically, by the second process making up the peeling processing, the controller 9 may form the second modified region 42 along a line M5 on the virtual plane M1 (see FIG. 10(*b*)) inside the object 100, as shown in FIGS. 28(*a*) and 28(*b*). The line M5 is set in the effective area R. The line M5 extends spirally around the center position of the object 100. In the second process in this case, the initial position is based on measurement data on displacement of the second process emission start θ position on the line M2 on the laser light incident surface. The second process emission start θ position is the θ position around the θ axis on the laser light incident surface (θ position around the spindle C shown in FIG. 9), the θ position being the position at which emission of the laser light L1 is started in the second process. In this configuration, at execution of the peeling processing, a drop in precision in following displacement of the laser light incident surface can be further suppressed.

In the above embodiments and modifications, the back surface 100*b* of the object 100 is the laser light incident surface. The surface 100*a* of the object 100, however, may be adopted as the laser light incident surface. In the above embodiments and modifications, the modified region 4 may be, for example, a crystallized area, a recrystallized area, or a gettering area formed inside the object 100. The crystallized area is an area that maintains the structure of the object 100 not subjected to the processing yet. The recrystallized area is an area that after being evaporated, transformed into plasma, or melted, has re-solidified in the form of a single crystal or polycrystal structure. The gettering area is an area that exerts a gettering effect of collecting and capturing impurities, such as heavy metals. The gettering area may be formed continuously or intermittently. The laser processing apparatus, for example, may be applied to such processing as ablation.

In the above embodiments and modifications, the moving mechanism is configured to move at least one of the stage 107 and the laser processing head 10A. In the above embodiments and modifications, the driving portion 18 is configured to move at least one of the stage 107 and the light-condensing driving portion 14 along the Z direction.

In the above embodiments and modifications, the driving portion 18 shifts the position of the light-condensing driving portion 14 along the Z direction to the initial position before the focusing position moves from outside of the object 100 to inside thereof. However, the driving portion 18 may shift the position of the light-condensing driving portion 14 along the Z direction to the initial position when the focusing position moves from outside of the object 100 to inside thereof. The expression "when the focusing position moves into the object 100" includes a point of time at which the focusing position moves into the object 100 and a point of time substantially the same as the point of time at which the focusing position moves into the object 100.

In the above embodiments and modifications, the θ position is used as position information. In place of the θ position or in addition to the θ position, however, at least one of a time lapsed from the start of the laser processing and coordinate information may be used as the position information. The position information is any information that indicates which position on the circumference of the object 100 that the focusing position is at. In the above embodiments and modifications, height setting to be carried out after the trimming processing and before the radiation cut processing is omitted. This height setting, however, may not be omitted.

In the above embodiments and modifications, the control signal (voltage value) to the driving portion 18 is acquired as measurement data. The measurement data, however, is not limited to the control signal, and may be an absolute position of the light-condensing driving portion 14 in the Z direction or a relative position against a position at the time of height setting.

In the above embodiments and modifications, for example, when the radiation cut processing by which the focusing position moves into the object 100 in a given θ direction is carried out, measurement data used when the light-condensing driving portion 14 is set at the initial position may be at least one of the following.

(1) Measurement data on the θ position in the θ direction (2) An average of measurement data on a plurality of sampling positions before, after, or before/after the θ position in the θ direction (3) A graph showing measurement data approximated as unevenness on the circumference of the object 100 or measurement data expressed in the form of equations (4) Data on the unevenness of the stage 107

In the above embodiments and modifications, at execution of the trimming processing, measurement data is acquired by a process of carrying out the AF tracking while emitting the laser light L1. The measurement data, however, may be acquired by a process of carrying out the AF tracking without emitting the laser light L1, that is, carrying out the AF tracking independent of mission of the laser light L1. In the above embodiments and modifications, at execution of the radiation cut processing, if the above-mentioned over-shooting is successfully suppressed, measurement data acquired during the trimming processing may be read and then the driving portion 18 may be controlled based on a value determined by adding or subtracting a given value to or from the measurement data.

Components included in the above embodiments and modifications are not limited to the materials and shapes described above. Various materials of different shapes may be used as those components. In addition, components included in the above embodiments and modifications may be used arbitrarily as components making up other embodiments and modifications.

REFERENCE SIGNS LIST

1, 101 laser processing apparatus
4 modified region
41 first modified region (modified region)
42 second modified region (modified region)
5, 6, 200, 300, 400 moving mechanism
9 controller
10A, 10B, 10C, 10D laser processing head (emission portion)
14 light-condensing driving portion (condenser lens)
18 driving portion
19 circuit (measurement data acquiring portion)
36 distance measuring sensor (measurement data acquiring portion)
100 object
100*b* back surface (laser light incident surface)
106A first Z-axis rails (moving mechanism)
107 stage (support portion)
107*a* support surface
108 -axis rails (moving mechanism)
E removal area (peripheral part)
L1, L2 laser light
M1 virtual plane
M2 line (annular line)
M3 line (linear line)
M3*a* line (first linear line)
M3*c* line (second linear line)
M4 line (linear line)
P1 focusing position
R effective area (inner area)

The invention claimed is:

1. A laser processing apparatus configured to emit a laser light onto an object to form a modified region inside the object, the laser processing apparatus comprising:
- a support configured to support the object;
- an emitter configured to emit the laser light onto the object via a condenser lens;
- rails configured to allow movement of at least one of the support and the emitter so that a focusing position of the laser light moves;
- a driver configured to cause at least one of the support and the condenser lens to move along a direction of an optical axis of the condenser lens;
- a sensor configured to acquire measurement data on at least one of displacement of a laser light incident surface of the object, the laser light incident surface being exposed to the laser light incident thereon, and displacement of a support surface of the support, the support surface supporting the object; and
- a controller that controls the emitter, the rails, and the driver, wherein the controller
- executes a first process of moving at least one of the support and the emitter so that inside a peripheral edge of the object, the focusing position moves along the peripheral edge, thereby forming a first modified region inside the object along the peripheral edge,
- acquires, by the sensor at execution of the first process, the measurement data associated with position information on a position of the object,
- forms, at execution of the first process, the first modified region along an annular line along the peripheral edge of the object,
- following the first process, executes a second process of moving at least one of the support and the emitter so that the focusing position moves from outside of the object to inside thereof, thereby forming a second modified region inside the object,
- causes, at execution of the second process, the driver to shift a position of at least one of the support and the condenser lens, the position being along the direction of the optical axis, to an initial position based on the measurement data acquired in the first process, when the focusing position moves from outside of the object to inside thereof, and
- forms, at execution of the second process, forms the second modified region along a linear line intersecting the annular line, the second modified region being in a peripheral part extending from the peripheral edge of the object to the first modified region in a view from the laser light incident surface, and wherein the initial position is a position based on the measurement data on displacement at an intersection of the annular line and the linear line on the laser light incident surface.

2. The laser processing apparatus according to claim 1, wherein the controller, at execution of the first process, causes the driver to move at least one of the support and the condenser lens in such a way as to make the support or the condenser lens follow displacement of the laser light incident surface while moving at least the support or the emitter so that the focusing position moves along the peripheral edge, wherein the sensor, at execution of the first process, stores a control signal value inputted to the driver when the driver moves at least one of the support and the condenser lens in such a way as to make the support or the condenser lens follow displacement of the laser light incident surface, as the measurement data associated with the position information, wherein the controller, at execution of the second process, reads the control signal value that is inputted when the support or the condenser lens has been caused to follow displacement of an intersection of the annular line and a first linear line by the first process, moves at least one of the support and the emitter so that the focusing position moves from outside of the object to inside thereof along the first linear line, thereby forming the second modified region in the peripheral part, and when the focusing position moves outside of the object to inside thereof, controls the driver by the read control signal value, thereby moving at least one of the support and the condenser lens to a first initial position, and wherein the controller reads the control signal value that is inputted when the support or the condenser lens has been caused to follow displacement of an intersection of the annular line and a second linear line by the first process, moves at least one of the support and the emitter so that the focusing position moves from outside of the object to inside thereof along the second linear line, thereby forming the second modified region in the peripheral part, and when the focusing position moves outside of the object to inside thereof, controls the driver by the read control signal value, thereby moving at least one of the support and the condenser lens to a second initial position.

3. The laser processing apparatus according to claim 1, wherein at execution of the second process, the controller, after moving at least one of the support and the condenser lens to the initial position, causes the driver to move at least one of the support and the condenser lens in such a way as to make the support or the condenser lens follow displacement of the laser light incident surface, from a point of time at which the focusing position is on a peripheral part extending from the peripheral edge of the object to the first modified region in a view from the laser light incident surface.

4. The laser processing apparatus according to claim 1, wherein at execution of the second process, the controller, after moving at least one of the support and the condenser lens to the initial position, causes the driver to hold at least one of the support and the condenser lens at the initial position in a period during which the focusing position stays on a peripheral part extending from the peripheral edge of the object to the first modified region in a view from the laser light incident surface.

5. The laser processing apparatus according to claim 1, wherein the sensor is configured to emit measurement light onto the object and to detect information on reflection light that is the measurement light reflected by the laser light incident surface.

6. A laser processing apparatus configured to emit a laser light onto an object to form a modified region inside the object, the laser processing apparatus comprising:

a support configured to support the object;

an emitter configured to emit the laser light onto the object via a condenser lens;

rails configured to allow movement of at least one of the support and the emitter so that a focusing position of the laser light moves;

a driver configured to cause at least one of the support and the condenser lens to move along a direction of an optical axis of the condenser lens;

a sensor configured to acquire measurement data on at least one of displacement of a laser light incident surface of the object, the laser light incident surface being exposed to the laser light incident thereon, and displacement of a support surface of the support, the support surface supporting the object; and a controller that controls the emitter, the rails, and the driver, wherein the controller executes a first process of moving at least one of the support and the emitter so that inside a peripheral edge of the object, the focusing position moves along the peripheral edge, thereby forming a first modified region inside the object along the peripheral edge, acquires, by the sensor at execution of the first process, the measurement data associated with position information on a position of the object, forms, at execution of the first process, the first modified region along an annular line along the peripheral edge of the object, following the first process, executes a second process of moving at least one of the support and the emitter so that the focusing position moves from outside of the object to inside thereof, thereby forming a second modified region inside the object, causes, at execution of the second process, the driver to shift a position of at least one of the support and the condenser lens, the position being along the direction of the optical axis, to an initial position based on the measurement data acquired in the first process, when the focusing position moves from outside of the object to inside thereof, and forms, at execution of the second process, the second modified region along a linear line intersecting the annular line, the second modified region being on an inner part of the object that is inside the first modified region in a view from the laser light incident surface.

7. The laser processing apparatus according to claim 6, wherein the initial position is a position based on the measurement data on displacement at an intersection of the annular line and the linear line on the laser light incident surface.

8. A laser processing apparatus, configured to emit a laser light onto an object to form a modified region inside the object, the laser processing apparatus comprising:

a support configured to support the object;

an emitter configured to emit the laser light onto the object via a condenser lens;

rails configured to allow movement of at least one of the support and the emitter so that a focusing position of the laser light moves;

a driver configured to cause at least one of the support and the condenser lens to move along a direction of an optical axis of the condenser lens;

a sensor configured to acquire measurement data on at least one of displacement of a laser light incident surface of the object, the laser light incident surface being exposed to the laser light incident thereon, and displacement of a support surface of the support, the support surface supporting the object; and a controller that controls the emitter, the rails, and the driver, wherein the controller executes a first process of moving at least one of the support and the emitter so that inside a peripheral edge of the object, the focusing position moves along the peripheral edge, thereby forming a first modified region inside the object along the peripheral edge, and following the first process, executes a second process of moving at least one of the support and the emitter so that the focusing position moves from outside of the object to inside thereof, thereby forming a second modified region inside the object, wherein the sensor, at execution of the first process, acquires the measurement data associated with position information on a position of the object, wherein the controller, at execution of the second process, causes the driver to shift a position of at least one of the support and the condenser lens, the position being along the direction of the optical axis, to an initial position based on the measurement data acquired in the first process, before or when the focusing position moves from outside of the object to inside thereof, and wherein the controller, at execution of the first process, forms the first modified region along an annular line along the peripheral edge of the object, and, at execution of the second process, forms the second modified region along a virtual plane inside the object.

9. The laser processing apparatus according to claim 8, wherein the controller sets a θ position about a θ axis on the laser light incident surface, the θ position being a position at which emission of the laser light is started in the second process, as a second process emission start θ position, and wherein the initial position is a position based on the measurement data on displacement of the annular line at the second process emission start θ position on the laser light incident surface.

10. A laser processing method of emitting a laser light onto an object to form a modified region inside the object, the method comprising:

a first step of moving at least one of a support and an emitter, the support configured to support the object and the emitter emitting the laser light onto the object via a condenser lens, so that inside a peripheral edge of the object, a focusing position of the laser light moves along the peripheral edge, thereby forming a first modified region inside the object along the peripheral edge;

acquiring, at execution of the first step, measurement data associated with position information on a position of the object, the measurement data being data on displacement of a laser light incident surface of the object, the laser light incident surface being exposed to the laser light incident thereon, and on displacement of a support surface of the support, the support surface supporting the object;

forming, at execution of the first process, the first modified region along an annular line along the peripheral edge of the object;

a second step to be executed following the first step, the second step moving at least one of the support and the emitter so that the focusing position moves from outside of the object to inside thereof, thereby forming a second modified region inside the object, wherein shifting, by a driver at execution of the second step, a position of at least one of the support and the condenser lens, the position being along a direction of an optical axis of the condenser lens, to an initial position based on the measurement data acquired at the first step, when the focusing position moves from outside of the object to inside thereof, forming, at execution of the second step, the second modified region along a linear line intersecting the annular line, the second modified region being in a peripheral part extending from the peripheral edge of the object to the first modified region in a view from the laser light incident surface, wherein the initial position is a position based on the measurement data on displacement at an intersection of the annular line and the linear line on the laser light incident surface.

11. A laser processing apparatus configured to emit a laser light onto an object to form a modified region inside the object, the laser processing apparatus comprising:

a support configured to support the object;

an emitter configured to emit the laser light onto the object via a condenser lens;

rails configured to allow movement of at least one of the support and the emitter so that a focusing position of the laser light moves;

a driver configured to cause at least one of the support and the condenser lens to move along a direction of an optical axis of the condenser lens;

a sensor configured to acquire measurement data on at least one of displacement of a laser light incident surface of the object, the laser light incident surface being exposed to the laser light incident thereon, and displacement of a support surface of the support, the support surface supporting the object; and a controller that controls the emitter, the rails, and the driver, wherein the controller executes a first process of moving at least one of the support and the emitter so that inside a peripheral edge of the object, the focusing position moves along the peripheral edge, thereby forming a first modified region inside the object along the peripheral edge, following the first process, executes a second process of moving at least one of the support and the emitter so that the focusing position moves from outside of the object to inside thereof, thereby forming a second modified region inside the object, causes, at execution of the second process, the driver to shift a position of at least one of the support and the condenser lens, the position being along the direction of the optical axis, to an initial position based on the measurement data acquired in the first process, when the focusing position moves from outside of the object to inside thereof, forms, at execution of the second process, the second modified region along a linear line intersecting the annular line, the second modified region being in a peripheral part extending from the peripheral edge of the object to the first modified region in a view from the laser light incident surface, and causes, at execution of the second process after moving at least one of the support and the condenser lens to the initial position, the driver to hold at least one of the support and the condenser lens at the initial position in a period during which the focusing position stays on a peripheral part extending from the peripheral edge of the object to the first modified region in a view from the laser light incident surface, and wherein the initial position is a position based on the measurement data on displacement at an intersection of the annular line and the linear line on the laser light incident surface.

* * * * *